(12) United States Patent
Bossis et al.

(10) Patent No.: US 12,546,780 B2
(45) Date of Patent: Feb. 10, 2026

(54) METHOD FOR IDENTIFYING UBIQUITIN AND UBIQUITIN-LIKE ENZYME ACTIVITIES

(71) Applicants: CENTRE NATIONAL DE LA RECHERCHE SCIENTIFIQUE, Paris (FR); UNIVERSITÉ DE MONTPELLIER, Montpellier (FR)

(72) Inventors: Guillaume Bossis, Montpellier (FR); Pierre Gatel, Chambray-lès-Tours (FR); Marc Piechaczyk, Saint Gely du Fesc (FR)

(73) Assignees: CENTRE NATIONAL DE LA RECHERCHE SCIENTIFIQUE, Paris (FR); UNIVERSITÉ DE MONTPELLIER, Montpellier (FR)

( * ) Notice: Subject to any disclaimer, the term of this patent is extended or adjusted under 35 U.S.C. 154(b) by 977 days.

(21) Appl. No.: 17/614,739

(22) PCT Filed: May 28, 2020

(86) PCT No.: PCT/EP2020/064911
§ 371 (c)(1),
(2) Date: Nov. 29, 2021

(87) PCT Pub. No.: WO2020/239949
PCT Pub. Date: Dec. 3, 2020

(65) Prior Publication Data
US 2022/0357326 A1 Nov. 10, 2022

(30) Foreign Application Priority Data
May 29, 2019 (EP) .................... 19305690

(51) Int. Cl.
*G01N 33/573* (2006.01)
*G01N 33/543* (2006.01)
*G01N 33/68* (2006.01)

(52) U.S. Cl.
CPC ..... *G01N 33/573* (2013.01); *G01N 33/54326* (2013.01); *G01N 33/6845* (2013.01); *G01N 2440/36* (2013.01); *G01N 2500/02* (2013.01)

(58) Field of Classification Search
CPC ............ G01N 33/573; G01N 33/6845; G01N 2440/36
See application file for complete search history.

(56) References Cited

U.S. PATENT DOCUMENTS

2008/0039413 A1\* 2/2008 Morris ................ C12Q 1/6886
514/789

FOREIGN PATENT DOCUMENTS

| WO | 2004020458 A2 | 3/2004 | |
|---|---|---|---|
| WO | WO-2005113812 A2 * | 12/2005 | ........... C12Q 1/6876 |
| WO | WO-2010039778 A2 * | 4/2010 | ............ A61K 31/00 |
| WO | 2016034895 A1 | 3/2016 | |

OTHER PUBLICATIONS

Jolliffe CN, Harvey KF, Haines BP, Parasivam G, Kumar S. Identification of multiple proteins expressed in murine embryos as binding partners for the WW domains of the ubiquitin-protein ligase Nedd4. Biochem J. Nov. 1, 2000;351 Pt 3(Pt 3):557-65. PMID: 11042109; PMCID: PMC1221394. (Year: 2000).*
Widagdo J, Taylor KM, Gunning PW, Hardeman EC, Palmer SJ (2012) SUMOylation of GTF2IRD1 Regulates Protein Partner Interactions and Ubiquitin-Mediated Degradation. PLoS ONE 7(11): e49283. https://doi.org/10.1371/journal.pone.0049283 (Year: 2012).*
Mevissen TE, Hospenthal MK, Geurink PP, Elliott PR, Akutsu M, Arnaudo N, Ekkebus R, Kulathu Y, Wauer T, El Oualid F, Freund SM, Ovaa H, Komander D. Otu deubiquitinases reveal mechanisms of linkage specificity and enable ubiquitin chain restriction analysis. Cell. Jul. 3, 2013;154(1):169-84. (Year: 2013).*
Ristic et al., "Detection of Protein-Protein Interactions and Post-translational Modifications Using the Proximity Ligation Assay: Application to the Study of the SUMO Pathway"; Proteostasis; 2016; pp. 279-290.
International Search Report issued on Jul. 24, 2020, in corresponding International Application No. PCT/EP2020/064911; 3 pages.

\* cited by examiner

*Primary Examiner* — Louise W Humphrey
*Assistant Examiner* — John Paul Selwanes
(74) *Attorney, Agent, or Firm* — Maier & Maier, PLLC

(57) ABSTRACT

A method for quantifying the activity of the proteins/enzymes involved in the conjugation of the SUMO/Ubiquitin/Nedd8 proteins in a cell of a biological sample the method including: a) a step of contacting a cellular extract of cell with each protein of a subgroup of at least 3 proteins wherein the at least 3 proteins corresponds to the proteins essentially including or only including the sequences SEQ ID NO: 1 to 3, b) a step of simultaneously measuring ubiquitination, sumoylation and neddylation level of each of the at least 3 proteins to obtain a first value for ubiquitin, SUMO and Nedd8.

9 Claims, 6 Drawing Sheets
Specification includes a Sequence Listing.

[Fig. 1]
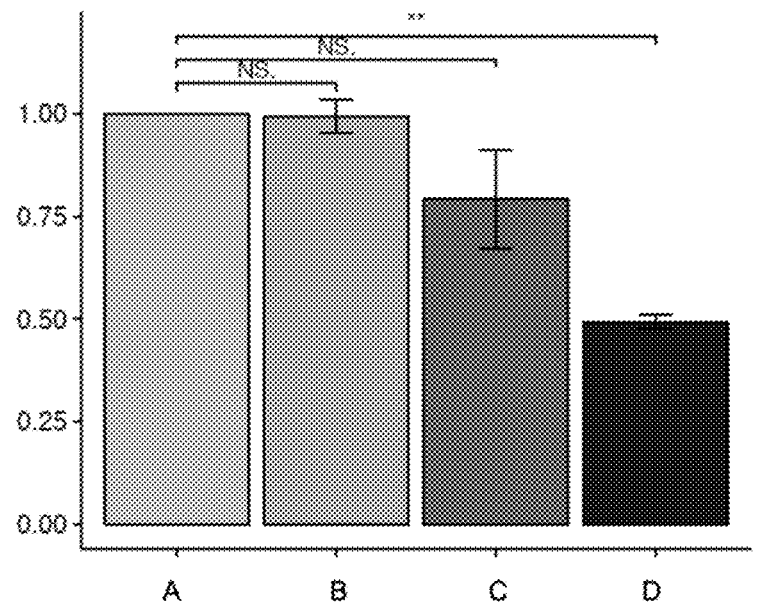
[Fig. 2]
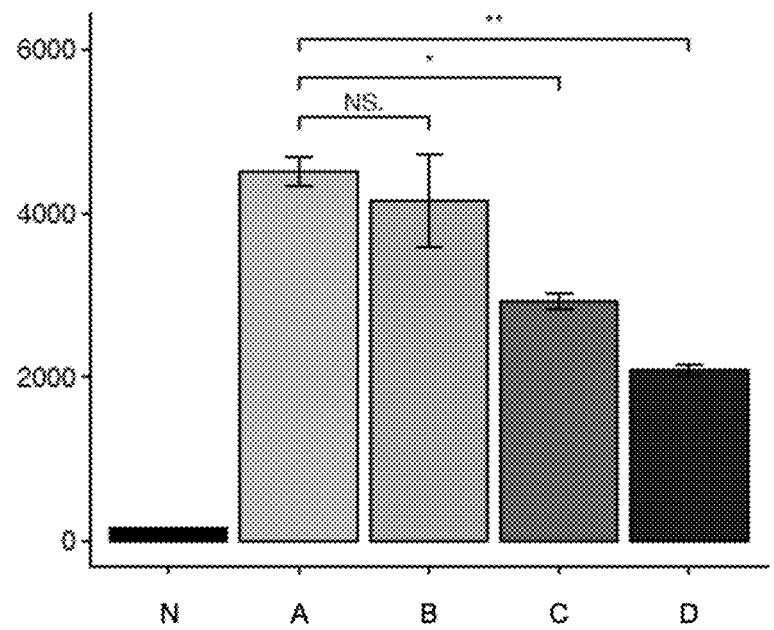

[Fig. 3]
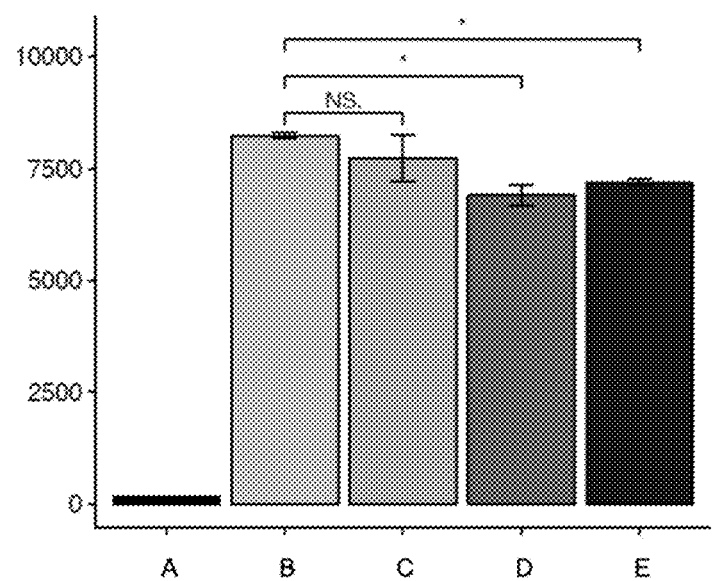
[Fig. 4]
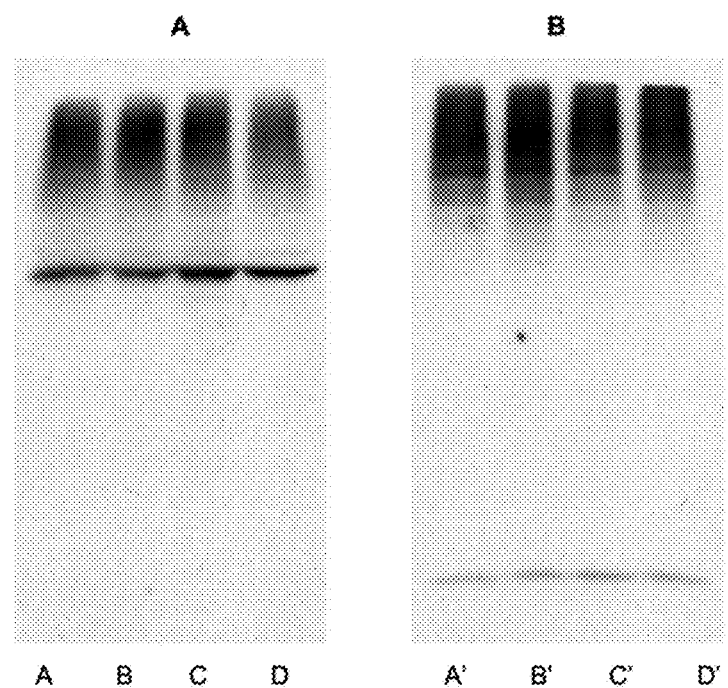

[Fig. 5]
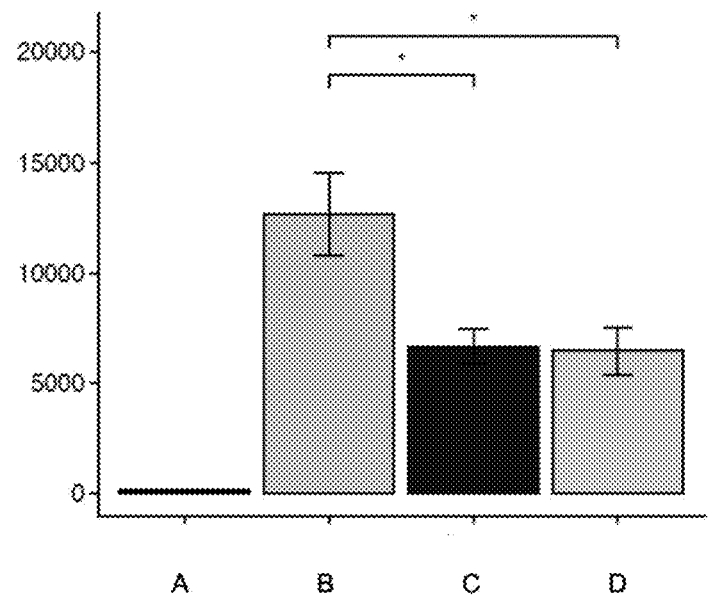
[Fig. 6]
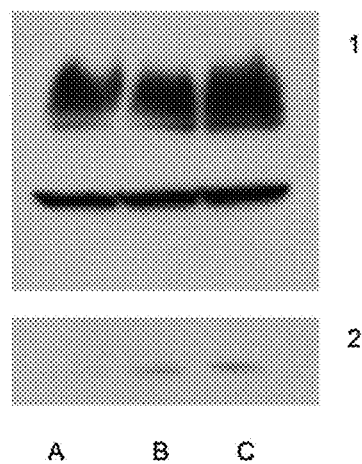

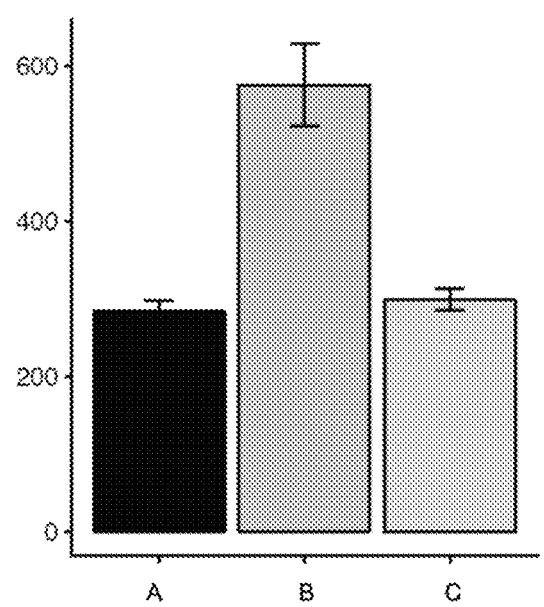
[Fig. 7]

[Fig. 8]
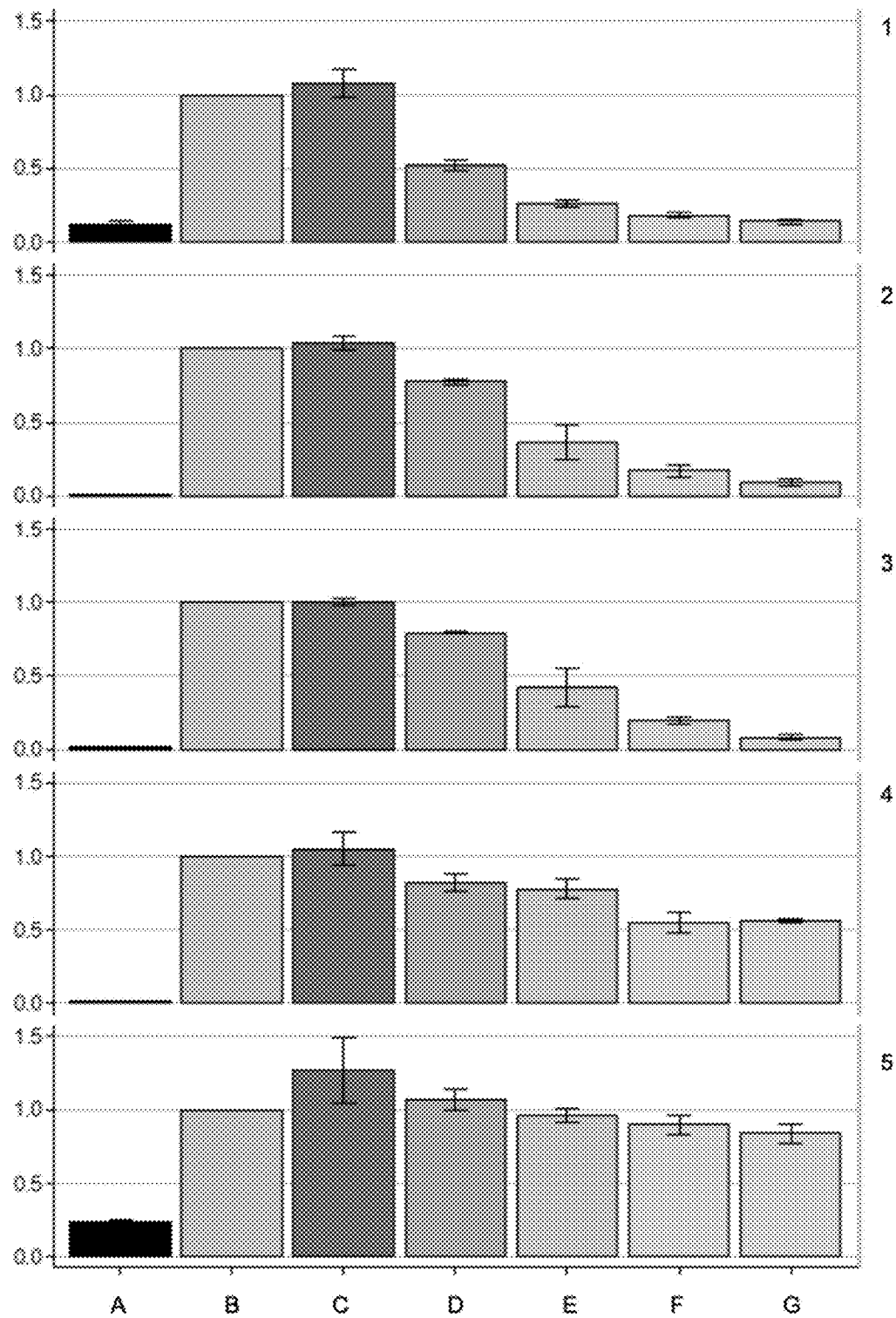

[Fig. 9]
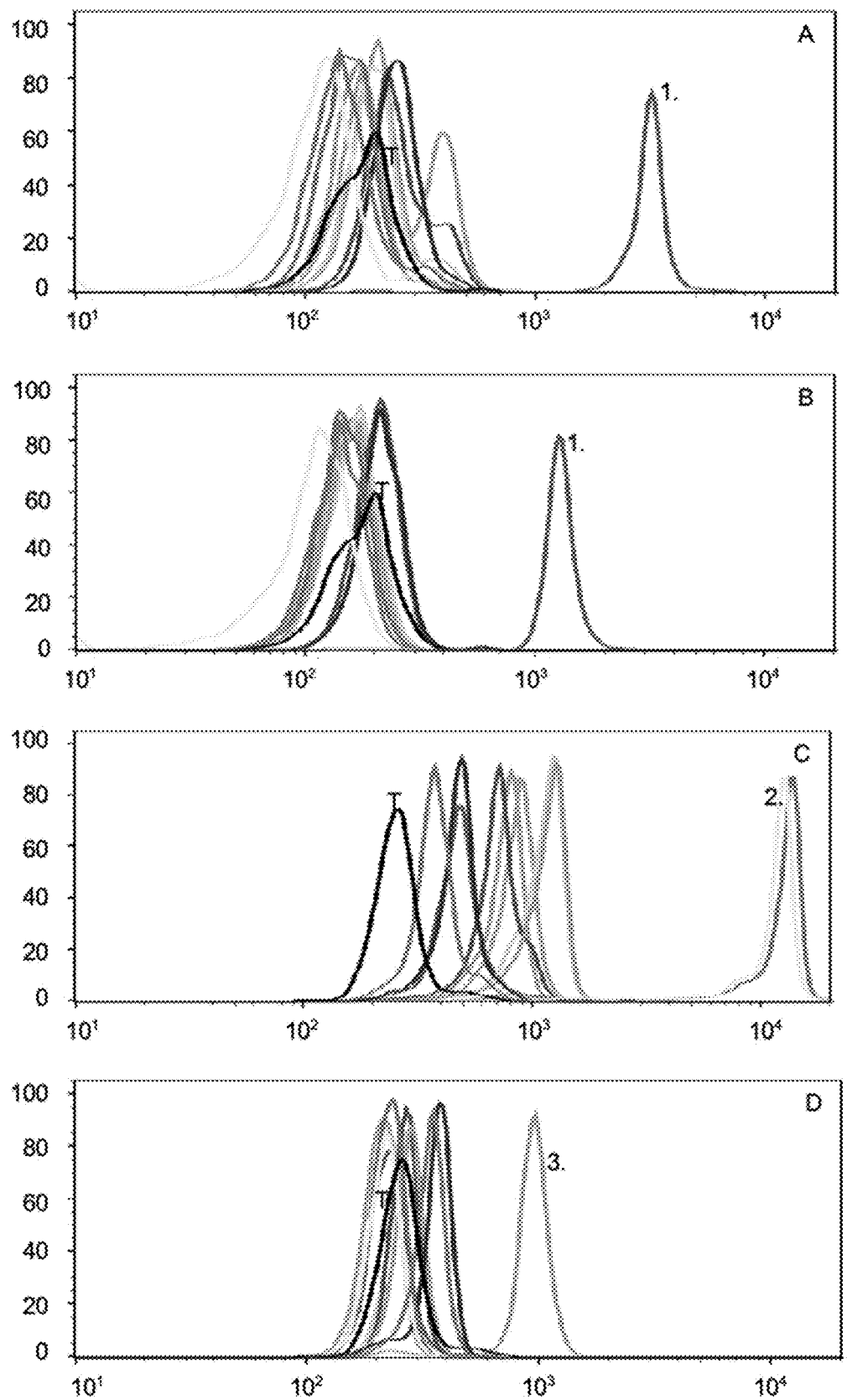

METHOD FOR IDENTIFYING UBIQUITIN AND UBIQUITIN-LIKE ENZYME ACTIVITIES

FIELD

The present invention relates to a method for identifying ubiquitin and ubiquitin-like enzymes activity, in particular enzyme activity further to a drug treatment.

BACKGROUND

Precursor proteins are not active, and thus, need further processing to become functional mature proteins. Post-translational protein modification is the chemical modification of proteins prior to or following protein biosynthesis, and includes phosphorylation, ubiquitylation, methylation, acetylation, and modifications by ubiquitin-like modifiers (UBLs).

Although ubiquitin is the most well understood post-translation modifier, there is a growing family of ubiquitin-like proteins (UBLs) that modify cellular targets in a pathway that is parallel to but distinct from ubiquitin proteasome pathway. These alternative modifiers include: SUMO (Sentrin, Smt3 in yeast), NEDD8 (Rub1 in yeast), ISG15 (UCRP), APG8, APG12, FAT10, Ufm1, URM1 and Hub1.

These related molecules have novel functions and influence diverse biological processes. There is also cross-regulation between the various conjugation pathways since some proteins can become modified by more than one UBL, and sometimes even at the same lysine residue. For instance, SUMO modification can act antagonistically to that of ubiquitination and serve to stabilize protein substrates. Proteins conjugated to UBLs are typically not targeted for degradation by the proteasome, but rather function in diverse regulatory activities. Attachment of UBLs might alter substrate conformation, affect the affinity for ligands or other interacting molecules, alter substrate localization and influence protein stability.

UBLs are structurally similar to ubiquitin and are processed, activated, conjugated and released from conjugates by enzymatic steps that are similar to the corresponding mechanisms for ubiquitin. UBLs are also translated with C-terminal extensions that are processed to expose the invariant C-terminal GG motif. These modifiers have their own specific E1 (activating), E2 (conjugating) and E3 (ligating) enzymes that conjugate the UBLs to intracellular targets. These conjugates can be reversed by UBL-specific isopeptidases that have similar mechanisms to that of the deubiquitinating enzymes.

Thus UBLs play a central function in many cellular processes and can therefore be deregulated, such a deregulation being involved in many diseases and syndromes.

Therefore, there is a need to control ubiquitin and UBLs modifications, and to evaluate abnormal variations.

However, to date, global evaluation of ubiquitin and UBLs modifications, either as the result of a disease, or further to the treatment with inhibitors, is not easy to carry out. Indeed, the existing techniques quantify the level of modification of individual proteins and not directly the activity of the enzymes.

Therefore, there is a need to provide a method allowing to monitor the activity of the enzymes involved in ubiquitin and UBLs modification.

SUMMARY

One aim of the invention is to propose such a method and kit liable to carry out such a method.

The invention relates to a method for quantifying the activity of the proteins or enzymes involved in the conjugation of the SUMO/Ubiquitin/Nedd8 proteins in a cell of a biological sample, said method comprising:
a) a step of contacting a cellular extract of at least a cell with each protein of a subgroup of at least 3 proteins chosen among a group of 10 proteins, said group of 10 proteins belonging to a set of 46 proteins;
said at least 3 proteins being immobilised on a support,
said at least 3 proteins being substantially not conjugated by SUMO/Ubiquitin/Nedd8 proteins before their contact with said cellular extract,
wherein said at least 3 proteins corresponds to the proteins consisting essentially or consisting of the sequences SEQ ID NO: 1 to 3, wherein said 10 proteins corresponds to the proteins consisting essentially or consisting of the sequences SEQ ID NO: 1 to 10, and wherein said group of 46 proteins corresponds to the proteins consisting essentially or consisting of the sequences SEQ ID NO: 1 to 46,
wherein SEQ ID NO: 1 corresponds to ZMYM5 protein; SEQ ID NO: 2 corresponds to BEAN protein and SEQ ID NO: 3 corresponds to OTUD6B, and
b) a step of simultaneously measuring ubiquitination, SUMOylation and NEDDylation level of each of said at least 3 proteins to obtain a first value for ubiquitin, SUMO and Nedd8.

The invention will be better explained and illustrated in view of the following figures and examples.

BRIEF DESCRIPTION OF THE DRAWINGS

FIG. 1 represents a graph showing the modification of SUMOylation activity in cells treated with UBC9 shRNA (B, C and D) versus cells treated with a control shRNA (A). Y-axis represents the amount of UBC9 mRNA relative to control amount. N.S.: not significant. **: $p<0.01$ FIG. 2 represents a graph showing SUMOylation activity on ZMYM5 protein, in cells treated with UBC9 shRNA (B, C and D) versus cells treated with a control shRNA (A). A cell extract was also treated with NEM (N-Ethylmaleimide) to inhibit all SUMO conjugation (negative control) (N) Y-axis represents the amount of SUMO on ZMYM5. N.S.: not significant. *: $p<0.05$**: $p<0.01$ FIG. 3 represents a graph showing Ubiquitinylation activity on BIRC7 protein, in cells treated with UBC9 shRNA (B, C and D) versus cells treated with a control shRNA (A). A cell extract was also treated with NEM (N-Ethylmaleimide) to inhibit all SUMO conjugation (negative control) (N) Y-axis represents the amount of Ubiquitin on BIRC7. N.S.: not significant. *: $p<0.05$**: $p<0.01$ FIG. 4 represents western blots results of cells extracts treated with UBC9 shRNA (B, B', C, C', D and D') versus control cell extracts (A, A'). Blots were labelled with anti-SUMO1 (A) and anti-SUMO2 (B) antibodies.

FIG. 5 represents a graph showing SUMOylation activity modulation on ZMYM5 protein in HL60 cells extract of cells treated with anacardic acid (C) or 2D08 (D) versus extracts of cells treated with dimethylsulfoxide (DMSO-B) or of N-ethylmaleimide (NEM) treated cells (negative control) (A). Y-axis represents the amount of SUMO on ZMYM5. N.S.: not significant. *: $p<0.05$ FIG. 6 represents immunoblots of cells extracts corresponding to cells treated with DMSO (A), with anacardic acid (B) or 2D08 (C) inhibitors, labelled with anti-SUMO1 antibody. 1. represents SUMOylated proteins and 2. represents free SUMO.

FIG. 7 represents a graph showing the NEDDylation activity modulation on cell extracts of HL60 treated with MLN4924 inhibitor (C) versus cell extracts of cells treated with DMSO (B) or N-ethylmaleimide (NEM) treated cells (A).

FIG. 8 represents graphs evaluating Ubiquitin addition on beads coated with TMEM92 (1), BEAN1 (2), WBP2 (3) proteins, SUMO1 addition on beads coated with ZMYM5 (4) or NEDD8 addition on beads coated with OTUD6B (5). HL60 cells were treated for 6 h with 0 (B), 5 (C), 10 (D), 50 (E), 100 (F) and 500 nM (G) MLN7243. As control, cell extracts treated N-ethylmaleimide (NEM) are used (A).

FIG. 9 represents graphs showing the fluorescence level of 10 proteins coated on fluorescent beads, incubated with SUMO1 (A), SUMO2 (B), Ubiquitin (C) or NEDD8 (D), and contacted with cellular extracts. 1. represents ZMYM5 protein (SEQ ID NO: 1); 2. represents BEAN protein (SEQ ID NO: 2) and 3. represents OTUD6B protein (SEQ ID NO: 3). Y-axis represents cell count and X-axis represents fluorescence intensity (arbitrary units). T represent control beads (without treatment with cell extracts).

DETAILED DESCRIPTION

The invention is based on the unexpected observation made by the inventors that evaluation of the modifications by Ubiquitin, SUMO and NEDD8 of at least 3 specific proteins belonging to a group of 46 proteins is highly significant to measure the activity of said pathways and to monitor the effect of drugs targeting these pathways.

Indeed, the inventors made the observation that assessing the modifications induced by addition of Ubiquitin and/or SUMO and/or NEDD8 on said 3 proteins provides a good information on the activity of the specific enzymes involved in their conjugation and the ability of a compound to modify Ubl pathways.

By using purified determined proteins (said at least 3 proteins) that are modified by neither ubiquitin, nor by SUMO, nor by NEDD8, the inventors are able to easily quantify the activity of the SUMO/Ubiquitin/Nedd8 pathway.

Moreover if the cellular extract that is used to determine the activity of the proteins/enzymes involved in the conjugation of the SUMO/Ubiquitin/Nedd8 proteins is in a determined state liable to modify such activity (for instance treated with a drug or a compound, placed in a specific environment, placed at a determined temperature and/or pressure), it is then relevant to compare the level of modification with the level of modification of cells that are not placed in this determined state, i.e. control cells.

Ubiquitin (Ub) is a globular protein consisting of 76 amino acid residues, and the UPS (ubiquitin-proteasome system) is responsible for degrading 80-90% of intracellular proteins. Ub binds the lysine residues of target proteins by a series of enzymes including the ubiquitin-activating enzyme E1, ubiquitin-conjugating enzyme E2 and the ubiquitin E3 ligases. Subsequently, these ubiquitylated proteins are generally recognized and degraded by the 26S proteasome.

The structures of all three SUMO1, SUMO2 and SUMO3 paralogues resemble the globular and compact Ub-like fold. The differences of SUMO1 and SUMO2 are mostly found in the second β-strand and the α-helix of both proteins. In cells, different SUMO paralogues appear to share common properties but also have some distinct functions. For example, the promyelocytic leukemia protein is conjugated to all three SUMO paralogs, whereas RanGAP1 is preferentially modified with SUMO1 and topoisomerase II with SUMO2/3 during mitosis. Furthermore, although both SUMO1 and SUMO2/3 are mostly found in the nucleoplasm, SUMO1 is uniquely found within the nucleoli, the nuclear envelope, and cytoplasmic foci, whereas SUMO2/3 are accrued on chromosomes at an earlier point in the nuclear reformation process. Interestingly, there is a larger pool of free, non-conjugated SUMO2/3 than of SUMO1.

NEDD8 is an 81-amino acid protein with 9 kDa relative molecular mass and is 60% identical and 80% homologous to ubiquitin. NEDD8 has a dedicated E1-activating enzyme (AppBp1/UBA3, or NAE) and E2-conjugating enzymes (UBC12, UBE2F) and is essential for the enzymatic activity of the CRL family of E3 ligases, through conjugation to the cullin scaffold. Other components of the neddylation pathway include DEN1, which processes NEDD8 to its mature, 76-amino acid form, and the COP9 signalosome complex, which is responsible for removing NEDD8 from cullin proteins. CAND1 (cullin-associated and neddylation-dissociated) is an additional component that regulates CRL complex assembly by binding to the cullin in the absence of NEDD8 activation.

In the invention, the set of 46 protein (i.e. the set consisting of the 46 proteins) is constituted by the following proteins:

TABLE 1

| Name | SEQ ID | Sequence |
|---|---|---|
| ZMYM5 | 1 | MEKCSVGGLE LTEQTPALLG NMAMATSLMD IGDSFGHPAC PLVSRSRNSP VEDDDDDDDV VFIESIQPPS ISAPAIADQR NFIFASSKNE KPQGNYSVIP PSSRDLASQK GNISETIVID DEEDVETNGG AEKKSSFFIE WGLPGTKNKT NDLDFSTSSL SRSKTKTGVR PFNPGRMNVA GDLFQNGEFA THHSPEMHLQ RRLMSFFQ |
| BEAN | 2 | MRYACSSSED WPPPLDISSD GDVDATVLRE LYPDSPPGYE ECVGPGATQL YVPTDAPPPY SLTDSCPTLD GTSDSGSGHS PGRHQQEQRT PAQGGLHTVS MDTLPPYEAV CGAGPPSGLL PLPGPDPGPR GSQGSPTPTR APASGPERIV |
| OTUD6B | 3 | MEAVLTEELD EEEQLLRRHR KEKKELQAKI QGMKNAVPKN DKKRRKQLTE DVAKLEKEME QKHREELEQL KLTTKENKID SVAVNISNLV LENQPPRISK AQKRREKKAA LEKEREERIA EAEIENLTGA RHMESEKLAQ ILAARQLEIK QIPSDGHCMY KAIEDQLKEK DCALTVVALR SQTAEYMQSH VEDFLPFLTN PNTGDMYTPE EFQKYCEDIV NTAAWGGQLE LRALSHILQT PIEIIQADSP PIIVGEEYSK KPLILVYMRH AYGLGEHYNS VTRLVNIVTE NCS |

TABLE 1-continued

| Name | SEQ ID | Sequence |
|---|---|---|
| ANKRD39 | 4 | MATPRPCADG PCCSHPSAVL GVQQTLEEMD FERGIWSAAL NGDLGRVKHL IQKAEDPSQP DSAGYTALHY ASRNGHYAVC QFLLESGAKC DAQTHGGATA LHRASYCGHT EITRLLLSHG SNPRVVDDDG MTSLHKAAER GHGDICSLLL QHSPALKAIR DRKARLACDL LPCNSDLRDL LSS |
| LDLRAD3 | 5 | MWLLGPLCLL LSSAAESQLL PGNNFTNECN IPGNFMCSNG RCIPGAWQCD GLPDCFDKSD EKECPKAKSK CGPTFFPCAS GIHCIIGRFR CNGFEDCPDG SDEENCTANP LLCSTARYHC KNGLCIDKSF ICDGQNNCQD NSDEESCESS QEPGSGQVFV TSENQLVYYP SITYAIIGSS VIFVLVVALL ALVLHHQRKR NNLMTLPVHR LQHPVLLSRL VVLDHPHHCN VTYNVNNGIQ YVASQAEQNA SEVGSPPSYS EALLDQRPAW YDLPPPPYSS DTESLNQADL PPYRSRSGSA NSASSQAASS LLSVEDTSHS PGQPGPQEGT AEPRDSEPSQ GTEEV |
| MXI1 | 6 | MERVKMINVQ RLLEAAEFLE RRERECEHGY ASSFPSMPSP RLQHSKPPRR LSRAQKHSSG SSNTSTANRS THNELEKNRR AHLRLCLERL KVLIPLGPDC TRHTTLGLLN KAKAHIKKLE EAERKSQHQL ENLEREQRFL KWRLEQLQGP QEMERIRMDS IGSTISSDRS DSEREEIEVD VESTEFSHGE VDNISTTSIS DIDDHSSLPS IGSDEGYSSA SVKLSFTS |
| OTUB2 | 7 | MVYEKYTGSV GGTHDMICEY HHLCQTSLQG IPVSQLKGVN GHTHSLDDAL AVLRGCKVGS GPSS |
| TMEM92 | 8 | MSQAWVPGLA PTLLFSLLAG PQKIAAKCGL ILACPKGFKC CGDSCCQENE LFPGPVRIFV IIFLVILSVF CICGLAKCFC RNCREPEPDT PVDCRGPLEL PSIIPPERVR VSLSAPPPPY SEVILKPSLG PTPTEPPPPY SFRPEEYTGD QRGIDNPAF |
| UBE3A | 9 | MATACKRSGE PQSDDIEASR MKRAAAKHLI ERYYHQLTEG CGNEACTNEF CASCPTFLRM DNNAAAIKAL ELYKINAKLC DPHPSKKGAS SAYLENSKGA PNNSCSEIKM NKKGARIDFK DVTYLTEEKV YEILELCRER EDYSPLIRVI GRVFSSAEAL VQSFRKVKQH TKEELKSLQA KDEDKDEDEK EKAACSAAAM EEDSEASSSR IGDSSQGDNN LQKLGPDDVS VDIDAIRRVY TRLLSNEKIE TAFLNALVYL SPNVECDLTY HNVYSRDPNY LNLFIIVMEN RNLHSPEYLE MALPLFCKAM SKLPLAAQGK LIRLWSKYNA DQIRRMMETF QQLITYKVIS NEFNSRNLVN DDDAIVAASK CLKMVYYANV VGGEVDTNHN EEDDEEPIPE SSELTLQELL GEERRNKKGP RVDPLETELG VKTLDCRKPL IPFEEFINEP LNEVLEMDKD YTFFKVETEN KFSFMTCPFI LNAVTKNLGL YYDNRIRMYS ERRITVLYSL VQGQQLNPYL RLKVRRDHII DDALVRLEMI AMENPADLKK QLYVEFEGEQ GVDEGGVSKE FFQLVVEEIF NPDIGMFTYD ESTKLFWFNP SSFETEGQFT LIGIVLGLAI YNNCILDVHF PMVVYRKLMG KKGTFRDLGD SHPVLYQSLK DLLEYEGNVE DDMMITFQIS QTDLFGNPMM YDLKENGDKI PITNENRKEF VNLYSDYILN KSVEKQFKAF RRGFHMVTNE SPLKYLFRPE EIELLICGSR NLGFQALEET TEYDGGYTRD SVLIREFWEI VHSFTDEQKR LFLQFTTGTD RAPVGGLGKL KMIIAKNGPD TERLPTSHTC FNVLLLPEYS SKEKLKERLL KAITYAKGFG ML |
| WBP2 | 10 | MALNKNHSEG GGVIVNNTES ILMSYDHVEL TFNDMKNVPE AFKGTKKGTV YLTPYRVIFL SKGKDAMQSF MMPFYLMKDC EIKQPVFGAN YIKGTVKAEA GGGWEGSASY KLTFTAGGAI EFGQRMLQVA SQASRGEVPS GAYGYSYMPS GAYVYPPPVA NGMYPCPPGY PYPPPPPEFY PGPPMMDGAM GYVQPPPPPY PGPMEPPVSG PDVPSTPAAE AKAAEAAASA YYNPGNPHNV YMPTSQPPPP PYYPPEDKKT Q |
| ARRDC3 | 11 | MGRVQLFEIS LSHGRVVYSP GEPLAGTVRV RLGAPLPFRA IRVTCIGSCG VSNKANDTAW VVEEGYFNSS LSLADKGSLP AGEHSFPFQF LLPATAPTSF EGPFGKIVHQ VRAAIHTPRF SKDHKCSLVF YILSPLNLNS IPDIEQPNVA SATKKFSYKL VKTGSVVLTA STDLRGYVVG QALQLHADVE NQSGKDTSPV VASLLQKVSY KAKRWIHDVR TIAEVEGAGV KAWRRAQWHE QILVPALPQS ALPGCSLIHI DYYLQVSLKA PEATVTLPVF IGNIAVNHAP VSPRPGLGLP PGAPPLVVPS APPQEEAEAE AAAGGPHFLD PVFLSTKSHS QRQPLLATLS SVPGAPEPCP QDGSPASHPL HPPLCISTGA TVPYFAEGSG GPVPTTSTLI LPPEYSSWGY PYEAPPSYEQ SCGGVEPSLT PES |
| ARRDC3 | 12 | MVLGKVKSLT ISFDCLNDSN VPVYSSGDTV SGRVNLEVTG EIRVKSLKIH ARGHAKVRWT ESRNAGSNTA YTQNYTEEVE YFNHKDILIG HERDDDNSEE GFHTIHSGRH EYAFSFELPQ |

TABLE 1-continued

| Name | SEQ ID | Sequence |
|---|---|---|
| | | TPLATSFEGR HGSVRYWVKA ELHRPWLLPV KLKKEFTVFE<br>HIDINTPSLL SPQAGTKEKT LCCWFCTSGP ISLSAKIERK<br>GYTPGESIQI FAEIENCSSR MVVPKAAIYQ TQAFYAKGKM<br>KEVKQLVANL RGESLSSGKT ETWNGKLLKI PPVSPSILDC<br>SIIRVEYSLM VYVDIPGAMD LFLNLPLVIG TIPLHPFGSR<br>TSSVSSQCSM NMNWLSLSLP ERPEAPPSYA EVVTEEQRRN<br>NLAPVSACDD FERALQGPLF AYIQEFRFLP PPLYSEIDPN<br>PDQSADDRPS CPSR |
| ANKRD13D | 13 | MSCGRLGRFK ATLWLSEEHP LSLGDQVTPI IDLMAISNAH<br>FAKLRDFITL RLPPGFPVKI EIPLFHVLNA RITFSNLCGC<br>DEPLSSWVP APSSAVAASG NPFPCEVDPT VFEVPNGYSV<br>LGMERNEPLR DEDDDLLQFA IQQSLLEAGT EAEQVTVWEA<br>LTNTRPGARP PPQATVYEEQ LQLERALQES LQLSTEPRGP<br>GSPPRTPPAP GPPSFEEQLR LALELSSREQ EERERRGQQE<br>EEDLQRILQL SLTEH |
| BIRC6 | 14 | MTFNSFEGSK TCVPADINKE EEFVEEFNRL KTFANFPSGS<br>PVSASTLARA GFLYTGEGDT VRCFSCHAAV DRWQYGDSAV<br>GRHRKVSPNC RFINGFYLEN SATQSTNSGI QNGQYKVENY<br>LGSRDHFALD RPSETHADYL LRTGQVVDIS DTIYPRNPAM<br>YSEEARLKSF QNWPDYAHLT PRELASAGLY YTGIGDQVQC<br>FCCGGKLKNW EPCDRAWSEH RRHFPNCFFV LGRNLNIRSE<br>SDAVSSDRNF PNSTNLPRNP SMADYEARIF TFGTWIYSVN<br>KEQLARAGFY ALGEGDKVKC FHCGGGLTDW KPSEDPWEQH<br>AKWYPGCKYL LEQKGQEYIN NIHLTHSLEE CLVRTTEKTP<br>SLTRRIDDTI FQNPMVQEAI RMGFSFKDIK KIMEEKIQIS<br>GSNYKSLEVL VADLVNAQKD SMQDESSQTS LQKEISTEEQ<br>LRRLQEEKLC KICMDRNIAI VFVPCGHLVT CKQCAEAVDK<br>CPMCYTVITF KQKIFMS |
| BIRC8 | 15 | MGPKDSAKCL HRGPQPSHWA AGDGPTQERC GPRSLGSPVL<br>GLDTCRAWDH VDGQILGQLR PLTEEEEEEG AGATLSRGPA<br>FPGMGSEELR LASFYDWPLT AEVPPELLAA AGFFHTGHQD<br>KVRCFFCYGG LQSWKRGDDP WTEHAKWFPS CQFLLRSKGR<br>DFVHSVQETH SQLLGSWDPW EEPEDAAPVA PSVPASGYPE<br>LPTPRREVQS ESAQEPGGVS PAEAQRAWWV LEPPGARDVE<br>AQLRRLQEER TCKVCLDRAV SIVFVPCGHL VCAECAPGLQ<br>LCPICRAPVR SRVRTFLS |
| C18orf1 | 16 | MPEAGFQATN AFTECKFTCT SGKCLYLGSL VCNQQNDCGD<br>NSDEENCLLV TEHPPPGIFN SELEFAQIII IVVVVTVMVV<br>VIVCLLNHYK VSTRSFINRP NQSRRREDGL PQEGCLWPSD<br>SAAPRLGASE IMHAPRSRDR FTAPSFIQRD RFSRFQPTYP<br>YVQHEIDLPP TISLSDGEEP PPYQGPCTLQ LRDPEQQMEL<br>NRESVRAPPN RTIFDSDLID IAMYSGGPCP PSSNSGISAS<br>TCSSNGRMEG PPPTYSEVMG HHPGASFLHH QRSNAHRGSR<br>LQFQQNNAES TIVPIKGKDR KPGNLV |
| C9orf74 | 17 | MQNRTGLILC ALALLMGFLM VCLGAFFISW GSIFDCQGSL<br>IAAYLLLPLG FVILLSGIFW SNYRQVTESK GVLRHMLRQH<br>LAHGALPVAT VDRPDFYPPA YEESLEVEKQ SCPAEREASG<br>IPPPLYTETG LEFQDGNDSH PEAPPSYRES IAGLWTAIS<br>EDAQRRGQEC |
| CUEDC1 | 18 | MTSLFRRSSS GSGGGGTAGA RGGGGGTAAP QELNNSRPAR<br>QVRRLEFNQA MDDFKTMFPN MDYDIIECVL RANSGAVDAT<br>IDQLLQMNLE GGGSSGGVYE DSSDSEDSIP PEILERTLEP<br>DSSDEEPPPV YSPPAYHMHV FDRPYPLAPP TPPPRIDALG<br>SGAPTSQRRY RNWNPPLLGN LPDDFLRILP QQLDSIQGNA<br>GGPKPGSGEG CPPAMAGPGP GDQESRWKQY LEDERIALFL<br>QNEEFMKELQ RNRDFLLALE RDRLKYESQK SKSSSVAVGN<br>DFGFSSPVPG TGDANPAVSE DALFRDKLKH MGKSTRRKLF<br>ELARAFSEKT KMRKSKRKHL LKHQSLGAAA STANLLDDVE<br>GHACDEDFRG RRQEAPKVEE GLREGQ |
| DAZAP2 | 19 | MNSKGQYPTQ PTYPVQPPGN PVYPQTLHLP QAPPYTDAPP<br>AYSELYRPSF VHPGAATVPT MSAAFPGASL YLPMAQSVAV<br>GPLGSTIPMA YYPVGPIYPP GSTVLVEGGY DAGARFGAGA<br>TAGNIPPPPP GCPPNAAQLA VMQGANVLVT QRKGNFFMGG<br>SDGGYTIW |
| DDI1 | 20 | MLITVYCVRR DLSEVTFSLQ VSPDFELRNF KVLCEAESRV<br>PVEEIQIIHM ERLLIEDHCS LGSYGLKDGD IVVLLQKDNV<br>GPRAPGRAPN QPRVDFSGIA VPGTSSSRPQ HPGQQQQRTP<br>AAQRSQGLAS GEKVAGLQGL GSPALIRSML LSNPHDLSLL<br>KERNPPLAEA LLSGSLETFS QVLMEQQREK ALREQERLRL<br>YTADPLDREA QAKIEEEIRQ QNIEENMNIA IEEAPESFGQ |

TABLE 1-continued

| Name | SEQ ID | Sequence |
|---|---|---|
| | | VTMLYINCKV NGHPLKAFVD SGAQMTIMSQ ACAERCNIMR LVDRRWAGVA KGVGTQRIIG RVHLAQIQIE GDFLQCSFSI LEDQPMDMLL GLDMLRRHQC SIDLKKNVLV IGTTGTQTYF LPEGELPLCS RMVSGQDESS DKEITHSVMD SGRKEH |
| DUS3L | 21 | MAEGTAEAPL ENGGGGDSGA GALERGVAPI KRQYLTTKEQ FHQFLEAKGQ EKTCRETEVG DPAGNELAEP EAKRIRLEDG QTADGQTEEA AEPGEQLQTQ KRARGQNKGR PHVKPTNYDK NRLCPSLIQE SAAKCFFGDR CRFLHDVGRY LETKPADLGP RCVLFETFGR CPYGVTCRFA GAHLGPEGQN LVQEELAARG TQPPSIRNGL DKALQQQLRK REVRFERAEQ ALRRFSQGPT PAAAVPEGTA AEGAPRQENC GAQQVPAGPG TSTPPSSPVR TCGPLTDEDV VRLRPCEKKR LDIRGKLYLA PLTTCGNLPF RRICKRFGAD VTCGEMAVCT NLLQGQMSEW ALLKRHQCED IFGVQLEGAF PDTMTKCAEL LSRTVEVDFV DINVGCPIDL VYKKGGGCAL MNRSTKFQQI VRGMNQVLDV PLTVKIRTGV QERVNLAHRL LPELRDWGVA LVTLHGRSRE QRYTKLADWQ YIEECVQAAS PMPLFGNGDI LSFEDANRAM QTGVTGIMIA RGALLKPWLF TEIKEQRHWD ISSSERLDIL RDFTNYGLEH WGSDTQGVEK TRRFLLEWLS FLCRYVPVGL LERLPQRINE RPPYYLGRDY LETLMASQKA ADWIRISEML LGPVPPSFAF LPKHKANAYK |
| FAM70B | 22 | MQPPVPGPLG LLDPAEGLSR RKKTSLWFVG SLLLVSVLIV TVGLAATTRT ENVTVGGYYP GIILGFGSFL GIIGINLVEN RRQMLVAAIV FISFGVVAAF CCAIVDGVFA AQHIEPRPLT TGRCQFYSSG VGYLYDVYQT EVTCHSLDGK CQLKVRSNTC YCCDLYACGS AEPSPAYYEF IGVSGCQDVL HLYRLLWASA VLNVLGLFLG IITAAVLGAF KDMVPLSQLA YGPAVPPQTL YNPAQQILAY AGFRLTPEPV PTCSSYPLPL QPCSRFPVAP SSALASSEDL QPPSPSSSGS GLPGQAPPCY APTYFPPGEK PPPYAP |
| IGHG3 | 23 | MEFGLSWVLL VVFLQGVQCE VQLVDSGGGL VQPGGSLRLS CAASGFIVSD HYVEWVRQAP GKGPEWVGCF RSKAHKSTTE YAASVKGRFT ILRDDSKNSV HLQMNSLKTD DTAVYYCVRD LEGAGKYDWY FDIWGRGILV TVSSASTKGP SVFPLAPCSR STSGGTAALG CLVKDYFPEP VTVSWNSGAL TSGVHTFPAV LQSSGLYSLS SVVTVPSSSL GTQTYTCNVN HKPSNTKVDK RVELKTPLGD TTHTCPRCPE PKSCDTPPPC PRCPEPKSCD TPPPCPRCPE PKSCDTPPPC PRCPAPELLG GPSVFLFPPK PKDTLMISRT PEVTCVVVDV SHEDPEVQFK WYVDGVEVHN AKTKPREEQF NSTFRVVSVL TVLHQDWLNG KEYKCKVSNK ALPAPIEKTI SKTKGQPREP QVYTLPPSRE EMTKNQVSLT CLVKGFYPSD IAVEWESSGQ PENNYNTTPP MLDSDGSFFL YSKLTVDKSR WQQGNIFSCS VMHEALHNRF TQKSLSLSPG K |
| KIAA0247 | 24 | MCHGRIAPKS TSVFAVASVG HGVFLPLVIL CTLLGDGLAS VCPLPPEPEN GGYICHPRPC RDPLTAGSVI EYLCAEGYML KGDYKYLTCK NGEWKPAMEI SCRLNEDKDT HTSLGVPTLS IVASTASSVA LILLLVVLFV LLQPKLKSFH HSRRDQGVSG DQVSIMVDGV QVALPSYEEA VYGSSGHCVP PADPRVQIVL SEGSGPSGRS VPREQQLPDQ GACSSAGGED EAPGQSGLCE AWGSRASETV MVHQATTSSW VAGSGNRQLA HKETADSENS DIQSLLSLTS EEYTDDIPLL KEA |
| LAPTM5 | 25 | MDPRLSTVRQ TCCCFNVRIA TTALAIYHVI MSVLLFIEHS VEVAHGKASC KLSQMGYLRI ADLISSFLLI TMLFIISLSL LIGVVKNREK YLLPFLSLQI MDYLLCLLTL LGSYIELPAY LKLASRSRAS SSKFPLMTLQ LLDFCLSILT LCSSYMEVPT YLNFKSMNHM NYLPSQEDMP HNQFIKMMII FSIAFITVLI FKVYMFKCVW RCYRLIKCMN SVEEKRNSKM LQKWLPSYE EALSLPSKTP EGGPAPPPYS EV |
| LDLRAD4 | 26 | MSSDHLNNST LKEAQFKDLF LKKAELEFAQ IIIIVVVVTV MVVVIVCLLN HYKVSTRSFI NRPNQSRRRE DGLPQIMHAP RSRDRFTAPS FIQRDRFSRF QPTYPYVQHE IDLPPTISLS DGEEPPPYQG PCTLQLRDPE QQMELNRESV RAPPNRTIFD SDLIDIAMYS GGPCPPSSNS GISASTCSSN GRMEGPPPTY SEVMGHHPGA SFLHHQRSNA HRGSRLQFQQ NNAESTIVPI KGKDRKPGNL V |
| LITAF | 27 | MSVPGPYQAA TGPSSAPSAP PSYEETVAVN SYYPTPPAPM PGPTTGLVTG PDGKGMNPPS YYTQPAPIPN NNPITVQTVY VQHPITFLDR PIQMCCPSCN KMIVSQLSYN AGALTWLSCG SLCLLGCIAG CCFIPFCVDA LQDVDHYCPN CRALLGTYKR L |

TABLE 1-continued

| Name | SEQ ID | Sequence |
|---|---|---|
| MLANA | 28 | MPREDAHFIY GYPKKGHGHS YTTAEEAAGI GILTVILGVL<br>LLIGCWYCRR RNGYRALMDK SLHVGTQCAL TRRCPQEGFD<br>HRDSKVSLQE KNCEPVVPNA PPAYEKLSAE QSPPPYSP |
| NDFIP2 | 29 | MDHHQPGTGR YQVLLNEEDN SESSAIEQPP TSNPAPQIVQ<br>AASSAPALET DSSPPPYSSI TVEVPTTSDT EVYGEFYPVP<br>PPYSVATSLP TYDEAEKAKA AAMAAAAAET SQRIQEEECP<br>PRDDFSDADQ LRVGNDIFM LAFFMAFIFN WLGFCLSFCI<br>TNTIAGRYGA ICGFGLSLIK WILIVRFSDY FTGYFNGQYW<br>LWWIFLVLGL LLFFRGFVNY LKVRNMSESM AAAHRTRYFF<br>LL |
| PMEPA1 | 30 | MAELEFVQII IIVVVMMVMV VVITCLLSHY KLSARSFISR<br>HSQGRRREDA LSSEGCLWPS ESTVSGNGIP EPQVYAPPRP<br>TDRLAVPPFA QRERFHRFQP TYPYLQHEID LPPTISLSDG<br>EEPPPYQGPC TLQLRDPEQQ LELNRESVRA PPNRTIFDSD<br>LMDSARLGGP CPPSSNSGIS ATCYGSGGRM EGPPPTYSEV<br>IGHYPGSSFQ HQQSSGPPSL LEGTRLHHTH IAPLESAAIW<br>SKEKDKQKGH PL |
| PSMD4 | 31 | MVLESTMVCV DNSEYMRNGD FLPTRLQAQQ DAVNIVCHSK<br>TRSNPENNVG LITLANDCEV LTTLTPDTGR ILSKLHTVQP<br>KGKITFCTGI RVAHLALKHR QGKNHKMRII AFVGSPVEDN<br>EKDLVKLAKR LKKEKVNVDI INFGEEEVNT EKLTAFVNTL<br>NGKDGTGSHL VTVPPGPSLA DALISSPILA GEGGAMLGLG<br>ASDFEFGVDP SADPELALAL RVSMEEQRQR QEEEARRAAA<br>ASAAEAGIAT TGTEDSDDAL LKMTISQQEF GRTGLPDLSS<br>MTEEEQIAYA MQMSLQGAEF GQAESADIDA SSAMDTSEPA<br>KEEDDYDVMQ DPEFLQSVLE NLPGVDPNNE AIRNAMGSLA<br>SQATKDGKKD KKEEDKK |
| PIAS2 | 32 | MADFEELRNM VSSFRVSELQ VLLGFAGRNK SGRKHDLLMR<br>ALHLLKSGCS PAVQIKIREL YRRRYPRTLE GLSDLSTIKS<br>SVFSLDGGSS PVEPDLAVAG IHSLPSTSVT PHSPSSPVGS<br>VLLQDTKPTF EMQQPSPPIP PVHPDVQLKN LPFYDVLDVL<br>IKPTSLVQSS IQRFQEKFFI FALTPQQVRE ICISRDFLPG<br>GRRDYTVQVQ LRLCLAETSC PQEDNYPNSL CIKVNGKLFP<br>LPGYAPPPKN GIEQKRPGRP LNITSLVRLS SAVPNQISIS<br>WASEIGKNYS MSVYLVRQLT SAMLLQRLKM KGIRNPDHSR<br>ALIKEKLTAD PDSEIATTSL RVSLMCPLGK MRLTIPCRAV<br>TCTHLQCFDA ALYLQMNEKK PTWICPVCDK KAAYESLILD<br>GLFMEILNDC SDVDEIKFQE DGSWCPMRPK KEAMKVSSQP<br>CTKIESSSVL SKPCSVTVAS EASKKKVDVI DLTIESSSDE<br>EEDPPAKRKC IFMSETQSSP TKGVLMYQPS SVRVPSVTSV<br>DPAAIPPSLT DYSVPFHHTP ISSMSSDLPG LDFLSLIPVD<br>PQYCPPMFLD SLTSPLTASS TSVTTTSSHE SSTHVSSSSS<br>RSETGVITSS GSNIPDIISL D |
| POLI | 33 | MELADVGAAA SSQGVHDQVL PTPNASSRVI VHVDLDCFYA<br>QVEMISNPEL KDKPLGVQQK YLVVTCNYEA RKLGVKKLMN<br>VRDAKEKCPQ LVLVNGEDLT RYREMSYKVT ELLEEFSPVV<br>ERLGFDENFV DLTEMVEKRL QQLQSDELSA VTVSGHVYNN<br>QSINLLDVLH IRLLVGSQIA AEMREAMYNQ LGLTGCAGVA<br>SNKLLAKLVS GVFKPNQQTV LLPESCQHLI HSLNHIKEIP<br>GIGYKTAKCL EALGINSVRD LQTFSPKILE KELGISVAQR<br>IQKLSFGEDN SPVILSGPPQ SFSEEDSFKK CSSEVEAKNK<br>IEELLASLLN RVCQDGRKPH TVRLIIRRYS SEKHYGRESR<br>QCPIPSHVIQ KLGTGNYDVM TPMVDILMKL FRNMVNVKMP<br>FHLTLLSVCF CNLKALNTAK KGLIDYYLMP SLSTTSRSGK<br>HSFKMKDTHM EDFPKDKETN RDFLPSGRIE STRTRESPLD<br>TTNFSKEKDI NEFPLCSLPE GVDQEVFKQL PVDIQEEILS<br>GKSREKFQGK GSVSCPLHAS RGVLSFFSKK QMQDIPINPR<br>DHLSSSKQVS SVSPCEPGTS GFNSSSSSYM SSQKDYSYYL<br>DNRLKDERIS QGPKEPQGFH FTNSNPAVSA FHSFPNLQSE<br>QLFSRNHTTD SHKQTVATDS HEGLTENREP DSVDEKITFP<br>SDIDPQVFYE LPEAVQKELL AEWKRAGSDF HIGHK |
| RHOBTB1 | 34 | MDADMDYERP NVETIKCVVV GDNAVGKTRL ICARACNTTL<br>TQYQLLATHV PTVWAIDQYR VCQEVLERSR DVVDEVSVSL<br>RLWDTFGDHH KDRRFAYGRS DVVVLCFSIA NPNSLNHVKS<br>MWYPEIKHFC PRTPVILVGC QLDLRYADLE AVNRARRPLA<br>RPIKRGDILP PEKGREVAKE LGLPYYETSV FDQFGIKDVF<br>DNAIRAALIS RRHLQFWKSH LKKVQKPLLQ APFLPPKAPP<br>PVIKIPECPS MGTNEAACLL DNPLCADVLF ILQDQEHIFA<br>HRIYLATSSS KFYDLFLMEC EESPNGSEGA CEKEKQSRDF<br>QGRILSVDPE EEREEGPPRI PQADQWKSSN KSLVEALGLE<br>AEGAVPETQT LTGWSKGFIG MHREMQVNPI SKRMGPMTVV |

TABLE 1-continued

| Name | SEQ ID | Sequence |
|---|---|---|
| | | RMDASVQPGP FRTLLQFLYT GQLDEKEKDL VGLAQIAEVL<br>EMFDLRMMVE NIMNKEAFMN QEITKAFHVR KANRIKECLS<br>KGTFSDVTFK LDDGAISAHK PLLICSCEWM AAMFGGSFVE<br>SANSEVYLPN INKISMQAVL DYLYTKQLSP NLDLDPLELI<br>ALANRFCLPH LVALAEQHAV QELTKAATSG VGIDGEVLSY<br>LELAQFHNAH QLAAWCLHHI CTNYNSVCSK FRKEIKSKSA<br>DNQEYFERHR WPPVWYLKEE DHYQRVKRER EKEDIALNKH<br>RSRRKWCFWN SSPAVA |
| RNF13 | 35 | MITKFVQDRH RARRNRLRKD QLKKLPVHKF KKGDEYDVCA<br>ICLDEYEDGD KLRILPCSHA YHCKCVDPWL TKTKKTCPVC<br>KQKVVPSQGD SDSDTDSSQE ENEVTEHTPL LRPLASVSAQ<br>SFGALSESRS HQNMTESSDY EEDDNEDTDS SDAENEINEH<br>DVVVQLQPNG ERDYNIANTV |
| RNF4 | 36 | MSTRKRRGGA INSRQAQKRT REATSTPEIS LEAEPIELVE<br>TAGDEIVDLT CESLEPVVVD LTHNDSVVIV DERRRPRRNA<br>RRLPQDHADS CVVSSDDEEL SRDRDVYVTT HTPRNARDEG<br>ATGLRPSGTV SCPICMDGYS EIVQNGRLIV STECGHVFCS<br>QCLRDSLKNA NTCPTCRKKI NHKRYHPIYI |
| RNF34 | 37 | MKAGATSMWA SCCGLLNEVM GTGAVRGQQS AFAGATGPFR<br>FTPNPEFSTY PPAATEGPNI VCKACGLSFS VFRKKHVCCD<br>CKKDFCSVCS VLQENLRRCS TCHLLQETAF QRPQLMRLKV<br>KDLRQYLILR NIPIDTCREK EDLVDLVLCH HGLGSEDDMD<br>TSSLNSSRSQ TSSFFTRSFF SNYTAPSATM SSFQGELMDG<br>DQTSRSGVPA QVQSEITSAN TEDDDDDDDE DDDDEEENAE<br>DRNPGLSKER VRASLSDLSS LDDVEGMSVR QLKEILARNF<br>VNYSGCCEKW ELVEKVNRLY KENEENQKSY GERLQLQDEE<br>DDSLCRICMD AVIDCVLLEC GHMVTCTKCG KRMSECPICR<br>QYVVRAVHVF KS |
| SAE2 | 38 | MALSRGLPRE LAEAVAGGRV LVVGAGGIGC ELLKNLVLTG<br>FSHIDLIDLD TIDVSNLNRQ FLFQKKHVGR SKAQVAKESV<br>LQFYPKANIV AYHDSIMNPD YNVEFFRQFI LVMNALDNRA<br>ARNHVNRMCL AADVPLIESG TAGYLGQVTT IKKGVTECYE<br>CHPKPTQRTF PGCTIRNTPS EPIHCIVWAK YLFNQLFGEE<br>DADQEVSPDR ADPEAAWEPT EAEARARASN EDGDIKRIST<br>KEWAKSTGYD PVKLFTKLFK DDIRYLLTMD KLWRKRKPPV<br>PLDWAEVQSQ GEETNASDQQ NEPQLGLKDQ QVLDVKSYAR<br>LFSKSIETLR VHLAEKGDGA ELIWDKDDPS AMDFVTSAAN<br>LRMHIFSMNM KSRFDIKSMA GNIIPAIATT NAVIAGLIVL<br>EGLKILSGKI DQCRTIFLNK QPNPRKKLLV PCALDPPNPN<br>CYVCASKPEV TVRLNVHKVT VLTLQDKIVK EKFAMVAPDV<br>QIEDGKGTIL ISSEEGETEA NNHKKLSEFG IRNGSRLQAD<br>DFLQDYTLLI NILHSEDLGK DVEFEVVGDA PEKVGPKQAE<br>DAAKSITNGS DDGAQPSTST AQEQDDVLIV DSDEEDSSNN<br>ADVSEEERSR KRKLDEKENL SAKRSRIEQK EELDDVIALD |
| TAGAP | 39 | MKLRSSHNAS KTLNANNMET LIECQSEGDI KEHPLLASCE<br>SEDSICQLIE VKKRKKVLSW PFLMRRLSPA SDFSGALETD<br>LKASLFDQPL SIICGDSDTL PRPIQDILTI LCLKGPSTEG<br>IFRRAANEKA RKELKEELNS GDAVDLERLP VHLLAVVFKD<br>FLRSIPRKLL SSDLFEEWMG ALEMQDEEDR IEALKQVADK<br>LPRPNLLLLK HLVYVLHLIS KNSEVNRMDS SNLAICIGPN<br>MLTLENDQSL SFEAQKDLNN KVKTLVEFLI DNCFEIFGEN<br>IPVHSSITSD DSLEHTDSSD VSTLQNDSAY DSNDPDVESN<br>SSSGISSPSR QPQVPMATAA GLDSAGPQDA REVSPEPIVS<br>TVARLKSSLA QPDRRYSEPS MPSSQECLES RVTNQTLTKS<br>EGDFPVPRVG SRLESEEAED PFPEEVFPAV QGKTKRPVDL<br>KIKNLAPGSV LPRALVLKAF SSSSLDASSD SSPVASPSSP<br>KRNFFSRHQS FTTKTEKGKP SREIKKHSMS FTFAPHKKVL<br>TKNLSAGSGK SQDFTRDHVP RGVRKESQLA GRIVQENGCE<br>THNQTARGFC LRPHALSVDD VFQGADWERP GSPPSYEEAM<br>QGPAARLVAS ESQTVGSMTV GSMRARMLEA HCLLPPLPPA<br>HHVEDSRHRG SKEPLPGHGL SPLPERWKQS RTVHASGDSL<br>GHVSGPGRPE LLPLRTVSES VQRNKRDCLV RRCSQPVFEA<br>DQFQYAKESY I |
| TMEM139 | 40 | MVPMHLLGRL EKPLLLLCCA SFLLGLALLG IKTDITPVAY<br>FFLTLGGFFL FAYLLVRFLE WGLRSQLQSM QTESPGPSGN<br>ARDNEAFEVP VYEEAVVGLE SQCRPQELDQ PPPYSTVVIP<br>PAPEEEQPSH PEGSRRAKLE QRRMASEGSM AQEGSPGRAP<br>INLRLRGPRA VSTAPDLQSL AAVPTLEPLT PPPAYDVCFG<br>HPDDDSVFYE DNWAPP |
| TMEM174 | 41 | MEQGSGRLED FPVNVFSVTP YTPSTADIQV SDDDKAGATL<br>LFSGIFLGLV GITFTVMGWI KYQGVSHFEW TQLLGPVLLS |

TABLE 1-continued

| Name | SEQ ID | Sequence |
|---|---|---|
| | | VGVTFILIAV CKFKMLSCQL CKESEERVPD SEQTPGGPSF<br>VFTGINQPIT FHGATVVQYI PPPYGSPEPM GINTSYLQSV<br>VSPCGLITSG GAAAAMSSPP QYYTIYPQDN SAFVVDEGCL<br>SFTDGGNHRP NPDVDQLEET QLEEEACACF SPPPYEEIYS<br>LPR |
| TMEM55B | 42 | MAADGERSPL LSEPIDGGAG GNGLVGPGGS GAGPGGGLTP<br>SAPPYGAAFP PFPEGHPAVL PGEDPPPYSP LTSPDSGSAP<br>MITCRVCQSL INVEGKMHQH VVKCGVCNEA TPIKNAPPGK<br>KYVRCPCNCL LICKVTSQRI ACPRPYCKRI INLGPVHPGP<br>LSPEPQPMGV RVICGHCKNT FLWTEFTDRT LARCPHCRKV<br>SSIGRRYPRK RCICCFLLGL LLAVTATGLA FGTWKHARRY<br>GGIYAAWAFV ILLAVLCLGR ALYWACMKVS HPVQNFS |
| TMEPAI | 43 | MHRLMGVNST AAAAAGQPNV SCTCNCKRSL FQSMEITELE<br>FVQIIIIVVV MMVMVVVITC LLSHYKLSAR SFISRHSQGR<br>RREDALSSEG CLWPSESTVS GNGIPEPQVY APPRPTDRLA<br>VPPFAQRERF HRFQPTYPYL QHEIDLPPTI SLSDGEEPPP<br>YQGPCTLQLR DPEQQLELNR ESVRAPPNRT IFDSDLMDSA<br>RLGGPCPPSS NSGISATCYG SGGRMEGPPP TYSEVIGHYP<br>GSSFQHQQSS GPPSLLEGTR LHHTHIAPLE SAAIWSKEKD<br>KQKGHPL |
| UBE2I | 44 | MSGIALSRLA QERKAWRKDH PFGFVAVPTK NPDGTMNLMN<br>WECAIPGKKG TPWEGGLFKL RMLFKDDYPS SPPKCKFEPP<br>LFHPNVYPSG TVCLSILEED KDWRPAITIK QILLGIQELL<br>NEPNIQDPAQ AEAYTIYCQN RVEYEKRVRA QAKKFAPS |
| UNQ846 | 45 | MSRSRLFSVT SAISTIGILC LPLFQLVLSD LPCEEDEMCV<br>NYNDQHPNGW YIWILLLLVL VAALLCGAVV LCLQCWLRRP<br>RIDSHRRTMA VFAVGDLDSI YGTEAAVSPT VGIHLQTQTP<br>DLYPVPAPCF GPLGSPPPYE EIVKTT |
| ZNF364 | 46 | MAEASAAGAD SGAAVAAHRF FCHFCKGEVS PKLPEYICPR<br>CESGFIEEVT DDSSFLGGGG SRIDNTTTTH FAELWGHLDH<br>TMFFQDFRPF LSSSPLDQDN RANERGHQTH TDFWGARPPR<br>LPLGRRYRSR GSSRPDRSPA IEGILQHIFA GFFANSAIPG<br>SPHPFSWSGM LHSNPGDYAW GQTGLDAIVT QLLGQLENTG<br>PPPADKEKIT SLPTVTVTQE QVDMGLECPV CKEDYTVEEE<br>VRQLPCNHFF HSSCIVPWLE LHDTCPVCRK SLNGEDSTRQ<br>SQSTEASASN RFSNDSQLHD RWTF |

In the above mentioned method, the at least 3 proteins as set forth in SEQ ID NO: 1 to 3 are deposited on a support and then contacted with a cell extract of cells to be compared (e.g, cells that were treated or not with a compound liable to inhibit UBL pathways).

With this method, the inventors evaluate specifically the modifications by Ubiquitin/SUMO/NEDD8 of the proteins SEQ ID NO: 1 to 3, and not all the proteins contained in the cell extract.

During the period of contact, the enzymes responsible of the addition of Ubiquitin/SUMO/NEDD8 contained in the extract will modify the proteins SEQ ID NO: 1 to 3. The Ubiquitination, SUMOylation and NEDDylation amount will therefore depend upon the activity of the enzymes, and is directly correlated to the effect of the condition to be analyzed (cell type, inhibitor . . . ).

Further to the contacting between the proteins and the cellular extract, modifications by Ubiquitin/SUMO/NEDD8 are measured by means of immunological techniques using specific antibodies directed against either Ubiquitin, or SUMO, or NEDD8.

For instance, the proteins which are modified by ubiquitin and/or SUMO and/or NEDD8 proteins will therefore interact with antibodies directed against ubiquitin and/or SUMO and/or NEDD8 proteins to form a molecular complex. The complexes can be detected by secondary antibodies that recognize (and interact with) constant part FC chain of said antibodies directed against ubiquitin and/or SUMO and/or NEDD8 proteins.

Said complex can be identified when the secondary antibodies are labeled with reporter molecule, such as fluorescent protein, peroxidase, fluorescent dyes etc. . . .

The skilled person knows how to quantify the complexes protein/anti ubiquitin, anti SUMO or anti NEDD8 antibodies, in particular by using flow cytometers.

Then a value of modification is obtained for each protein SEQ ID NO: 1 to 3, for each of Ubiquitin, SUMO and NEDD8.

It is to be noted that protein SEQ ID NO: 1 can be modified by SUMO1 and SUMO2, whereas protein SEQ ID NO: 2 is modified preferably by Ubiquitin and protein SEQ ID NO: 3 can be modified by NEDD8.

It is therefore possible, when assessing said at least proteins, to determine UBL pathway activity without interference and to obtain a quantitative activity of the UBL pathways in a cell.

FIG. 9 shows the specificity of these proteins.

Advantageously, the invention relates to the above described method, wherein said method comprises a step of contacting a cellular extract with each protein of a group of 10 proteins, said group of 10 proteins belonging to a set of 46 proteins.

In other words, the invention advantageously relates to the above mentioned method, said method comprising
a) a step of contacting a cellular extract of cell with each protein of a subgroup of at least 10 proteins chosen among a set of 46 proteins;

said at least 3 proteins being immobilised on a support,
said at least 10 proteins being substantially not conjugated by SUMO/Ubiquitin/Nedd8 proteins before their contact with said cellular extract,
wherein said 10 proteins corresponds to the proteins consisting essentially or consisting of the sequences SEQ ID NO: 1 to 10, and wherein said set of 46 proteins corresponds to the proteins consisting essentially or consisting of the sequences SEQ ID NO: 1 to 46,
and
b) a step of simultaneously measuring ubiquitination, SUMOylation and NEDDylation level of each of said at least 3 proteins to obtain a first value for ubiquitin, SUMO and Nedd8.

More advantageously, the invention relates to the method as defined above, wherein said method comprises a step of contacting a cellular extract with each protein of said set of 46 proteins.

In other words, the invention advantageously relates to the above mentioned method, said method comprising
a) a step of contacting a cellular extract of cell with each protein of a 46 proteins;
said at 46 proteins being immobilised on a support,
said 46 proteins being substantially not conjugated by SUMO/Ubiquitin/Nedd8 proteins before their contact with said cellular extract,
said set of 46 proteins corresponds to the proteins consisting essentially or consisting of the sequences SEQ ID NO: 1 to 46,
b) a step of simultaneously measuring ubiquitination, SUMOylation and NEDDylation level of each of said 46 proteins to obtain a first value for ubiquitin, SUMO and Nedd8;

More advantageously, the invention relates to the method as defined above, wherein said at least 3 proteins are supported by beads.

Advantageously, the invention relates to the method as defined above, wherein said beads are fluorescent beads.

Advantageously, the invention relates to the method as defined above, wherein each of said at least 3 protein is supported by a determined bead having a fluorescent property which is different from the fluorescent properties of the other beads, and wherein all the beads having the same fluorescent property supporting the same protein.

For example, the method can be performed with the XMap technology developed by Luminex. It consists in uniquely colored Mag-Plex metal-based microsphere (500 different colors with variable levels of two different dyes). They can be coupled with specific proteins using carboiimide coupling techniques. Protein-coupled beads can be multiplexed and used with cellular extracts as described in the examples thereafter. The different beads can be distinguished using dedicated analyzer or a flow cytometer.

Proteins according to the invention are grafted covalently on the fluorescent beads by any means well known in the art.

In one aspect, the invention relates to a method for quantifying the activity of the proteins/enzymes involved identifying the effect of a drug on protein modification by the conjugation of the SUMO/Ubiquitin/Nedd8 proteins in a cell of a biological sample, for example to identify the effect of a drug on UBL protein modification, said method comprising
a) a step of contacting a cellular extract to be tested (e.g. of cell treated with said drug), with each protein of a subgroup of at least 3 proteins chosen among a group of 10 proteins, said group of 10 proteins belonging to a set of 46 proteins;
said at least 3 proteins being immobilised on a support,
said at least 3 proteins being substantially not conjugated by SUMO/Ubiquitin/Nedd8 proteins before their contact with said cellular extract,
wherein said at least 3 proteins corresponds to the proteins consisting essentially or consisting of the sequences SEQ ID NO: 1 to 3, wherein said 10 proteins corresponds to the proteins consisting essentially or consisting of the sequences SEQ ID NO: 1 to 10, and wherein said group of 46 proteins corresponds to the proteins consisting essentially or consisting of the sequences SEQ ID NO: 1 to 46,
wherein SEQ ID NO: 1 corresponds to ZMYM5 protein; SEQ ID NO: 2 corresponds to BEAN protein and SEQ ID NO: 3 corresponds to OTUD6B,
b) a step of simultaneously measuring ubiquitination, SUMOylation and NEDDylation level of each of said at least 3 proteins to obtain a first value for ubiquitin, SUMO and Nedd8;
c) a step of comparing the first value obtained at the previous step to a second value of ubiquitination, sumoylation and neddylation of said at least 3 proteins obtained when said at least proteins are contacted with said control cellular extract (e.g., of cell that was not treated with said drug); to obtain a ratio between the first value and the second value; and
d) a step of determining that
i—If the ratio of ubiquitination, sumoylation and neddylation of each of said at least 3 proteins is not significantly different to 1, then said tested drug condition (e.g. drug treatment) has no effect on protein modification by SUMO/Ubiquitin/Nedd8 proteins, and
ii—If the ratio of ubiquitination, sumoylation and neddylation of at least one of said at least 3 proteins is significantly lower or higher than 1, then said tested drug condition (e.g. drug treatment) affects protein modification by SUMO/Ubiquitin/Nedd8 proteins.

Advantageously, the invention advantageously relates to the above mentioned method, said method comprising
a) a step of contacting a cellular extract to be tested (e.g of cell treated with said drug), with each protein of a subgroup of at least 10 proteins of a group, said group of 10 proteins belonging to a set of 46 proteins;
said at least 10 proteins being immobilised on a support,
said at least 10 proteins being substantially not conjugated by SUMO/Ubiquitin/Nedd8 proteins before their contact with said cellular extract,
wherein said 10 proteins corresponds to the proteins consisting essentially or consisting of the sequences SEQ ID NO: 1 to 10, and wherein said group of 46 proteins corresponds to the proteins consisting essentially or consisting of the sequences SEQ ID NO: 1 to 46,
b) a step of simultaneously measuring ubiquitination, sumoylation and neddylation level of each of said at least 10 proteins to obtain a first value for ubiquitin, SUMO and Nedd8;
c) a step of comparing the first value obtained at the previous step to a second value of ubiquitination, sumoylation and neddylation of said at least 10 proteins obtained when said at least proteins are contacted with said control cellular extract (e.g of cell that was not treated with said drug); to obtain a ratio between the first value and the second value; and d) a step of determining that
   i. If the ratio of ubiquitination, sumoylation and neddylation of each of said at least 10 proteins is not significantly different to 1, then said tested condition (e.g. drug treatment) drug has no effect on protein modification by SUMO/Ubiquitin/Nedd8 proteins, and
   ii. If the ratio of ubiquitination, sumoylation and neddylation of at least one of said at least 10 proteins is significantly lower or higher than 1, then said tested drug condition (e.g. drug treatment) affects protein modification by SUMO/Ubiquitin/Nedd8 proteins.

More advantageously, the invention relates to the above mentioned method, said method comprising
   a) a step of contacting a cellular extract of cell to be tested (e.g treated with said drug), with each protein set of 46 proteins;
   said 46 proteins being immobilised on a support, said 46 proteins being substantially not conjugated by SUMO/Ubiquitin/Nedd8 proteins before their contact with said cellular extract,
   wherein said 46 consisting essentially or consisting of the sequences SEQ ID NO: 1 to 46,
   b) a step of simultaneously measuring ubiquitination, sumoylation and neddylation level of each of said 46 proteins to obtain a first value for ubiquitin, SUMO and Nedd8;
   c) a step of comparing the first value obtained at the previous step to a second value of ubiquitination, sumoylation and neddylation of said 46 proteins obtained when said at least proteins are contacted with said control cellular extract (e.g. of cell that was not treated with said drug); to obtain a ratio between the first value and the second value; and
   d) a step of determining that
      i. If the ratio of ubiquitination, sumoylation and neddylation of each of said 46 proteins is not significantly different to 1, then said tested condition (e.g. drug treatment) has no effect on protein modification by SUMO/Ubiquitin/Nedd8 proteins, and
      ii. If the ratio of ubiquitination, sumoylation and neddylation of at least one of said 46 proteins is significantly lower or higher than 1, then said tested condition (e.g. drug treatment) affects protein modification by SUMO/Ubiquitin/Nedd8 proteins.

The invention relates to a method for identifying the effect of a drug on protein modification by the SUMO/Ubiquitin/Nedd8 proteins in a cell of a biological sample, said method comprising
   a) a step of contacting a cellular extract of cell treated with said drug, with each protein of a subgroup of at least 3 proteins chosen among a group of 10 proteins, said group of 10 proteins belonging to a set of 46 proteins;
   said at least 3 proteins being immobilised on a support, said at least 3 proteins being substantially not conjugated by SUMO/Ubiquitin/Nedd8 proteins before their contact with said cellular extract,
   wherein said at least 3 proteins corresponds to the proteins consisting essentially or consisting of the sequences SEQ ID NO: 1 to 3, wherein said 10 proteins corresponds to the proteins consisting essentially or consisting of the sequences SEQ ID NO: 1 to 10, and wherein said group of 46 proteins corresponds to the proteins consisting essentially or consisting of the sequences SEQ ID NO: 1 to 46,
   wherein SEQ ID NO: 1 corresponds to ZMYM5 protein; SEQ ID NO: 2 corresponds to BEAN protein and SEQ ID NO: 3 corresponds to OTUD6B,
   a) a step of simultaneously measuring ubiquitination, SUMOylation and NEDDylation level of each of said at least 3 proteins to obtain a first value for ubiquitin, SUMO and Nedd8;
   b) a step of comparing the first value obtained at the previous step to a second value of ubiquitination, sumoylation and neddylation of said at least 3 proteins obtained when said at least proteins are contacted with said cellular extract of cell that was not treated with said drug; to obtain a ratio between the first value and the second value; and
   c) a step of determining that
      i—If the ratio of ubiquitination, sumoylation and neddylation of each of said at least 3 proteins is not significantly different to 1, then said drug has no effect on protein modification by SUMO/Ubiquitin/Nedd8 proteins, and
      ii—If the ratio of ubiquitination, sumoylation and neddylation of at least one of said at least 3 proteins is significantly lower or higher than 1, then said drug affects protein modification by SUMO/Ubiquitin/Nedd8 proteins.

The above conditions for step a) and b) described above apply here mutatis mutandis.

When the tested condition (e.g. drug treatment) has no effect on the processes of Ubiquitination, SUMOylation and NEDDylation, then proteins SEQ ID NO: 1 to 3 are modified at a level similar to the modification obtained with a control cellular extract of the same nature (e.g cell that was not treated with the inhibitor).

On the contrary, if the tested condition (e.g. drug treatment) has an effect on UBL pathways, the amount of modification by Ubiquitin/SUMO/NEDD8 of proteins SEQ ID NO: 1 to 3 will be increased or decreased compared to the amount of modification observed in the control condition (e.g. non treated cells)

Further to the contacting between the proteins and the cellular extract, modifications by Ubiquitin/SUMO/NEDD8 are measured by means of immunological techniques using specific antibodies directed against either Ubiquitin, or SUMO, or NEDD8.

For instance, the proteins which are modified by ubiquitin and/or SUMO and/or NEDD8 proteins will therefore interact with antibodies directed against ubiquitin and/or SUMO and/or NEDD8 proteins to form a molecular complex. The complexes can be detected by secondary antibodies that recognize (and interact with) constant part FC chain of said antibodies directed against ubiquitin and/or SUMO and/or NEDD8 proteins.

Said complex can be identified when the secondary antibodies are labeled with reporter molecule, such as fluorescent protein, peroxidase, fluorescent dyes etc. . . .

The skilled person knows how to quantify the complexes protein/anti ubiquitin, anti SUMO or anti NEDD8 antibodies, in particular by using flow cytometers.

Then a value of modification is obtained for each protein SEQ ID NO: 1 to 3, for each of Ubiquitin, SUMO and NEDD8.

This value is then compared to a reference value obtained for the same proteins contacted with a control cellular extract (e.g cells of the same nature than those treated with the inhibitor, but which were not treated with said inhibitor).

A ratio is established between the first value, i.e. the value obtained with the cellular extract to be tested (e.g treated with the inhibitor) and the second value i.e. the value obtained with the control cellular extract (e.g not treated with the inhibitor).

Then for one protein, three different ratios are obtained: one form Ubiquitin, one for SUMO and one for NEDD8:

$R_{Ubiquitin}$ (i)=value for ubiquitin of protein SEQ ID NO: i with cell extract of cells to be tested (e.g treated with the inhibitor)/value for ubiquitin of protein SEQ ID NO: i with cell extract of control cells (e.g not treated with the inhibitor);

$R_{SUMO}$ (i)=value for SUMO of protein SEQ ID NO: i with cell extract of cells to be tested (e.g treated with the inhibitor)/value for SUMO of protein SEQ ID NO: i with cell extract of control cells (e.g not treated with the inhibitor); and $R_{NEDD8}$ (i)=value for NEDD8 of protein SEQ ID NO: i with cell extract of cells to be tested (e.g treated with the inhibitor)/value for NEDD8 of protein SEQ ID NO: i with cell extract of control cells (e.g not treated with the inhibitor).

In the above example, i is either 1, 2 or 3.

When the ratios are established, it is concluded that the tested condition (e.g. drug treatment) has no effect on UBL pathways when all the ratios calculated for each protein for each Ubiquitin, SUMO and NEDD8 are equal to about 1. This means that the modifications that occur on proteins SEQ ID NO: 1 to 3 are similar between the cellular extract to be tested (e.g. treated with said drug) and the control (e.g. non treated).

On the contrary, if one at least of the above mentioned ratios are significantly different from 1, then it could be concluded that the tested condition (e.g. drug treatment) has an effect on UBL pathway.

It is to be noted that protein SEQ ID NO: 1 can be modified by SUMO1 and SUMO2, whereas protein SEQ ID NO: 2 is modified preferably by Ubiquitin and protein SEQ ID NO: 3 can be modified by NEDD8.

It is therefore possible, when assessing said at least protein, to determine which UBL pathway is affected by the tested condition (e.g inhibitor treatment).

FIG. 9 shows the specificity of these proteins.

Advantageously, the invention relates to the above described method, wherein said method comprises a step of contacting a cellular extract to be tested (e.g of cell treated with said drug), with each protein of a group of 10 proteins, said group of 10 proteins belonging to a set of 46 proteins.

In other words, the invention advantageously relates to the above mentioned method, said method comprising
 a) a step of contacting a cellular extract to be tested (e.g of cell treated with said drug), with each protein of a subgroup of at least 10 proteins of a group, said group of 10 proteins belonging to a set of 46 proteins;
 said at least 10 proteins being immobilised on a support, said at least 10 proteins being g substantially not conjugated by SUMO/Ubiquitin/Nedd8 proteins before their contact with said cellular extract,
 wherein said 10 proteins corresponds to the proteins consisting essentially or consisting of the sequences SEQ ID NO: 1 to 10, and wherein said group of 46 proteins corresponds to the proteins consisting essentially or consisting of the sequences SEQ ID NO: 1 to 46,
 b) a step of simultaneously measuring ubiquitination, sumoylation and neddylation level of each of said at least 10 proteins to obtain a first value for ubiquitin, SUMO and Nedd8;
 c) a step of comparing the first value obtained at the previous step to a second value of ubiquitination, sumoylation and neddylation of said at least 10 proteins obtained when said at least proteins are contacted with said control cellular extract (e.g cell that was not treated with said drug); to obtain a ratio between the first value and the second value; and
 d) a step of determining that
  a. If the ratio of ubiquitination, sumoylation and neddylation of each of said at least 10 proteins is not significantly different to 1, then said tested condition (e.g. drug treatment) has no effect on protein modification by SUMO/Ubiquitin/Nedd8 proteins, and
  b. If the ratio of ubiquitination, sumoylation and neddylation of at least one of said at least 10 proteins is significantly lower or higher than 1, then said tested condition (e.g. drug treatment) affects protein modification by SUMO/Ubiquitin/Nedd8 proteins.

More advantageously, the invention relates to the method as defined above, wherein said method comprises a step of contacting a cellular extract to be tested (e.g of cell treated with said drug), with each protein of a set of 46 proteins.

In other words, the invention advantageously relates to the above mentioned method, said method comprising
 a) a step of contacting a cellular extract of cell to be tested (e.g treated with said drug), with each protein set of 46 proteins;
 said 46 proteins being immobilised on a support, said 46 proteins being substantially not conjugated by SUMO/Ubiquitin/Nedd8 proteins before their contact with said cellular extract,
 wherein said 46 consisting essentially or consisting of the sequences SEQ ID NO: 1 to 46,
 b) a step of simultaneously measuring ubiquitination, sumoylation and neddylation level of each of said 46 proteins to obtain a first value for ubiquitin, SUMO and Nedd8;
 c) a step of comparing the first value obtained at the previous step to a second value of ubiquitination, sumoylation and neddylation of said 46 proteins obtained when said at least proteins are contacted with said control cellular extract (e.g. of cell that was not treated with said drug); to obtain a ratio between the first value and the second value; and
 d) a step of determining that
  a. If the ratio of ubiquitination, sumoylation and neddylation of each of said 46 proteins is not significantly different to 1, then said tested condition (e.g. drug treatment) has no effect on protein modification by SUMO/Ubiquitin/Nedd8 proteins, and
  b. If the ratio of ubiquitination, sumoylation and neddylation of at least one of said 46 proteins is significantly lower or higher than 1, then said tested condition (e.g. drug treatment) affects protein modification by SUMO/Ubiquitin/Nedd8 proteins.

More advantageously, the invention relates to the method as defined above, wherein said at least 3 proteins are supported by beads, said beads being advantageously fluorescent beads.

Advantageously, the invention relates to the method as defined above, wherein each of said at least 3 protein is supported by a determined bead having a fluorescent property which is different from the fluorescent properties of the other beads, and wherein all the beads having the same fluorescent property supporting the same protein.

The invention also relates to a composition comprising at least 3 proteins chosen among a group of 10 proteins, said group of 10 proteins belonging to a set of 46 proteins;
 wherein said at least 3 proteins corresponding to the proteins consisting essentially or consisting of the sequences SEQ ID NO: 1 to 3, wherein said 10 proteins corresponds to the proteins consisting essentially or consisting of the sequences SEQ ID NO: 1 to 10, and wherein said group of 46 proteins corresponds to the proteins consisting essentially or consisting of the sequences SEQ ID NO: 1 to 46, wherein said at least 3 proteins are supported on fluorescent beads, wherein each of said at least 3 proteins is supported by a bead having a determined fluorescent property, to obtain at least 3 distinct protein-supporting beads, wherein the bead supporting one of said at least 3 proteins has a determined fluorescent property which is different from the fluorescent properties of the at least 2 other protein-supporting beads, and wherein all the fluorescent beads, having a same fluorescent property, support a same protein.

The above mentioned composition comprise therefore at least beads supporting the above mentioned proteins SEQ ID NO: 1 to 3, or more proteins until 46 proteins of the set described above, and can be used to evaluate Ubiquitination, SUMOylation or NEDDylation of said proteins.

Advantageously, the invention relates to the composition as mentioned above, comprising at least the 10 proteins group of 10 proteins, said group belonging to a set of 46 proteins;

wherein said at least 10 proteins are supported on fluorescent beads, wherein each of said at least 10 protein is supported by a bead having a determined fluorescent property, to obtain at least 10 distinct protein-supporting beads wherein the bead supporting one of said at least 10 protein has a determined fluorescent property which is different from the fluorescent properties of the at least 9 other protein-supporting beads, and wherein all the fluorescent beads, having a same fluorescent property, support a same protein.

In other words, the invention relates advantageously of the composition as mentioned above, comprising beads supporting at least 10 proteins as set forth in SEQ ID NO: 1 to 10, until 46 proteins of the set described above.

REV14

Advantageously, the invention relates to the composition as mentioned above, comprising 46 proteins;

wherein said 46 proteins are supported on fluorescent beads, wherein each of said 46 proteins is supported by a bead having a determined fluorescent property, to obtain 46 distinct protein-supporting beads wherein the bead supporting one of said 46 proteins has a determined fluorescent property which is different from the fluorescent properties of the at least 45 other protein-supporting beads, and wherein all the fluorescent beads, having a same fluorescent property, support a same protein.

In one other aspect, the invention relates to the use of the composition defined above, for quantifying UBL pathway activities, or for identifying in vitro the effect of a drug on the modification by SUMO/Ubiquitin/Nedd8 proteins in a cell of a biological sample.

The composition according to the invention can be used for instance to carry out the method as defined above.

EXAMPLES

Proteins are coated/grafted to the beads according to the following protocol

1. Resuspend the stock uncoupled beads suspension according to the instructions of the manufacturer.
2. Transfer $5.0 \times 10^6$ of the stock beads to a recommended microcentrifuge tube.
3. Place the tube into a magnetic separator and allow separation to occur for 30 to 60 seconds.
4. With the tube still positioned in the magnetic separator, remove the supernatant. Take care not to disturb the beads.
5. Remove the tube from the magnetic separator and resuspend the beads in 100 µL dH2O by vortex and sonication for approximately 20 seconds.
6. Place the tube into a magnetic separator and allow separation to occur for 30 to 60 seconds.
7. With the tube still positioned in the magnetic separator, remove the supernatant. Take care not to disturb the beads.
8. Remove the tube from the magnetic separator and resuspend the washed beads in 80 µL 0.1M Sodium Phosphate (monobasic), pH 6.2 by vortex and sonication for approximately 20 seconds. Note: Beads should be protected from prolonged exposure to light throughout this procedure.
9. Add 10 µL of 50 mg/mL Sulfo-NHS (diluted in dH20) to the beads and mix gently by vortex.
10. Add 10 µL of 50 mg/mL EDC (diluted in dH20) to the beads and mix gently by vortex.
11. Incubate for 20 minutes at room temperature with gentle mixing by vortex at 10 minute intervals.
12. Place the tube into a magnetic separator and allow separation to occur for 30 to 60 seconds.
13. With the tube still positioned in the magnetic separator, remove the supernatant. Take care not to disturb the beads.
14. Remove the tube from the magnetic separator and resuspend the beads in 250 µL of 50 mM MES, pH 5.0 by vortex and sonication for approximately 20 seconds.
15. Repeat steps 12 and 13 for a total of two washes with 50 mM MES, pH 5.0.
16. Remove the tube from the magnetic separator and resuspend the activated and washed beads in 100 µL of 50 mM MES, pH 5.0 by vortex and sonication for approximately 20 seconds.
17. Add 25 µg protein to the resuspended beads (i.e., 5 µg/1 million beads). (Note: 5 µg protein per 1 million beads typically performs well. We recommend titrating up and/or down as needed to achieve optimal assay performance.)
18. Bring total volume to 500 µL with 50 mM MES, pH 5.0.
19. Mix coupling reaction by vortex.
20. Incubate for 2 hours with mixing (by rotation) at room temperature.
21. Place the tube into a magnetic separator and allow separation to occur for 30 to 60 seconds.
22. With the tube still positioned in the magnetic separator, remove the supernatant. Take care not to disturb the beads.
23. Remove the tube from the magnetic separator and resuspend the coupled beads in 500 µL of PBS-TBN by vortex and sonication for approximately 20 seconds.

24. Optional blocking step-Incubate for 30 minutes with mixing (by rotation) at room temperature. (Note: Perform this step when using the beads the same day.)
25. Place the tube into a magnetic separator and allow separation to occur for 30 to 60 seconds.
26. With the tube still positioned in the magnetic separator, remove the supernatant. Take care not to disturb the beads.
27. Remove the tube from the magnetic separator and resuspend the beads in 1 mL of PBS-TBN by vortex and sonication for approximately 20 seconds.
28. Repeat steps 25 and 26. This is a total of two washes with 1 mL PBS-TBN.
29. Remove the tube from the magnetic separator and resuspend the coupled and washed beads in 250-1000 µL of PBS-TBN.
30. Count the number of beads recovered after the coupling reaction using a cell counter or hemacytometer.
31. Store coupled beads refrigerated at 2-8° C. in the dark

Example 1: Measure of the Activity Ubiquitine-Like System

The inventors have optimized a method, using MagPlex Xmap beads, allowing a quantitative measurement of the ubiquitinylation, SUMOylation, and NEDDylation activities in cell extracts.

The inventors therefore had intended to use this method in order to evaluate the inhibiting activity of compounds that target enzymes of the ubiquitine-like systems.

In order to carry out this method, the inventors used 10 proteins highly modified by Ubiquitin/SUMO/NEDD8, that were grafted on fluorescent beads. The 10 chosen proteins represents the 4 different pathways, namely Ubiquitin, SUMO 1 and 2 and NEDD8. Some of the chosen proteins can be modified by different enzyme simultaneously.

TABLE 2

| SUMO1 | SUMO2 | Ubiquitin | NEDD8 |
|---|---|---|---|
| LDLRAD3 | LDLRAD3 | LDLRAD3 | OTUD6B |
| TMEM92 | TMEM92 | TMEM92 | ANKRD39 |
| UBE3A | UBE3A | UBE3A | OTUB2 |
| BEAN | BEAN | BEAN | |
| MXI1 | MXI1 | MXI1 | |
| WBP2 | WBP2 | WBP2 | |
| | ZMYM5 | | |

This table represents the proteins chosen for the measure of the inhibiting activity of the UbL system.

The first step was to check if the proteins can be modified according to the inventor's method. Proteins were then produced in bacteria, then coupled to beads with different fluorescent properties, and used HL60 cell extract sensitive to drugs.

ZMYM5 was used as a marker of SUMOylation, OTUD6B as a marker of NEDDylation, and TMEM92, BEAN and WBP2 as a marker of ubiquitinylation.

Example 2: Inhibition of SUMO Pathway

The inventors wanted to validate their method by assessing SUMOylation inhibition.

In a first approach, the inventors used HL60 cell lines expressing shRNA inhibiting expression of UBC9, the E2 enzyme of SUMO. Three different cell lines were used with a different shRNA, and a control cell line was used as control. UBC9 expression inhibition was assessed by RT-qPCR by quantifying the relative amount of UBC9 RNAs.

shRNA1 induces a limited decrease (non-significant), shRNA2 induces a decrease of about 20% and shRNA3 of 50% of Ubc9 expression.

Thus, the inventors apply their method to the cell extract treated with the above-mentioned shRNA. In the same reaction, the inventors measured ubiquitinylation, and measured by western blot SUMOylation by SUMO1 and SUMO2. (FIGS. 1 to 4)

Surprisingly, SUMOylation level measured by western blot is not significantly modified, including in cells having a reduction of 50% of Ubc9 RNA.

This can be explained by the fact that the proteins detected by immunoblot are the ones that are significantly modified by SUMOylation, and which correspond to the proteins that are the less sensitive to a decrease of the amount of Ubc9.

However, the method according to the invention allows a detection of global SUMOylation in the cells texted in the experiments. Indeed, SUMOylation activity measured by the method according to the invention is directly correlated to UBC9 expression assessed by qPCR.

In a second time, the inventors evaluated if the method of the invention could be used to measure the effect of inhibitors of UbL pathways. For this purpose, the inventors have evaluated the method by using two known SUMOylation inhibitors: anacardic acid, which inhibit E1 enzyme of SUMO, and 2D08, which inhibit E2 enzyme of SUMO.

HL60 cells were treated with 50 µM of these compounds for 6 h, and then cell extracts were prepared and used to carry out the method according to the invention.

Cells were then lysed in Laemmli buffer, and samples were loaded on acrylamide-bisacrylamide gel for SDS-PAGE separation. Proteins were then transferred onto a PVDF membrane and labelled with an anti-SUMO1 antibody.

Results are shown in FIGS. 5 and 6.

By using the method according to the invention, it is possible to detect a SUMOylation decrease of 50% in cell extracts, whereas immunoblot does not show such decrease. This can be explained by the fact that in western blot all the protein liable to be modified by SUMO are detected, and specifically the one that are significantly modified.

In samples treated with the drugs, it is possible to detect free SUMO1, which is the hallmark of the decrease of SUMOylation. The method according to the invention is therefore more efficient than western blot based methods.

Example 3: Inhibition of Ubiquitin-Like Pathways Using Pharmaceutical Inhibitors In this example, the inventors intended to validate the method on samples from patients treated with commercial inhibitors that have been proven to be therapeutically efficient on Ubiquitin and Nedd8 pathways: namely MLN7243 (Ubiquitine), and MLN4924 (NEDD8).

MLN7243 (TAK-243) is a cell permeable small molecule inhibitor targeting ubiquitin-activating enzymes (UAE, also known as E1 enzymes). The enzymes, found more active in cancer cells than in normal, healthy, cells, catalyze the first step in ubiquitination reaction, targeting a protein for degradation via Proteasome. This covalent attachment of ubiquitin or ubiquitin-like proteins to targeted proteins is a major mechanism for regulating protein function in eukaryotic organisms. Inhibition of the enzyme prevents both protein ubiquitination and subsequent ubiquitin-mediated proteasomal degradation, resulting in an excess of proteins in the cells that may lead to endoplasmic reticulum (ER) stress-mediated apoptosis, thus inhibit tumor (cancer) cell proliferation and survival. MLN7243 is the first-in-class inhibitor specifically targeting this class of enzyme studied clinically.

MLN7243 has the following formula:

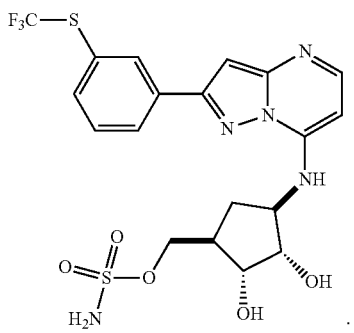

[Chem 1]

MLN4924 (also called Pevonedistat) is a small molecule inhibitor of the NEDD8-Activating Enzyme (NAE), a key component of the protein homeostasis pathway. It is the first small molecule inhibitor specifically targeting this class of enzyme to be studied clinically, and is currently being examined in Phase I clinical trials.

MLN4924 has the following formula:

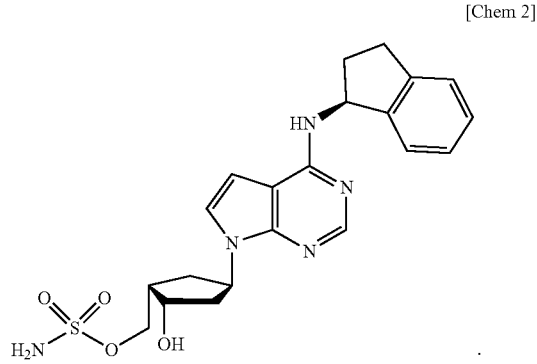

[Chem 2]

HL60 cells were first treated with 1 µM of MLN4924, DMSO, or only with the culture medium for 6 h. Beads supporting UBC12, (NEDDylation E2 enzyme, which was previously reported to be modified by NEDD8) were contacted with said cell extracts, and NEDD8 level was assessed.

Results are shown on FIG. 7.

Whereas NEDDylation measured in the control samples was low, treatment with 1 µM MLN4924 shows a decrease of UBC12 protein NEDDylation.

The inventors then evaluated the effect of different amount of MLN7243, E1 enzyme of the Ubiquitin pathway.

Cells were then treated with 0, 5, 10, 50, 100 or 500 nM MLN7243 for 6 h. Cells extracts were prepared and contacted with beads coated with either TMEM92, BEAN1 or WBP2 proteins.

Results are shown on FIG. 8.

These results show that more than 50% of the ubiquitination activity is inhibited with 10 nM or more of MLN7243 (In vitro $IC_{50}$: 1 nM; In vitro toxicity on Acute Myeloid Leukemia cell lines $IC_{50}$: 20 to 40 nM)

With 500 nM MLN7243, TMEM92 NEDDylation inhibition is maximal, WBP2 and BEAN1 remain ubiquitynated at residual levels.

MLN7243 inhibitor also affects SUMOylation activity, but with large amounts of inhibitor which is consistent with the in vitro $IC_{50}$ of 850 nM.

Regarding NEDDylation, MLN7243 in vitro $IC_{50}$ is 28 nM on OTUD6B protein, but the data show a decrease slightly different.

Material and Methods

Cell Culture

HL-60 (DSMZ, Germany) were cultured at 37° C. in RPMI medium supplemented with 10% fetal bovine serum (FBS) and streptomycin/penicillin in the presence of 5% $CO_2$. HL-60 were authenticated by the ATCC using Short-Tandem-Repeat analysis. All cells were regularly tested negative for mycoplasma. After thawing, cells were passaged at a density of $3.10^5$/ml every 2-3 days for no more than 10 passages.

Cellular Extracts

Cells grown at a $5-8.10^5$/mL density were spun down (300 g) at 4° C. for 5 min and washed once with PBS. After pellet resuspension in 1 mL of PBS, they were centrifuged again (16,000 g) at 4° C. for 5 min. Pellets were resuspended and incubated at 4° C. for 30 min in a hypotonic buffer (20 mM HEPES pH 7.5, 1.5 mM $MgCl_2$, 5 mM KCl, 1 mM DTT and 1 mg/L of aprotinine, leupeptin and pepstatin) in a volume of 25 µL per $2.10^6$ cells. Cell lysis was achieved through 4 freezing/thawing cycles using liquid nitrogen and DNA was sheared owing to 10 passages through a 20-1/2 G needle. Extracts were finally centrifuged twice (16000 g) at 4° C. for 20 min and supernatants were aliquoted, flash-frozen and kept at −80° C. until use.

Production of Recombinant Proteins cDNA encoding for the proteins of interest were recovered from the Ultimate ORF library (Thermofisher) and cloned in the bacterial expression vector pGGWA vector using the Gateway technology according to manufacturer's protocol (Life Technologies). Constructs were then transformed in BL21 (DE3) E. coli strain. Protein production was induced with 1 mM isopropyl β-D-1-thiogalactopyranoside (IPTG) for 6 hrs in exponentially growing bacteria at 25° C.

Bacterial pellets were resuspended in 50 mM Tris-HCl pH 8.6 containing 500 mM NaCl and 50 mM $MgSO_4$, and flash-frozen in liquid $N_2$. After thawing, bacterial suspensions were supplemented with 1 mg/mL lysozyme (Sigma-Aldrich), 8 mM β-mercaptoethanol, 1 mg/L aprotinin, leupeptin and pepstatin and incubated at 4° C. for 1 hr. Bacterial debris were spun down (100 000 g for 1 hr). The extract was then bound to Glutathion agarose beads (Generon) equilibrated in Tris 50 mM pH 8.6, NaCl 500 mM, MgSO4 50 mM, 8 mM β-mercaptoethanol, 1 mg/L aprotinin, leupeptin, pepstatin. The column was then extensively washed with Tris 50 mM pH 8.6, NaCl 150 mM, MgSO4 50 mM, 8 mM β-mercaptoethanol, 1 mg/L aprotinin, leupeptin, pepstatin and eluted by addition of 20 mM reduced glutathione (Sigma-Aldrich).

Protein Coupling to XMap $2.10^5$ magnetic MagPlex XMap beads (low concentration) from Luminex were transferred to a low binding microtube (Eppendorf) and washed using 500 mM NaCl. They were then resuspended in 50 µL of 50 mM MES pH 6.1 and incubated in the presence of 5 mg/mL 1-ethyl-3-(3-dimethylaminopropyl) carbodiimide hydrochloride (EDC, Pierce) and 5 mg/mL Sulfo-NHS (Pierce) at room temperature for 20 min. Beads were then washed in PBS containing 500 mM NaCl and incubated with 7 µg of recombinant protein to be coupled in 100 µL PBS at room temperature for 2 hrs. They were then washed twice with PBS containing 0.1% BSA, 0.02% Tween 20, 0.05% sodium azide and 500 mM NaCl and stored at 4° C. in PBS containing 0.1% BSA, 0.02% Tween-20, 0.05% sodium azide.

UbL Conjugation to Proteins Coupled to XMap Beads

SUMO-1-, SUMO-2-, NEDD8 and Ubiquitin vinyl sulfones (0.5 µM each) were added to cellular extracts (10 µL), which were incubated at 4° C. for 15 min. Control extracts were also incubated with 50 mM NEM. The inventors then added to the extract $10^3$ protein-coupled XMap beads contained in 10 µL of a reaction buffer containing 20 mM HEPES pH 7.3, 110 mM KOAc, 2 mM Mg (OAc) 2, 0.05% Tween-20, 0.5 mM EGTA, 0.2 mg/mL ovalbumine, 1 mM DTT, 1 mg/L aprotinin, leupeptin and pepstatin, 1 mM ATP, 30 µM Flag-ubiquitin, 15 µM NEDD8, 15 µM SUMO-1 and 15 µM SUMO-2. Reaction were performed at 30° C. for 45 min. Beads were washed twice for 5 min with PBS containing 0.05% Tween-20 and 0.5% SDS and 3 times for 5 min with PBS containing 0.05% Tween-20. They were then incubated with 1 µg/mL of anti-SUMO-1 (21C7) and anti-Flag antibodies or anti-SUMO-2 (8A2) and anti-NEDD8 for 1 hr under agitation at room temperature. After washing in PBS containing 0.05% Tween-20 for 5 min, they were incubated for 30 min at room temperature with anti-mouse Alexa Fluor 488—and anti-rabbit Alexa Fluor 405 antibodies in 100 µL of PBS containing 0.05% Tween-20. Beads were again washed for 5 min with PBS containing 0.05% Tween-20. They were then resuspended in 200 µL PBS and flow-cytometry-analysed using the LSR Fortessa device from BD Biosciences. Results were analysed using the FlowJo software.

Selection of the Proteins of Interest

Extracts from HL-60 or U937 were supplemented with UbL-vinyl-sulfone and recombinant UbL and incubated on Protoarrays (Life Technologies). After extensive washes, the arrays were incubated with primary mouse anti-SUMO-1 and rabbit anti-Flag (tag present on the recombinant Ubiquitin added to the reaction) antibodies followed by fluorescently coupled secondary antibodies and scanned for fluorescence. The antibodies were then removed and the arrays incubated with primary mouse anti-SUMO-2 and rabbit anti-NEDD8 antibodies followed by fluorescently coupled secondary antibodies and scanned for fluorescence. The normalized fluorescence data obtained for all modifiers on all arrays were compared to the averaged signal of the control arrays (NEM) to identify proteins, which are robustly modified. 46 proteins showing a significant difference between the two groups using both Welch and Wilcoxon-Mann-Whitney and having mean fluorescence intensities values higher than 800 on the Protoarrays were selected.

The invention claimed is:

1. A method for quantifying the activity of the proteins or enzymes involved in the conjugation of the SUMO/Ubiquitin/Nedd8 proteins in a cell of a biological sample, comprising:
   a) contacting a cellular extract of the cell of the biological sample with a composition comprising at least 3 proteins,
   SEQ ID NOs: 1 to 3,
   wherein each of said at least 3 proteins is supported by a distinct type of fluorescent bead
   that has a distinct fluorescent property,
   wherein said at least 3 proteins are not conjugated by SUMO/Ubiquitin/Nedd8 proteins before contacting said cellular extract, and
   wherein SEQ ID NO: 1 corresponds to ZMYM5 protein; SEQ ID NO: 2 corresponds to BEAN protein; and SEQ ID NO: 3 corresponds to OTUD6B protein;
   and b) simultaneously measuring ubiquitination of BEAN of SEQ ID NO: 2, SUMOylation of ZMYM5 of SEQ ID NO: 1, and NEDDylation of OTUD6B of SEQ ID NO: 3 to obtain first values of activity levels for ubiquitin, SUMO and Nedd8.

2. The method of claim 1, said composition comprising at least 10 proteins of which sequences are selected from the group consisting of SEQ ID NOs: 1-46.

3. The method of claim 1, said composition comprising 46 proteins corresponding to SEQ ID NOs: 1 to 46.

4. A method for identifying the effect of a drug on protein modification by SUMO/Ubiquitin/Nedd8 proteins in a cell of a biological sample, comprising:
   a) treating a portion of the biological sample with a drug,
   b) contacting a cellular extract of the drug-treated portion of the biological sample with a composition comprising at least 3 proteins
   corresponding to SEQ ID NOs: 1 to 3,
   c) contacting a cellular extract of a non-drug-treated portion of the biological sample with said composition,
   wherein each of said at least 3 proteins is supported by a distinct type of fluorescent bead
   that has a distinct fluorescent property,
   wherein said at least 3 proteins are not conjugated by SUMO/Ubiquitin/Nedd8 proteins before contacting said cellular extract, and
   wherein SEQ ID NO: 1 corresponds to ZMYM5 protein; SEQ ID NO: 2 corresponds to BEAN protein; and SEQ ID NO: 3 corresponds to OTUD6B protein;
   d) simultaneously measuring ubiquitination of BEAN of SEQ ID NO:2, SUMOylation of ZMYM5 of SEQ ID NO: 1, and NEDDylation of OTUD6B of SEQ ID NO: 3 in the cellular extract of the drug-treated portion of the biological sample to obtain first values of activity levels for ubiquitin, SUMO and Nedd8 and in the cellular extract of the non-drug-treated portion of biological sample to obtain second values of activity levels for ubiquitin, SUMO, and Nedd8;
   e) comparing the first values obtained to the second values to obtain a ratio between the first values and the second values; and
   f) determining that
   i. if the ratio is equal to 1, then said drug has no effect on protein modification by SUMO/Ubiquitin/Nedd8 proteins, and
   ii. if the ratio is not equal to 1, then said drug affects protein modification by SUMO/Ubiquitin/Nedd8 proteins.

5. The method of claim 4, said composition comprising at least 10 proteins of which sequences are selected from the group consisting of SEQ ID NOs: 1-46.

6. The method of claim 5, said composition comprising 46 proteins corresponding to SEQ ID NOs: 1 to 46.

7. A composition comprising at least 3 proteins;
   SEQ ID NOs: 1 to 3,
   wherein each of said at least 3 proteins is supported by a distinct fluorescent bead;
   that has a distinct fluorescent property.

8. The composition of claim 7, said composition comprising at least 10 proteins of which sequences are selected from the group consisting of SEQ ID NOs: 1-46.

9. The composition of claim 7, said composition comprising 46 proteins corresponding to SEQ ID NOs: 1-46.

* * * * *

SEQUENCE LISTING

```
<160> NUMBER OF SEQ ID NOS: 46

<210> SEQ ID NO 1
<211> LENGTH: 208
<212> TYPE: PRT
<213> ORGANISM: Homo sapiens

<400> SEQUENCE: 1

Met Glu Lys Cys Ser Val Gly Gly Leu Glu Leu Thr Glu Gln Thr Pro
1               5                   10                  15

Ala Leu Leu Gly Asn Met Ala Met Ala Thr Ser Leu Met Asp Ile Gly
            20                  25                  30

Asp Ser Phe Gly His Pro Ala Cys Pro Leu Val Ser Arg Ser Arg Asn
        35                  40                  45

Ser Pro Val Glu Asp Asp Asp Asp Asp Val Val Phe Ile Glu
    50                  55                  60

Ser Ile Gln Pro Pro Ser Ile Ser Ala Pro Ala Ile Ala Asp Gln Arg
65                  70                  75                  80

Asn Phe Ile Phe Ala Ser Ser Lys Asn Glu Lys Pro Gln Gly Asn Tyr
            85                  90                  95

Ser Val Ile Pro Pro Ser Ser Arg Asp Leu Ala Ser Gln Lys Gly Asn
            100                 105                 110

Ile Ser Glu Thr Ile Val Ile Asp Asp Glu Glu Asp Val Glu Thr Asn
        115                 120                 125

Gly Gly Ala Glu Lys Lys Ser Ser Phe Phe Ile Glu Trp Gly Leu Pro
    130                 135                 140

Gly Thr Lys Asn Lys Thr Asn Asp Leu Asp Phe Ser Thr Ser Ser Leu
145                 150                 155                 160

Ser Arg Ser Lys Thr Lys Thr Gly Val Arg Pro Phe Asn Pro Gly Arg
            165                 170                 175

Met Asn Val Ala Gly Asp Leu Phe Gln Asn Gly Glu Phe Ala Thr His
```

```
                180             185             190
His Ser Pro Glu Met His Leu Gln Arg Arg Leu Met Ser Phe Phe Gln
        195             200             205

<210> SEQ ID NO 2
<211> LENGTH: 150
<212> TYPE: PRT
<213> ORGANISM: Homo sapiens

<400> SEQUENCE: 2

Met Arg Tyr Ala Cys Ser Ser Glu Asp Trp Pro Pro Leu Asp
1               5                   10                  15

Ile Ser Ser Asp Gly Asp Val Asp Ala Thr Val Leu Arg Glu Leu Tyr
            20                  25                  30

Pro Asp Ser Pro Pro Gly Tyr Glu Glu Cys Val Gly Pro Gly Ala Thr
        35                  40                  45

Gln Leu Tyr Val Pro Thr Asp Ala Pro Pro Tyr Ser Leu Thr Asp
    50                  55                  60

Ser Cys Pro Thr Leu Asp Gly Thr Ser Asp Ser Gly Ser Gly His Ser
65                  70                  75                  80

Pro Gly Arg His Gln Gln Glu Gln Arg Thr Pro Ala Gln Gly Gly Leu
                85                  90                  95

His Thr Val Ser Met Asp Thr Leu Pro Pro Tyr Glu Ala Val Cys Gly
            100                 105                 110

Ala Gly Pro Pro Ser Gly Leu Leu Pro Leu Pro Gly Pro Asp Pro Gly
        115                 120                 125

Pro Arg Gly Ser Gln Gly Ser Pro Thr Pro Thr Arg Ala Pro Ala Ser
    130                 135                 140

Gly Pro Glu Arg Ile Val
145                 150

<210> SEQ ID NO 3
<211> LENGTH: 293
<212> TYPE: PRT
<213> ORGANISM: Homo sapiens

<400> SEQUENCE: 3

Met Glu Ala Val Leu Thr Glu Glu Leu Asp Glu Glu Glu Gln Leu Leu
1               5                   10                  15

Arg Arg His Arg Lys Glu Lys Lys Glu Leu Gln Ala Lys Ile Gln Gly
            20                  25                  30

Met Lys Asn Ala Val Pro Lys Asn Asp Lys Arg Arg Lys Gln Leu
        35                  40                  45

Thr Glu Asp Val Ala Lys Leu Glu Lys Glu Met Glu Gln Lys His Arg
    50                  55                  60

Glu Glu Leu Glu Gln Leu Lys Leu Thr Thr Lys Glu Asn Lys Ile Asp
65                  70                  75                  80

Ser Val Ala Val Asn Ile Ser Asn Leu Val Leu Glu Asn Gln Pro Pro
                85                  90                  95

Arg Ile Ser Lys Ala Gln Lys Arg Arg Glu Lys Lys Ala Ala Leu Glu
            100                 105                 110

Lys Glu Arg Glu Glu Arg Ile Ala Glu Ala Ile Glu Asn Leu Thr
        115                 120                 125

Gly Ala Arg His Met Glu Ser Glu Lys Leu Ala Gln Ile Leu Ala Ala
    130                 135                 140

Arg Gln Leu Glu Ile Lys Gln Ile Pro Ser Asp Gly His Cys Met Tyr
```

```
            145                 150                 155                 160
    Lys Ala Ile Glu Asp Gln Leu Lys Glu Lys Asp Cys Ala Leu Thr Val
                    165                 170                 175

Val Ala Leu Arg Ser Gln Thr Ala Glu Tyr Met Gln Ser His Val Glu
                    180                 185                 190

Asp Phe Leu Pro Phe Leu Thr Asn Pro Asn Thr Gly Asp Met Tyr Thr
                    195                 200                 205

Pro Glu Glu Phe Gln Lys Tyr Cys Glu Asp Ile Val Asn Thr Ala Ala
                    210                 215                 220

Trp Gly Gly Gln Leu Glu Leu Arg Ala Leu Ser His Ile Leu Gln Thr
    225                 230                 235                 240

Pro Ile Glu Ile Ile Gln Ala Asp Ser Pro Pro Ile Val Gly Glu
                    245                 250                 255

Glu Tyr Ser Lys Lys Pro Leu Ile Leu Val Tyr Met Arg His Ala Tyr
                    260                 265                 270

Gly Leu Gly Glu His Tyr Asn Ser Val Thr Arg Leu Val Asn Ile Val
                    275                 280                 285

Thr Glu Asn Cys Ser
                    290

<210> SEQ ID NO 4
<211> LENGTH: 183
<212> TYPE: PRT
<213> ORGANISM: Homo sapiens

<400> SEQUENCE: 4

Met Ala Thr Pro Arg Pro Cys Ala Asp Gly Pro Cys Cys Ser His Pro
    1               5                   10                  15

Ser Ala Val Leu Gly Val Gln Gln Thr Leu Glu Glu Met Asp Phe Glu
                    20                  25                  30

Arg Gly Ile Trp Ser Ala Ala Leu Asn Gly Asp Leu Gly Arg Val Lys
                    35                  40                  45

His Leu Ile Gln Lys Ala Glu Asp Pro Ser Gln Pro Asp Ser Ala Gly
            50                  55                  60

Tyr Thr Ala Leu His Tyr Ala Ser Arg Asn Gly His Tyr Ala Val Cys
    65                  70                  75                  80

Gln Phe Leu Leu Glu Ser Gly Ala Lys Cys Asp Ala Gln Thr His Gly
                    85                  90                  95

Gly Ala Thr Ala Leu His Arg Ala Ser Tyr Cys Gly His Thr Glu Ile
                    100                 105                 110

Thr Arg Leu Leu Leu Ser His Gly Ser Asn Pro Arg Val Val Asp Asp
                    115                 120                 125

Asp Gly Met Thr Ser Leu His Lys Ala Ala Glu Arg Gly His Gly Asp
                    130                 135                 140

Ile Cys Ser Leu Leu Leu Gln His Ser Pro Ala Leu Lys Ala Ile Arg
    145                 150                 155                 160

Asp Arg Lys Ala Arg Leu Ala Cys Asp Leu Leu Pro Cys Asn Ser Asp
                    165                 170                 175

Leu Arg Asp Leu Leu Ser Ser
                    180

<210> SEQ ID NO 5
<211> LENGTH: 345
<212> TYPE: PRT
<213> ORGANISM: Homo sapiens
```

<400> SEQUENCE: 5

```
Met Trp Leu Leu Gly Pro Leu Cys Leu Leu Leu Ser Ser Ala Ala Glu
1               5                   10                  15

Ser Gln Leu Leu Pro Gly Asn Asn Phe Thr Asn Glu Cys Asn Ile Pro
            20                  25                  30

Gly Asn Phe Met Cys Ser Asn Gly Arg Cys Ile Pro Gly Ala Trp Gln
            35                  40                  45

Cys Asp Gly Leu Pro Asp Cys Phe Asp Lys Ser Asp Glu Lys Glu Cys
50                  55                  60

Pro Lys Ala Lys Ser Lys Cys Gly Pro Thr Phe Phe Pro Cys Ala Ser
65                  70                  75                  80

Gly Ile His Cys Ile Ile Gly Arg Phe Arg Cys Asn Gly Phe Glu Asp
                85                  90                  95

Cys Pro Asp Gly Ser Asp Glu Glu Asn Cys Thr Ala Asn Pro Leu Leu
                100                 105                 110

Cys Ser Thr Ala Arg Tyr His Cys Lys Asn Gly Leu Cys Ile Asp Lys
            115                 120                 125

Ser Phe Ile Cys Asp Gly Gln Asn Asn Cys Gln Asp Asn Ser Asp Glu
            130                 135                 140

Glu Ser Cys Glu Ser Ser Gln Glu Pro Gly Ser Gly Gln Val Phe Val
145                 150                 155                 160

Thr Ser Glu Asn Gln Leu Val Tyr Tyr Pro Ser Ile Thr Tyr Ala Ile
                165                 170                 175

Ile Gly Ser Ser Val Ile Phe Val Leu Val Val Ala Leu Leu Ala Leu
            180                 185                 190

Val Leu His His Gln Arg Lys Arg Asn Asn Leu Met Thr Leu Pro Val
            195                 200                 205

His Arg Leu Gln His Pro Val Leu Leu Ser Arg Leu Val Val Leu Asp
        210                 215                 220

His Pro His His Cys Asn Val Thr Tyr Asn Val Asn Asn Gly Ile Gln
225                 230                 235                 240

Tyr Val Ala Ser Gln Ala Glu Gln Asn Ala Ser Glu Val Gly Ser Pro
                245                 250                 255

Pro Ser Tyr Ser Glu Ala Leu Leu Asp Gln Arg Pro Ala Trp Tyr Asp
            260                 265                 270

Leu Pro Pro Pro Tyr Ser Ser Asp Thr Glu Ser Leu Asn Gln Ala
            275                 280                 285

Asp Leu Pro Pro Tyr Arg Ser Arg Ser Gly Ser Ala Asn Ser Ala Ser
        290                 295                 300

Ser Gln Ala Ala Ser Ser Leu Leu Ser Val Glu Asp Thr His Ser
305                 310                 315                 320

Pro Gly Gln Pro Gly Pro Gln Glu Gly Thr Ala Glu Pro Arg Asp Ser
                325                 330                 335

Glu Pro Ser Gln Gly Thr Glu Glu Val
                340                 345
```

<210> SEQ ID NO 6
<211> LENGTH: 228
<212> TYPE: PRT
<213> ORGANISM: Homo sapiens

<400> SEQUENCE: 6

```
Met Glu Arg Val Lys Met Ile Asn Val Gln Arg Leu Leu Glu Ala Ala
1               5                   10                  15
```

```
Glu Phe Leu Glu Arg Arg Glu Arg Glu Cys Glu His Gly Tyr Ala Ser
                20                  25                  30

Ser Phe Pro Ser Met Pro Ser Pro Arg Leu Gln His Ser Lys Pro Pro
            35                  40                  45

Arg Arg Leu Ser Arg Ala Gln Lys His Ser Ser Gly Ser Ser Asn Thr
 50                  55                  60

Ser Thr Ala Asn Arg Ser Thr His Asn Glu Leu Glu Lys Asn Arg Arg
 65                  70                  75                  80

Ala His Leu Arg Leu Cys Leu Glu Arg Leu Lys Val Leu Ile Pro Leu
                 85                  90                  95

Gly Pro Asp Cys Thr Arg His Thr Thr Leu Gly Leu Leu Asn Lys Ala
                100                 105                 110

Lys Ala His Ile Lys Lys Leu Glu Glu Ala Glu Arg Lys Ser Gln His
                115                 120                 125

Gln Leu Glu Asn Leu Glu Arg Glu Gln Arg Phe Leu Lys Trp Arg Leu
            130                 135                 140

Glu Gln Leu Gln Gly Pro Gln Glu Met Glu Arg Ile Arg Met Asp Ser
145                 150                 155                 160

Ile Gly Ser Thr Ile Ser Ser Asp Arg Ser Asp Ser Glu Arg Glu Glu
                165                 170                 175

Ile Glu Val Asp Val Glu Ser Thr Glu Phe Ser His Gly Glu Val Asp
                180                 185                 190

Asn Ile Ser Thr Thr Ser Ile Ser Asp Ile Asp Asp His Ser Ser Leu
                195                 200                 205

Pro Ser Ile Gly Ser Asp Glu Gly Tyr Ser Ser Ala Ser Val Lys Leu
210                 215                 220

Ser Phe Thr Ser
225

<210> SEQ ID NO 7
<211> LENGTH: 64
<212> TYPE: PRT
<213> ORGANISM: Homo sapiens

<400> SEQUENCE: 7

Met Val Tyr Glu Lys Tyr Thr Gly Ser Val Gly Gly Thr His Asp Met
1               5                  10                  15

Ile Cys Glu Tyr His His Leu Cys Gln Thr Ser Leu Gln Gly Ile Pro
                20                  25                  30

Val Ser Gln Leu Lys Gly Val Asn Gly His Thr His Ser Leu Asp Asp
            35                  40                  45

Ala Leu Ala Val Leu Arg Gly Cys Lys Val Gly Ser Gly Pro Ser Ser
 50                  55                  60

<210> SEQ ID NO 8
<211> LENGTH: 159
<212> TYPE: PRT
<213> ORGANISM: Homo sapiens

<400> SEQUENCE: 8

Met Ser Gln Ala Trp Val Pro Gly Leu Ala Pro Thr Leu Leu Phe Ser
1               5                  10                  15

Leu Leu Ala Gly Pro Gln Lys Ile Ala Ala Lys Cys Gly Leu Ile Leu
                20                  25                  30

Ala Cys Pro Lys Gly Phe Lys Cys Cys Gly Asp Ser Cys Cys Gln Glu
                35                  40                  45
```

```
Asn Glu Leu Phe Pro Gly Pro Val Arg Ile Phe Val Ile Ile Phe Leu
 50                  55                  60
Val Ile Leu Ser Val Phe Cys Ile Cys Gly Leu Ala Lys Cys Phe Cys
 65                  70                  75                  80
Arg Asn Cys Arg Glu Pro Glu Pro Asp Thr Pro Val Asp Cys Arg Gly
                 85                  90                  95
Pro Leu Glu Leu Pro Ser Ile Ile Pro Pro Glu Arg Val Arg Val Ser
                100                 105                 110
Leu Ser Ala Pro Pro Pro Tyr Ser Glu Val Ile Leu Lys Pro Ser
                115                 120                 125
Leu Gly Pro Thr Pro Thr Glu Pro Pro Pro Tyr Ser Phe Arg Pro
                130                 135                 140
Glu Glu Tyr Thr Gly Asp Gln Arg Gly Ile Asp Asn Pro Ala Phe
145                 150                 155
```

<210> SEQ ID NO 9
<211> LENGTH: 872
<212> TYPE: PRT
<213> ORGANISM: Homo sapiens

<400> SEQUENCE: 9

```
Met Ala Thr Ala Cys Lys Arg Ser Gly Glu Pro Gln Ser Asp Asp Ile
 1               5                  10                  15
Glu Ala Ser Arg Met Lys Arg Ala Ala Ala Lys His Leu Ile Glu Arg
                20                  25                  30
Tyr Tyr His Gln Leu Thr Glu Gly Cys Gly Asn Glu Ala Cys Thr Asn
                 35                  40                  45
Glu Phe Cys Ala Ser Cys Pro Thr Phe Leu Arg Met Asp Asn Asn Ala
 50                  55                  60
Ala Ala Ile Lys Ala Leu Glu Leu Tyr Lys Ile Asn Ala Lys Leu Cys
 65                  70                  75                  80
Asp Pro His Pro Ser Lys Lys Gly Ala Ser Ser Ala Tyr Leu Glu Asn
                 85                  90                  95
Ser Lys Gly Ala Pro Asn Asn Ser Cys Ser Glu Ile Lys Met Asn Lys
                100                 105                 110
Lys Gly Ala Arg Ile Asp Phe Lys Asp Val Thr Tyr Leu Thr Glu Glu
                115                 120                 125
Lys Val Tyr Glu Ile Leu Glu Leu Cys Arg Glu Arg Glu Asp Tyr Ser
                130                 135                 140
Pro Leu Ile Arg Val Ile Gly Arg Val Phe Ser Ser Ala Glu Ala Leu
145                 150                 155                 160
Val Gln Ser Phe Arg Lys Val Lys Gln His Thr Lys Glu Glu Leu Lys
                165                 170                 175
Ser Leu Gln Ala Lys Asp Glu Asp Lys Asp Glu Asp Glu Lys Glu Lys
                180                 185                 190
Ala Ala Cys Ser Ala Ala Ala Met Glu Glu Asp Ser Glu Ala Ser Ser
                195                 200                 205
Ser Arg Ile Gly Asp Ser Ser Gln Gly Asp Asn Asn Leu Gln Lys Leu
                210                 215                 220
Gly Pro Asp Asp Val Ser Val Asp Ile Asp Ala Ile Arg Arg Val Tyr
225                 230                 235                 240
Thr Arg Leu Leu Ser Asn Glu Lys Ile Glu Thr Ala Phe Leu Asn Ala
                245                 250                 255
Leu Val Tyr Leu Ser Pro Asn Val Glu Cys Asp Leu Thr Tyr His Asn
                260                 265                 270
```

```
Val Tyr Ser Arg Asp Pro Asn Tyr Leu Asn Leu Phe Ile Ile Val Met
        275                 280                 285

Glu Asn Arg Asn Leu His Ser Pro Glu Tyr Leu Glu Met Ala Leu Pro
        290                 295                 300

Leu Phe Cys Lys Ala Met Ser Lys Leu Pro Leu Ala Ala Gln Gly Lys
305                 310                 315                 320

Leu Ile Arg Leu Trp Ser Lys Tyr Asn Ala Asp Gln Ile Arg Arg Met
                325                 330                 335

Met Glu Thr Phe Gln Gln Leu Ile Thr Tyr Lys Val Ile Ser Asn Glu
                340                 345                 350

Phe Asn Ser Arg Asn Leu Val Asn Asp Asp Ala Ile Val Ala Ala
            355                 360                 365

Ser Lys Cys Leu Lys Met Val Tyr Tyr Ala Asn Val Val Gly Gly Glu
370                 375                 380

Val Asp Thr Asn His Asn Glu Glu Asp Asp Glu Pro Ile Pro Glu
385                 390                 395                 400

Ser Ser Glu Leu Thr Leu Gln Glu Leu Leu Gly Glu Arg Arg Asn
                405                 410                 415

Lys Lys Gly Pro Arg Val Asp Pro Leu Glu Thr Glu Leu Gly Val Lys
                420                 425                 430

Thr Leu Asp Cys Arg Lys Pro Leu Ile Pro Phe Glu Glu Phe Ile Asn
            435                 440                 445

Glu Pro Leu Asn Glu Val Leu Glu Met Asp Lys Asp Tyr Thr Phe Phe
        450                 455                 460

Lys Val Glu Thr Glu Asn Lys Phe Ser Phe Met Thr Cys Pro Phe Ile
465                 470                 475                 480

Leu Asn Ala Val Thr Lys Asn Leu Gly Leu Tyr Tyr Asp Asn Arg Ile
                485                 490                 495

Arg Met Tyr Ser Glu Arg Arg Ile Thr Val Leu Tyr Ser Leu Val Gln
                500                 505                 510

Gly Gln Gln Leu Asn Pro Tyr Leu Arg Leu Lys Val Arg Arg Asp His
            515                 520                 525

Ile Ile Asp Asp Ala Leu Val Arg Leu Glu Met Ile Ala Met Glu Asn
            530                 535                 540

Pro Ala Asp Leu Lys Lys Gln Leu Tyr Val Glu Phe Glu Gly Glu Gln
545                 550                 555                 560

Gly Val Asp Glu Gly Gly Val Ser Lys Glu Phe Phe Gln Leu Val Val
                565                 570                 575

Glu Glu Ile Phe Asn Pro Asp Ile Gly Met Phe Thr Tyr Asp Glu Ser
            580                 585                 590

Thr Lys Leu Phe Trp Phe Asn Pro Ser Ser Phe Glu Thr Glu Gly Gln
        595                 600                 605

Phe Thr Leu Ile Gly Ile Val Leu Gly Leu Ala Ile Tyr Asn Asn Cys
610                 615                 620

Ile Leu Asp Val His Phe Pro Met Val Val Tyr Arg Lys Leu Met Gly
625                 630                 635                 640

Lys Lys Gly Thr Phe Arg Asp Leu Gly Asp Ser His Pro Val Leu Tyr
                645                 650                 655

Gln Ser Leu Lys Asp Leu Leu Glu Tyr Glu Gly Asn Val Glu Asp Asp
            660                 665                 670

Met Met Ile Thr Phe Gln Ile Ser Gln Thr Asp Leu Phe Gly Asn Pro
            675                 680                 685
```

```
Met Met Tyr Asp Leu Lys Glu Asn Gly Asp Lys Ile Pro Ile Thr Asn
    690                 695                 700
Glu Asn Arg Lys Glu Phe Val Asn Leu Tyr Ser Asp Tyr Ile Leu Asn
705                 710                 715                 720
Lys Ser Val Glu Lys Gln Phe Lys Ala Phe Arg Arg Gly Phe His Met
                725                 730                 735
Val Thr Asn Glu Ser Pro Leu Lys Tyr Leu Phe Arg Pro Glu Glu Ile
            740                 745                 750
Glu Leu Leu Ile Cys Gly Ser Arg Asn Leu Gly Phe Gln Ala Leu Glu
        755                 760                 765
Glu Thr Thr Glu Tyr Asp Gly Gly Tyr Thr Arg Asp Ser Val Leu Ile
    770                 775                 780
Arg Glu Phe Trp Glu Ile Val His Ser Phe Thr Asp Glu Gln Lys Arg
785                 790                 795                 800
Leu Phe Leu Gln Phe Thr Thr Gly Thr Asp Arg Ala Pro Val Gly Gly
                805                 810                 815
Leu Gly Lys Leu Lys Met Ile Ile Ala Lys Asn Gly Pro Asp Thr Glu
            820                 825                 830
Arg Leu Pro Thr Ser His Thr Cys Phe Asn Val Leu Leu Leu Pro Glu
        835                 840                 845
Tyr Ser Ser Lys Glu Lys Leu Lys Glu Arg Leu Leu Lys Ala Ile Thr
    850                 855                 860
Tyr Ala Lys Gly Phe Gly Met Leu
865                 870

<210> SEQ ID NO 10
<211> LENGTH: 261
<212> TYPE: PRT
<213> ORGANISM: Homo sapiens

<400> SEQUENCE: 10

Met Ala Leu Asn Lys Asn His Ser Glu Gly Gly Gly Val Ile Val Asn
1               5                   10                  15
Asn Thr Glu Ser Ile Leu Met Ser Tyr Asp His Val Glu Leu Thr Phe
            20                  25                  30
Asn Asp Met Lys Asn Val Pro Glu Ala Phe Lys Gly Thr Lys Lys Gly
        35                  40                  45
Thr Val Tyr Leu Thr Pro Tyr Arg Val Ile Phe Leu Ser Lys Gly Lys
    50                  55                  60
Asp Ala Met Gln Ser Phe Met Met Pro Phe Tyr Leu Met Lys Asp Cys
65                  70                  75                  80
Glu Ile Lys Gln Pro Val Phe Gly Ala Asn Tyr Ile Lys Gly Thr Val
                85                  90                  95
Lys Ala Glu Ala Gly Gly Gly Trp Glu Gly Ser Ala Ser Tyr Lys Leu
            100                 105                 110
Thr Phe Thr Ala Gly Gly Ala Ile Glu Phe Gly Gln Arg Met Leu Gln
        115                 120                 125
Val Ala Ser Gln Ala Ser Arg Gly Glu Val Pro Ser Gly Ala Tyr Gly
    130                 135                 140
Tyr Ser Tyr Met Pro Ser Gly Ala Tyr Val Tyr Pro Pro Val Ala
145                 150                 155                 160
Asn Gly Met Tyr Pro Cys Pro Pro Gly Tyr Pro Tyr Pro Pro Pro
                165                 170                 175
Pro Glu Phe Tyr Pro Gly Pro Pro Met Met Asp Gly Ala Met Gly Tyr
            180                 185                 190
```

```
Val Gln Pro Pro Pro Pro Tyr Pro Gly Pro Met Glu Pro Pro Val
        195                 200                 205

Ser Gly Pro Asp Val Pro Ser Thr Pro Ala Ala Glu Ala Lys Ala Ala
    210                 215                 220

Glu Ala Ala Ala Ser Ala Tyr Tyr Asn Pro Gly Asn Pro His Asn Val
225                 230                 235                 240

Tyr Met Pro Thr Ser Gln Pro Pro Pro Tyr Tyr Pro Pro Glu
            245                 250                 255

Asp Lys Lys Thr Gln
            260

<210> SEQ ID NO 11
<211> LENGTH: 433
<212> TYPE: PRT
<213> ORGANISM: Homo sapiens

<400> SEQUENCE: 11

Met Gly Arg Val Gln Leu Phe Glu Ile Ser Leu Ser His Gly Arg Val
1               5                   10                  15

Val Tyr Ser Pro Gly Glu Pro Leu Ala Gly Thr Val Arg Val Arg Leu
            20                  25                  30

Gly Ala Pro Leu Pro Phe Arg Ala Ile Arg Val Thr Cys Ile Gly Ser
        35                  40                  45

Cys Gly Val Ser Asn Lys Ala Asn Asp Thr Ala Trp Val Val Glu Glu
    50                  55                  60

Gly Tyr Phe Asn Ser Ser Leu Ser Leu Ala Asp Lys Gly Ser Leu Pro
65                  70                  75                  80

Ala Gly Glu His Ser Phe Pro Phe Gln Phe Leu Leu Pro Ala Thr Ala
                85                  90                  95

Pro Thr Ser Phe Glu Gly Pro Phe Gly Lys Ile Val His Gln Val Arg
            100                 105                 110

Ala Ala Ile His Thr Pro Arg Phe Ser Lys Asp His Lys Cys Ser Leu
        115                 120                 125

Val Phe Tyr Ile Leu Ser Pro Leu Asn Leu Asn Ser Ile Pro Asp Ile
    130                 135                 140

Glu Gln Pro Asn Val Ala Ser Ala Thr Lys Lys Phe Ser Tyr Lys Leu
145                 150                 155                 160

Val Lys Thr Gly Ser Val Val Leu Thr Ala Ser Thr Asp Leu Arg Gly
                165                 170                 175

Tyr Val Val Gly Gln Ala Leu Gln Leu His Ala Asp Val Glu Asn Gln
            180                 185                 190

Ser Gly Lys Asp Thr Ser Pro Val Val Ala Ser Leu Leu Gln Lys Val
        195                 200                 205

Ser Tyr Lys Ala Lys Arg Trp Ile His Asp Val Arg Thr Ile Ala Glu
    210                 215                 220

Val Glu Gly Ala Gly Val Lys Ala Trp Arg Arg Ala Gln Trp His Glu
225                 230                 235                 240

Gln Ile Leu Val Pro Ala Leu Pro Gln Ser Ala Leu Pro Gly Cys Ser
                245                 250                 255

Leu Ile His Ile Asp Tyr Tyr Leu Gln Val Ser Leu Lys Ala Pro Glu
            260                 265                 270

Ala Thr Val Thr Leu Pro Val Phe Ile Gly Asn Ile Ala Val Asn His
        275                 280                 285

Ala Pro Val Ser Pro Arg Pro Gly Leu Gly Leu Pro Pro Gly Ala Pro
```

```
            290                 295                 300
Pro Leu Val Val Pro Ser Ala Pro Pro Gln Glu Ala Glu Ala Glu
305                 310                 315                 320

Ala Ala Ala Gly Gly Pro His Phe Leu Asp Pro Val Phe Leu Ser Thr
                325                 330                 335

Lys Ser His Ser Gln Arg Gln Pro Leu Leu Ala Thr Leu Ser Ser Val
            340                 345                 350

Pro Gly Ala Pro Glu Pro Cys Pro Gln Asp Gly Ser Pro Ala Ser His
            355                 360                 365

Pro Leu His Pro Pro Leu Cys Ile Ser Thr Gly Ala Thr Val Pro Tyr
        370                 375                 380

Phe Ala Glu Gly Ser Gly Pro Val Pro Thr Thr Ser Thr Leu Ile
385                 390                 395                 400

Leu Pro Pro Glu Tyr Ser Ser Trp Gly Tyr Pro Tyr Glu Ala Pro Pro
                405                 410                 415

Ser Tyr Glu Gln Ser Cys Gly Gly Val Glu Pro Ser Leu Thr Pro Glu
                420                 425                 430

Ser
```

<210> SEQ ID NO 12
<211> LENGTH: 414
<212> TYPE: PRT
<213> ORGANISM: Homo sapiens

<400> SEQUENCE: 12

```
Met Val Leu Gly Lys Val Lys Ser Leu Thr Ile Ser Phe Asp Cys Leu
1               5                   10                  15

Asn Asp Ser Asn Val Pro Val Tyr Ser Ser Gly Asp Thr Val Ser Gly
                20                  25                  30

Arg Val Asn Leu Glu Val Thr Gly Glu Ile Arg Val Lys Ser Leu Lys
            35                  40                  45

Ile His Ala Arg Gly His Ala Lys Val Arg Trp Thr Glu Ser Arg Asn
        50                  55                  60

Ala Gly Ser Asn Thr Ala Tyr Thr Gln Asn Tyr Thr Glu Glu Val Glu
65                  70                  75                  80

Tyr Phe Asn His Lys Asp Ile Leu Ile Gly His Glu Arg Asp Asp Asp
                85                  90                  95

Asn Ser Glu Glu Gly Phe His Thr Ile His Ser Gly Arg His Glu Tyr
                100                 105                 110

Ala Phe Ser Phe Glu Leu Pro Gln Thr Pro Leu Ala Thr Ser Phe Glu
            115                 120                 125

Gly Arg His Gly Ser Val Arg Tyr Trp Val Lys Ala Glu Leu His Arg
        130                 135                 140

Pro Trp Leu Leu Pro Val Lys Leu Lys Lys Glu Phe Thr Val Phe Glu
145                 150                 155                 160

His Ile Asp Ile Asn Thr Pro Ser Leu Leu Ser Pro Gln Ala Gly Thr
                165                 170                 175

Lys Glu Lys Thr Leu Cys Cys Trp Phe Cys Thr Ser Gly Pro Ile Ser
            180                 185                 190

Leu Ser Ala Lys Ile Glu Arg Lys Gly Tyr Thr Pro Gly Glu Ser Ile
        195                 200                 205

Gln Ile Phe Ala Glu Ile Glu Asn Cys Ser Ser Arg Met Val Val Pro
    210                 215                 220

Lys Ala Ala Ile Tyr Gln Thr Gln Ala Phe Tyr Ala Lys Gly Lys Met
```

```
             225                 230                 235                 240
Lys Glu Val Lys Gln Leu Val Ala Asn Leu Arg Gly Glu Ser Leu Ser
                        245                 250                 255

Ser Gly Lys Thr Glu Thr Trp Asn Gly Lys Leu Leu Lys Ile Pro Pro
            260                 265                 270

Val Ser Pro Ser Ile Leu Asp Cys Ser Ile Ile Arg Val Glu Tyr Ser
            275                 280                 285

Leu Met Val Tyr Val Asp Ile Pro Gly Ala Met Asp Leu Phe Leu Asn
    290                 295                 300

Leu Pro Leu Val Ile Gly Thr Ile Pro Leu His Pro Phe Gly Ser Arg
305                 310                 315                 320

Thr Ser Ser Val Ser Ser Gln Cys Ser Met Asn Met Asn Trp Leu Ser
                325                 330                 335

Leu Ser Leu Pro Glu Arg Pro Glu Ala Pro Ser Tyr Ala Glu Val
                340                 345                 350

Val Thr Glu Glu Gln Arg Arg Asn Asn Leu Ala Pro Val Ser Ala Cys
                355                 360                 365

Asp Asp Phe Glu Arg Ala Leu Gln Gly Pro Leu Phe Ala Tyr Ile Gln
    370                 375                 380

Glu Phe Arg Phe Leu Pro Pro Leu Tyr Ser Glu Ile Asp Pro Asn
385                 390                 395                 400

Pro Asp Gln Ser Ala Asp Asp Arg Pro Ser Cys Pro Ser Arg
                405                 410

<210> SEQ ID NO 13
<211> LENGTH: 255
<212> TYPE: PRT
<213> ORGANISM: Homo sapiens

<400> SEQUENCE: 13

Met Ser Cys Gly Arg Leu Gly Arg Phe Lys Ala Thr Leu Trp Leu Ser
1               5                   10                  15

Glu Glu His Pro Leu Ser Leu Gly Asp Gln Val Thr Pro Ile Ile Asp
            20                  25                  30

Leu Met Ala Ile Ser Asn Ala His Phe Ala Lys Leu Arg Asp Phe Ile
        35                  40                  45

Thr Leu Arg Leu Pro Pro Gly Phe Pro Val Lys Ile Glu Ile Pro Leu
    50                  55                  60

Phe His Val Leu Asn Ala Arg Ile Thr Phe Ser Asn Leu Cys Gly Cys
65                  70                  75                  80

Asp Glu Pro Leu Ser Ser Val Trp Val Pro Ala Pro Ser Ser Ala Val
                85                  90                  95

Ala Ala Ser Gly Asn Pro Phe Pro Cys Glu Val Asp Pro Thr Val Phe
            100                 105                 110

Glu Val Pro Asn Gly Tyr Ser Val Leu Gly Met Glu Arg Asn Glu Pro
        115                 120                 125

Leu Arg Asp Glu Asp Asp Leu Leu Gln Phe Ala Ile Gln Gln Ser
    130                 135                 140

Leu Leu Glu Ala Gly Thr Glu Ala Glu Gln Val Thr Val Trp Glu Ala
145                 150                 155                 160

Leu Thr Asn Thr Arg Pro Gly Ala Arg Pro Pro Gln Ala Thr Val
                165                 170                 175

Tyr Glu Glu Gln Leu Gln Leu Gly Arg Ala Leu Gln Glu Ser Leu Gln
            180                 185                 190
```

```
Leu Ser Thr Glu Pro Arg Gly Pro Gly Ser Pro Pro Arg Thr Pro Pro
            195                 200                 205

Ala Pro Gly Pro Pro Ser Phe Glu Glu Gln Leu Arg Leu Ala Leu Glu
        210                 215                 220

Leu Ser Ser Arg Glu Gln Glu Arg Glu Arg Arg Gly Gln Gln Glu
225                 230                 235                 240

Glu Glu Asp Leu Gln Arg Ile Leu Gln Leu Ser Leu Thr Glu His
                245                 250                 255

<210> SEQ ID NO 14
<211> LENGTH: 497
<212> TYPE: PRT
<213> ORGANISM: Homo sapiens

<400> SEQUENCE: 14

Met Thr Phe Asn Ser Phe Glu Gly Ser Lys Thr Cys Val Pro Ala Asp
1               5                   10                  15

Ile Asn Lys Glu Glu Glu Phe Val Glu Phe Asn Arg Leu Lys Thr
            20                  25                  30

Phe Ala Asn Phe Pro Ser Gly Ser Pro Val Ser Ala Ser Thr Leu Ala
        35                  40                  45

Arg Ala Gly Phe Leu Tyr Thr Gly Glu Gly Asp Thr Val Arg Cys Phe
    50                  55                  60

Ser Cys His Ala Ala Val Asp Arg Trp Gln Tyr Gly Asp Ser Ala Val
65                  70                  75                  80

Gly Arg His Arg Lys Val Ser Pro Asn Cys Arg Phe Ile Asn Gly Phe
                85                  90                  95

Tyr Leu Glu Asn Ser Ala Thr Gln Ser Thr Asn Ser Gly Ile Gln Asn
            100                 105                 110

Gly Gln Tyr Lys Val Glu Asn Tyr Leu Gly Ser Arg Asp His Phe Ala
        115                 120                 125

Leu Asp Arg Pro Ser Glu Thr His Ala Asp Tyr Leu Leu Arg Thr Gly
    130                 135                 140

Gln Val Val Asp Ile Ser Asp Thr Ile Tyr Pro Arg Asn Pro Ala Met
145                 150                 155                 160

Tyr Ser Glu Glu Ala Arg Leu Lys Ser Phe Gln Asn Trp Pro Asp Tyr
                165                 170                 175

Ala His Leu Thr Pro Arg Glu Leu Ala Ser Ala Gly Leu Tyr Tyr Thr
            180                 185                 190

Gly Ile Gly Asp Gln Val Gln Cys Phe Cys Cys Gly Gly Lys Leu Lys
        195                 200                 205

Asn Trp Glu Pro Cys Asp Arg Ala Trp Ser Glu His Arg Arg His Phe
    210                 215                 220

Pro Asn Cys Phe Phe Val Leu Gly Arg Asn Leu Asn Ile Arg Ser Glu
225                 230                 235                 240

Ser Asp Ala Val Ser Ser Asp Arg Asn Phe Pro Asn Ser Thr Asn Leu
                245                 250                 255

Pro Arg Asn Pro Ser Met Ala Asp Tyr Glu Ala Arg Ile Phe Thr Phe
            260                 265                 270

Gly Thr Trp Ile Tyr Ser Val Asn Lys Glu Gln Leu Ala Arg Ala Gly
        275                 280                 285

Phe Tyr Ala Leu Gly Glu Gly Asp Lys Val Lys Cys Phe His Cys Gly
    290                 295                 300

Gly Gly Leu Thr Asp Trp Lys Pro Ser Glu Asp Pro Trp Glu Gln His
305                 310                 315                 320
```

Ala Lys Trp Tyr Pro Gly Cys Lys Tyr Leu Glu Gln Lys Gly Gln
        325                 330                 335

Glu Tyr Ile Asn Asn Ile His Leu Thr His Ser Leu Glu Glu Cys Leu
            340                 345                 350

Val Arg Thr Thr Glu Lys Thr Pro Ser Leu Thr Arg Arg Ile Asp Asp
        355                 360                 365

Thr Ile Phe Gln Asn Pro Met Val Gln Glu Ala Ile Arg Met Gly Phe
    370                 375                 380

Ser Phe Lys Asp Ile Lys Lys Ile Met Glu Glu Lys Ile Gln Ile Ser
385                 390                 395                 400

Gly Ser Asn Tyr Lys Ser Leu Glu Val Leu Val Ala Asp Leu Val Asn
                405                 410                 415

Ala Gln Lys Asp Ser Met Gln Asp Glu Ser Ser Gln Thr Ser Leu Gln
            420                 425                 430

Lys Glu Ile Ser Thr Glu Glu Gln Leu Arg Arg Leu Gln Glu Glu Lys
        435                 440                 445

Leu Cys Lys Ile Cys Met Asp Arg Asn Ile Ala Ile Val Phe Val Pro
    450                 455                 460

Cys Gly His Leu Val Thr Cys Lys Gln Cys Ala Glu Ala Val Asp Lys
465                 470                 475                 480

Cys Pro Met Cys Tyr Thr Val Ile Thr Phe Lys Gln Lys Ile Phe Met
                485                 490                 495

Ser

<210> SEQ ID NO 15
<211> LENGTH: 298
<212> TYPE: PRT
<213> ORGANISM: Homo sapiens

<400> SEQUENCE: 15

Met Gly Pro Lys Asp Ser Ala Lys Cys Leu His Arg Gly Pro Gln Pro
1               5                   10                  15

Ser His Trp Ala Ala Gly Asp Gly Pro Thr Gln Glu Arg Cys Gly Pro
            20                  25                  30

Arg Ser Leu Gly Ser Pro Val Leu Gly Leu Asp Thr Cys Arg Ala Trp
        35                  40                  45

Asp His Val Asp Gly Gln Ile Leu Gly Gln Leu Arg Pro Leu Thr Glu
    50                  55                  60

Glu Glu Glu Glu Glu Gly Ala Gly Ala Thr Leu Ser Arg Gly Pro Ala
65                  70                  75                  80

Phe Pro Gly Met Gly Ser Glu Glu Leu Arg Leu Ala Ser Phe Tyr Asp
                85                  90                  95

Trp Pro Leu Thr Ala Glu Val Pro Pro Glu Leu Leu Ala Ala Ala Gly
            100                 105                 110

Phe Phe His Thr Gly His Gln Asp Lys Val Arg Cys Phe Phe Cys Tyr
        115                 120                 125

Gly Gly Leu Gln Ser Trp Lys Arg Gly Asp Asp Pro Trp Thr Glu His
    130                 135                 140

Ala Lys Trp Phe Pro Ser Cys Gln Phe Leu Leu Arg Ser Lys Gly Arg
145                 150                 155                 160

Asp Phe Val His Ser Val Gln Glu Thr His Ser Gln Leu Leu Gly Ser
                165                 170                 175

Trp Asp Pro Trp Glu Glu Pro Glu Asp Ala Ala Pro Val Ala Pro Ser
            180                 185                 190

```
Val Pro Ala Ser Gly Tyr Pro Glu Leu Pro Thr Pro Arg Arg Glu Val
            195                 200                 205

Gln Ser Glu Ser Ala Gln Glu Pro Gly Gly Val Ser Pro Ala Glu Ala
        210                 215                 220

Gln Arg Ala Trp Trp Val Leu Glu Pro Pro Gly Ala Arg Asp Val Glu
225                 230                 235                 240

Ala Gln Leu Arg Arg Leu Gln Glu Glu Arg Thr Cys Lys Val Cys Leu
                245                 250                 255

Asp Arg Ala Val Ser Ile Val Phe Val Pro Cys Gly His Leu Val Cys
                260                 265                 270

Ala Glu Cys Ala Pro Gly Leu Gln Leu Cys Pro Ile Cys Arg Ala Pro
            275                 280                 285

Val Arg Ser Arg Val Arg Thr Phe Leu Ser
        290                 295
```

<210> SEQ ID NO 16
<211> LENGTH: 306
<212> TYPE: PRT
<213> ORGANISM: Homo sapiens

<400> SEQUENCE: 16

```
Met Pro Glu Ala Gly Phe Gln Ala Thr Asn Ala Phe Thr Glu Cys Lys
1               5                   10                  15

Phe Thr Cys Thr Ser Gly Lys Cys Leu Tyr Leu Gly Ser Leu Val Cys
                20                  25                  30

Asn Gln Gln Asn Asp Cys Gly Asp Asn Ser Asp Glu Glu Asn Cys Leu
            35                  40                  45

Leu Val Thr Glu His Pro Pro Pro Gly Ile Phe Asn Ser Glu Leu Glu
        50                  55                  60

Phe Ala Gln Ile Ile Ile Ile Val Val Val Thr Val Met Val Val Val
65                  70                  75                  80

Val Ile Val Cys Leu Leu Asn His Tyr Lys Val Ser Thr Arg Ser Phe
                85                  90                  95

Ile Asn Arg Pro Asn Gln Ser Arg Arg Arg Glu Asp Gly Leu Pro Gln
                100                 105                 110

Glu Gly Cys Leu Trp Pro Ser Asp Ser Ala Ala Pro Arg Leu Gly Ala
            115                 120                 125

Ser Glu Ile Met His Ala Pro Arg Ser Arg Asp Arg Phe Thr Ala Pro
        130                 135                 140

Ser Phe Ile Gln Arg Asp Arg Phe Ser Arg Phe Gln Pro Thr Tyr Pro
145                 150                 155                 160

Tyr Val Gln His Glu Ile Asp Leu Pro Pro Thr Ile Ser Leu Ser Asp
                165                 170                 175

Gly Glu Glu Pro Pro Pro Tyr Gln Gly Pro Cys Thr Leu Gln Leu Arg
            180                 185                 190

Asp Pro Glu Gln Gln Met Glu Leu Asn Arg Glu Ser Val Arg Ala Pro
        195                 200                 205

Pro Asn Arg Thr Ile Phe Asp Ser Asp Leu Ile Asp Ile Ala Met Tyr
    210                 215                 220

Ser Gly Gly Pro Cys Pro Ser Ser Asn Ser Gly Ile Ser Ala Ser
225                 230                 235                 240

Thr Cys Ser Ser Asn Gly Arg Met Glu Gly Pro Pro Thr Tyr Ser
                245                 250                 255

Glu Val Met Gly His His Pro Gly Ala Ser Phe Leu His His Gln Arg
```

```
            260                 265                 270
Ser Asn Ala His Arg Gly Ser Arg Leu Gln Phe Gln Gln Asn Asn Ala
        275                 280                 285
Glu Ser Thr Ile Val Pro Ile Lys Gly Lys Asp Arg Lys Pro Gly Asn
        290                 295                 300
Leu Val
305

<210> SEQ ID NO 17
<211> LENGTH: 170
<212> TYPE: PRT
<213> ORGANISM: Homo sapiens

<400> SEQUENCE: 17

Met Gln Asn Arg Thr Gly Leu Ile Leu Cys Ala Leu Ala Leu Leu Met
1               5                   10                  15
Gly Phe Leu Met Val Cys Leu Gly Ala Phe Phe Ile Ser Trp Gly Ser
                20                  25                  30
Ile Phe Asp Cys Gln Gly Ser Leu Ile Ala Ala Tyr Leu Leu Leu Pro
            35                  40                  45
Leu Gly Phe Val Ile Leu Leu Ser Gly Ile Phe Trp Ser Asn Tyr Arg
        50                  55                  60
Gln Val Thr Glu Ser Lys Gly Val Leu Arg His Met Leu Arg Gln His
65                  70                  75                  80
Leu Ala His Gly Ala Leu Pro Val Ala Thr Val Asp Arg Pro Asp Phe
                85                  90                  95
Tyr Pro Pro Ala Tyr Glu Glu Ser Leu Glu Val Glu Lys Gln Ser Cys
            100                 105                 110
Pro Ala Glu Arg Glu Ala Ser Gly Ile Pro Pro Pro Leu Tyr Thr Glu
        115                 120                 125
Thr Gly Leu Glu Phe Gln Asp Gly Asn Asp Ser His Pro Glu Ala Pro
    130                 135                 140
Pro Ser Tyr Arg Glu Ser Ile Ala Gly Leu Val Val Thr Ala Ile Ser
145                 150                 155                 160
Glu Asp Ala Gln Arg Arg Gly Gln Glu Cys
                165                 170

<210> SEQ ID NO 18
<211> LENGTH: 386
<212> TYPE: PRT
<213> ORGANISM: Homo sapiens

<400> SEQUENCE: 18

Met Thr Ser Leu Phe Arg Arg Ser Ser Gly Ser Gly Gly Gly Gly Gly
1               5                   10                  15
Thr Ala Gly Ala Arg Gly Gly Gly Gly Thr Ala Ala Pro Gln Glu
                20                  25                  30
Leu Asn Asn Ser Arg Pro Ala Arg Gln Val Arg Leu Glu Phe Asn
            35                  40                  45
Gln Ala Met Asp Asp Phe Lys Thr Met Phe Pro Asn Met Asp Tyr Asp
        50                  55                  60
Ile Ile Glu Cys Val Leu Arg Ala Asn Ser Gly Ala Val Asp Ala Thr
65                  70                  75                  80
Ile Asp Gln Leu Leu Gln Met Asn Leu Glu Gly Gly Gly Ser Ser Gly
                85                  90                  95
Gly Val Tyr Glu Asp Ser Ser Asp Ser Glu Asp Ser Ile Pro Pro Glu
```

```
            100                 105                 110
Ile Leu Glu Arg Thr Leu Glu Pro Asp Ser Ser Asp Glu Glu Pro Pro
            115                 120                 125
Pro Val Tyr Ser Pro Ala Tyr His Met His Val Phe Asp Arg Pro
        130                 135                 140
Tyr Pro Leu Ala Pro Thr Pro Pro Arg Ile Asp Ala Leu Gly
145                 150                 155                 160
Ser Gly Ala Pro Thr Ser Gln Arg Arg Tyr Arg Asn Trp Asn Pro Pro
                    165                 170                 175
Leu Leu Gly Asn Leu Pro Asp Asp Phe Leu Arg Ile Leu Pro Gln Gln
            180                 185                 190
Leu Asp Ser Ile Gln Gly Asn Ala Gly Gly Pro Lys Pro Gly Ser Gly
            195                 200                 205
Glu Gly Cys Pro Pro Ala Met Ala Gly Pro Gly Pro Gly Asp Gln Glu
        210                 215                 220
Ser Arg Trp Lys Gln Tyr Leu Glu Asp Glu Arg Ile Ala Leu Phe Leu
225                 230                 235                 240
Gln Asn Glu Glu Phe Met Lys Glu Leu Gln Arg Asn Arg Asp Phe Leu
                    245                 250                 255
Leu Ala Leu Glu Arg Asp Arg Leu Lys Tyr Glu Ser Gln Lys Ser Lys
            260                 265                 270
Ser Ser Ser Val Ala Val Gly Asn Asp Phe Gly Phe Ser Ser Pro Val
            275                 280                 285
Pro Gly Thr Gly Asp Ala Asn Pro Ala Val Ser Glu Asp Ala Leu Phe
        290                 295                 300
Arg Asp Lys Leu Lys His Met Gly Lys Ser Thr Arg Arg Lys Leu Phe
305                 310                 315                 320
Glu Leu Ala Arg Ala Phe Ser Glu Lys Thr Lys Met Arg Lys Ser Lys
                    325                 330                 335
Arg Lys His Leu Leu Lys His Gln Ser Leu Gly Ala Ala Ala Ser Thr
            340                 345                 350
Ala Asn Leu Leu Asp Asp Val Glu Gly His Ala Cys Asp Glu Asp Phe
            355                 360                 365
Arg Gly Arg Arg Gln Glu Ala Pro Lys Val Glu Glu Gly Leu Arg Glu
        370                 375                 380
Gly Gln
385

<210> SEQ ID NO 19
<211> LENGTH: 168
<212> TYPE: PRT
<213> ORGANISM: Homo sapiens

<400> SEQUENCE: 19

Met Asn Ser Lys Gly Gln Tyr Pro Thr Gln Pro Thr Tyr Pro Val Gln
1               5                   10                  15
Pro Pro Gly Asn Pro Val Tyr Pro Gln Thr Leu His Leu Pro Gln Ala
            20                  25                  30
Pro Pro Tyr Thr Asp Ala Pro Pro Ala Tyr Ser Glu Leu Tyr Arg Pro
        35                  40                  45
Ser Phe Val His Pro Gly Ala Ala Thr Val Pro Thr Met Ser Ala Ala
    50                  55                  60
Phe Pro Gly Ala Ser Leu Tyr Leu Pro Met Ala Gln Ser Val Ala Val
65                  70                  75                  80
```

```
Gly Pro Leu Gly Ser Thr Ile Pro Met Ala Tyr Tyr Pro Val Gly Pro
                85                  90                  95
Ile Tyr Pro Pro Gly Ser Thr Val Leu Val Glu Gly Gly Tyr Asp Ala
            100                 105                 110
Gly Ala Arg Phe Gly Ala Gly Ala Thr Ala Gly Asn Ile Pro Pro Pro
        115                 120                 125
Pro Pro Gly Cys Pro Pro Asn Ala Ala Gln Leu Ala Val Met Gln Gly
    130                 135                 140
Ala Asn Val Leu Val Thr Gln Arg Lys Gly Asn Phe Phe Met Gly Gly
145                 150                 155                 160
Ser Asp Gly Gly Tyr Thr Ile Trp
                165

<210> SEQ ID NO 20
<211> LENGTH: 396
<212> TYPE: PRT
<213> ORGANISM: Homo sapiens

<400> SEQUENCE: 20

Met Leu Ile Thr Val Tyr Cys Val Arg Arg Asp Leu Ser Glu Val Thr
1               5                   10                  15
Phe Ser Leu Gln Val Ser Pro Asp Phe Glu Leu Arg Asn Phe Lys Val
            20                  25                  30
Leu Cys Glu Ala Glu Ser Arg Val Pro Val Glu Ile Gln Ile Ile
        35                  40                  45
His Met Glu Arg Leu Leu Ile Glu Asp His Cys Ser Leu Gly Ser Tyr
    50                  55                  60
Gly Leu Lys Asp Gly Asp Ile Val Val Leu Leu Gln Lys Asp Asn Val
65                  70                  75                  80
Gly Pro Arg Ala Pro Gly Arg Ala Pro Asn Gln Pro Arg Val Asp Phe
                85                  90                  95
Ser Gly Ile Ala Val Pro Gly Thr Ser Ser Ser Arg Pro Gln His Pro
            100                 105                 110
Gly Gln Gln Gln Gln Arg Thr Pro Ala Ala Gly Arg Ser Gln Gly Leu
        115                 120                 125
Ala Ser Gly Glu Lys Val Ala Gly Leu Gln Gly Leu Gly Ser Pro Ala
    130                 135                 140
Leu Ile Arg Ser Met Leu Leu Ser Asn Pro His Asp Leu Ser Leu Leu
145                 150                 155                 160
Lys Glu Arg Asn Pro Pro Leu Ala Glu Ala Leu Leu Ser Gly Ser Leu
                165                 170                 175
Glu Thr Phe Ser Gln Val Leu Met Glu Gln Gln Arg Glu Lys Ala Leu
            180                 185                 190
Arg Glu Gln Glu Arg Leu Arg Leu Tyr Thr Ala Asp Pro Leu Asp Arg
        195                 200                 205
Glu Ala Gln Ala Lys Ile Glu Glu Ile Arg Gln Gln Asn Ile Glu
    210                 215                 220
Glu Asn Met Asn Ile Ala Ile Glu Ala Pro Glu Ser Phe Gly Gln
225                 230                 235                 240
Val Thr Met Leu Tyr Ile Asn Cys Lys Val Asn Gly His Pro Leu Lys
                245                 250                 255
Ala Phe Val Asp Ser Gly Ala Gln Met Thr Ile Met Ser Gln Ala Cys
            260                 265                 270
Ala Glu Arg Cys Asn Ile Met Arg Leu Val Asp Arg Arg Trp Ala Gly
        275                 280                 285
```

```
Val Ala Lys Gly Val Gly Thr Gln Arg Ile Ile Gly Arg Val His Leu
    290                 295                 300

Ala Gln Ile Gln Ile Glu Gly Asp Phe Leu Gln Cys Ser Phe Ser Ile
305                 310                 315                 320

Leu Glu Asp Gln Pro Met Asp Met Leu Leu Gly Leu Asp Met Leu Arg
                325                 330                 335

Arg His Gln Cys Ser Ile Asp Leu Lys Lys Asn Val Leu Val Ile Gly
                340                 345                 350

Thr Thr Gly Thr Gln Thr Tyr Phe Leu Pro Glu Gly Glu Leu Pro Leu
            355                 360                 365

Cys Ser Arg Met Val Ser Gly Gln Asp Glu Ser Ser Asp Lys Glu Ile
        370                 375                 380

Thr His Ser Val Met Asp Ser Gly Arg Lys Glu His
385                 390                 395

<210> SEQ ID NO 21
<211> LENGTH: 650
<212> TYPE: PRT
<213> ORGANISM: Homo sapiens

<400> SEQUENCE: 21

Met Ala Glu Gly Thr Ala Glu Ala Pro Leu Glu Asn Gly Gly Gly Gly
1               5                   10                  15

Asp Ser Gly Ala Gly Ala Leu Glu Arg Gly Val Ala Pro Ile Lys Arg
            20                  25                  30

Gln Tyr Leu Thr Thr Lys Glu Gln Phe His Gln Phe Leu Glu Ala Lys
        35                  40                  45

Gly Gln Glu Lys Thr Cys Arg Glu Thr Glu Val Gly Asp Pro Ala Gly
    50                  55                  60

Asn Glu Leu Ala Glu Pro Glu Ala Lys Arg Ile Arg Leu Glu Asp Gly
65                  70                  75                  80

Gln Thr Ala Asp Gly Thr Glu Glu Ala Ala Glu Pro Gly Glu Gln
                85                  90                  95

Leu Gln Thr Gln Lys Arg Ala Arg Gly Gln Asn Lys Gly Arg Pro His
            100                 105                 110

Val Lys Pro Thr Asn Tyr Asp Lys Asn Arg Leu Cys Pro Ser Leu Ile
        115                 120                 125

Gln Glu Ser Ala Ala Lys Cys Phe Phe Gly Asp Arg Cys Arg Phe Leu
    130                 135                 140

His Asp Val Gly Arg Tyr Leu Glu Thr Lys Pro Ala Asp Leu Gly Pro
145                 150                 155                 160

Arg Cys Val Leu Phe Glu Thr Phe Gly Arg Cys Pro Tyr Gly Val Thr
                165                 170                 175

Cys Arg Phe Ala Gly Ala His Leu Gly Pro Glu Gly Gln Asn Leu Val
            180                 185                 190

Gln Glu Glu Leu Ala Ala Arg Gly Thr Gln Pro Pro Ser Ile Arg Asn
        195                 200                 205

Gly Leu Asp Lys Ala Leu Gln Gln Leu Arg Lys Arg Glu Val Arg
    210                 215                 220

Phe Glu Arg Ala Glu Ala Leu Arg Arg Phe Ser Gln Gly Pro Thr
225                 230                 235                 240

Pro Ala Ala Ala Val Pro Glu Gly Thr Ala Ala Glu Gly Ala Pro Arg
                245                 250                 255

Gln Glu Asn Cys Gly Ala Gln Gln Val Pro Ala Gly Pro Gly Thr Ser
```

```
                260                 265                 270
Thr Pro Pro Ser Ser Pro Val Arg Thr Cys Gly Pro Leu Thr Asp Glu
            275                 280                 285

Asp Val Val Arg Leu Arg Pro Cys Glu Lys Lys Arg Leu Asp Ile Arg
290                 295                 300

Gly Lys Leu Tyr Leu Ala Pro Leu Thr Thr Cys Gly Asn Leu Pro Phe
305                 310                 315                 320

Arg Arg Ile Cys Lys Arg Phe Gly Ala Asp Val Thr Cys Gly Glu Met
                325                 330                 335

Ala Val Cys Thr Asn Leu Leu Gln Gly Gln Met Ser Glu Trp Ala Leu
            340                 345                 350

Leu Lys Arg His Gln Cys Glu Asp Ile Phe Gly Val Gln Leu Glu Gly
            355                 360                 365

Ala Phe Pro Asp Thr Met Thr Lys Cys Ala Glu Leu Leu Ser Arg Thr
            370                 375                 380

Val Glu Val Asp Phe Val Asp Ile Asn Val Gly Cys Pro Ile Asp Leu
385                 390                 395                 400

Val Tyr Lys Lys Gly Gly Cys Ala Leu Met Asn Arg Ser Thr Lys
                405                 410                 415

Phe Gln Gln Ile Val Arg Gly Met Asn Gln Val Leu Asp Val Pro Leu
                420                 425                 430

Thr Val Lys Ile Arg Thr Gly Val Gln Glu Arg Val Asn Leu Ala His
            435                 440                 445

Arg Leu Leu Pro Glu Leu Arg Asp Trp Gly Val Ala Leu Val Thr Leu
450                 455                 460

His Gly Arg Ser Arg Glu Gln Arg Tyr Thr Lys Leu Ala Asp Trp Gln
465                 470                 475                 480

Tyr Ile Glu Glu Cys Val Gln Ala Ala Ser Pro Met Pro Leu Phe Gly
                485                 490                 495

Asn Gly Asp Ile Leu Ser Phe Glu Asp Ala Asn Arg Ala Met Gln Thr
            500                 505                 510

Gly Val Thr Gly Ile Met Ile Ala Arg Gly Ala Leu Leu Lys Pro Trp
            515                 520                 525

Leu Phe Thr Glu Ile Lys Glu Gln Arg His Trp Asp Ile Ser Ser Ser
530                 535                 540

Glu Arg Leu Asp Ile Leu Arg Asp Phe Thr Asn Tyr Gly Leu Glu His
545                 550                 555                 560

Trp Gly Ser Asp Thr Gln Gly Val Glu Lys Thr Arg Arg Phe Leu Leu
                565                 570                 575

Glu Trp Leu Ser Phe Leu Cys Arg Tyr Val Pro Val Gly Leu Leu Glu
            580                 585                 590

Arg Leu Pro Gln Arg Ile Asn Glu Arg Pro Tyr Tyr Leu Gly Arg
            595                 600                 605

Asp Tyr Leu Glu Thr Leu Met Ala Ser Gln Lys Ala Ala Asp Trp Ile
            610                 615                 620

Arg Ile Ser Glu Met Leu Leu Gly Pro Val Pro Ser Phe Ala Phe
625                 630                 635                 640

Leu Pro Lys His Lys Ala Asn Ala Tyr Lys
            645                 650

<210> SEQ ID NO 22
<211> LENGTH: 326
<212> TYPE: PRT
<213> ORGANISM: Homo sapiens
```

<400> SEQUENCE: 22

```
Met Gln Pro Pro Val Pro Gly Pro Leu Gly Leu Leu Asp Pro Ala Glu
1               5                   10                  15

Gly Leu Ser Arg Arg Lys Lys Thr Ser Leu Trp Phe Val Gly Ser Leu
            20                  25                  30

Leu Leu Val Ser Val Leu Ile Val Thr Val Gly Leu Ala Ala Thr Thr
        35                  40                  45

Arg Thr Glu Asn Val Thr Val Gly Gly Tyr Tyr Pro Gly Ile Ile Leu
    50                  55                  60

Gly Phe Gly Ser Phe Leu Gly Ile Ile Gly Ile Asn Leu Val Glu Asn
65                  70                  75                  80

Arg Arg Gln Met Leu Val Ala Ala Ile Val Phe Ile Ser Phe Gly Val
                85                  90                  95

Val Ala Ala Phe Cys Cys Ala Ile Val Asp Gly Val Phe Ala Ala Gln
            100                 105                 110

His Ile Glu Pro Arg Pro Leu Thr Thr Gly Arg Cys Gln Phe Tyr Ser
        115                 120                 125

Ser Gly Val Gly Tyr Leu Tyr Asp Val Tyr Gln Thr Glu Val Thr Cys
    130                 135                 140

His Ser Leu Asp Gly Lys Cys Gln Leu Lys Val Arg Ser Asn Thr Cys
145                 150                 155                 160

Tyr Cys Cys Asp Leu Tyr Ala Cys Gly Ser Ala Glu Pro Ser Pro Ala
                165                 170                 175

Tyr Tyr Glu Phe Ile Gly Val Ser Gly Cys Gln Asp Val Leu His Leu
            180                 185                 190

Tyr Arg Leu Leu Trp Ala Ser Ala Val Leu Asn Val Leu Gly Leu Phe
        195                 200                 205

Leu Gly Ile Ile Thr Ala Ala Val Leu Gly Ala Phe Lys Asp Met Val
    210                 215                 220

Pro Leu Ser Gln Leu Ala Tyr Gly Pro Ala Val Pro Pro Gln Thr Leu
225                 230                 235                 240

Tyr Asn Pro Ala Gln Gln Ile Leu Ala Tyr Ala Gly Phe Arg Leu Thr
                245                 250                 255

Pro Glu Pro Val Pro Thr Cys Ser Ser Tyr Pro Leu Pro Leu Gln Pro
            260                 265                 270

Cys Ser Arg Phe Pro Val Ala Pro Ser Ser Ala Leu Ala Ser Ser Glu
        275                 280                 285

Asp Leu Gln Pro Pro Ser Pro Ser Ser Ser Gly Ser Gly Leu Pro Gly
    290                 295                 300

Gln Ala Pro Pro Cys Tyr Ala Pro Thr Tyr Phe Pro Pro Gly Glu Lys
305                 310                 315                 320

Pro Pro Pro Tyr Ala Pro
                325
```

<210> SEQ ID NO 23
<211> LENGTH: 521
<212> TYPE: PRT
<213> ORGANISM: Homo sapiens

<400> SEQUENCE: 23

```
Met Glu Phe Gly Leu Ser Trp Val Leu Leu Val Phe Leu Gln Gly
1               5                   10                  15

Val Gln Cys Glu Val Gln Leu Val Asp Ser Gly Gly Gly Leu Val Gln
            20                  25                  30
```

-continued

```
Pro Gly Gly Ser Leu Arg Leu Ser Cys Ala Ala Ser Gly Phe Ile Val
         35                  40                  45

Ser Asp His Tyr Val Glu Trp Val Arg Gln Ala Pro Gly Lys Gly Pro
 50                  55                  60

Glu Trp Val Gly Cys Phe Arg Ser Lys Ala His Lys Ser Thr Thr Glu
 65                  70                  75                  80

Tyr Ala Ala Ser Val Lys Gly Arg Phe Thr Ile Leu Arg Asp Asp Ser
                 85                  90                  95

Lys Asn Ser Val His Leu Gln Met Asn Ser Leu Lys Thr Asp Asp Thr
                100                 105                 110

Ala Val Tyr Tyr Cys Val Arg Asp Leu Glu Gly Ala Gly Lys Tyr Asp
            115                 120                 125

Trp Tyr Phe Asp Ile Trp Gly Arg Gly Ile Leu Val Thr Val Ser Ser
        130                 135                 140

Ala Ser Thr Lys Gly Pro Ser Val Phe Pro Leu Ala Pro Cys Ser Arg
145                 150                 155                 160

Ser Thr Ser Gly Gly Thr Ala Ala Leu Gly Cys Leu Val Lys Asp Tyr
                165                 170                 175

Phe Pro Glu Pro Val Thr Val Ser Trp Asn Ser Gly Ala Leu Thr Ser
            180                 185                 190

Gly Val His Thr Phe Pro Ala Val Leu Gln Ser Ser Gly Leu Tyr Ser
        195                 200                 205

Leu Ser Ser Val Val Thr Val Pro Ser Ser Ser Leu Gly Thr Gln Thr
210                 215                 220

Tyr Thr Cys Asn Val Asn His Lys Pro Ser Asn Thr Lys Val Asp Lys
225                 230                 235                 240

Arg Val Glu Leu Lys Thr Pro Leu Gly Asp Thr Thr His Thr Cys Pro
                245                 250                 255

Arg Cys Pro Glu Pro Lys Ser Cys Asp Thr Pro Pro Cys Pro Arg
            260                 265                 270

Cys Pro Glu Pro Lys Ser Cys Asp Thr Pro Pro Cys Pro Arg Cys
        275                 280                 285

Pro Glu Pro Lys Ser Cys Asp Thr Pro Pro Cys Pro Arg Cys Pro
    290                 295                 300

Ala Pro Glu Leu Leu Gly Gly Pro Ser Val Phe Leu Phe Pro Pro Lys
305                 310                 315                 320

Pro Lys Asp Thr Leu Met Ile Ser Arg Thr Pro Glu Val Thr Cys Val
                325                 330                 335

Val Val Asp Val Ser His Glu Asp Pro Glu Val Gln Phe Lys Trp Tyr
            340                 345                 350

Val Asp Gly Val Glu Val His Asn Ala Lys Thr Lys Pro Arg Glu Glu
        355                 360                 365

Gln Phe Asn Ser Thr Phe Arg Val Val Ser Val Leu Thr Val Leu His
370                 375                 380

Gln Asp Trp Leu Asn Gly Lys Glu Tyr Lys Cys Lys Val Ser Asn Lys
385                 390                 395                 400

Ala Leu Pro Ala Pro Ile Glu Lys Thr Ile Ser Lys Thr Lys Gly Gln
                405                 410                 415

Pro Arg Glu Pro Gln Val Tyr Thr Leu Pro Pro Ser Arg Glu Glu Met
            420                 425                 430

Thr Lys Asn Gln Val Ser Leu Thr Cys Leu Val Lys Gly Phe Tyr Pro
        435                 440                 445
```

```
Ser Asp Ile Ala Val Glu Trp Glu Ser Ser Gly Gln Pro Glu Asn Asn
    450                 455                 460
Tyr Asn Thr Thr Pro Pro Met Leu Asp Ser Asp Gly Ser Phe Phe Leu
465                 470                 475                 480
Tyr Ser Lys Leu Thr Val Asp Lys Ser Arg Trp Gln Gln Gly Asn Ile
                485                 490                 495
Phe Ser Cys Ser Val Met His Glu Ala Leu His Asn Arg Phe Thr Gln
                500                 505                 510
Lys Ser Leu Ser Leu Ser Pro Gly Lys
                515                 520

<210> SEQ ID NO 24
<211> LENGTH: 303
<212> TYPE: PRT
<213> ORGANISM: Homo sapiens

<400> SEQUENCE: 24

Met Cys His Gly Arg Ile Ala Pro Lys Ser Thr Ser Val Phe Ala Val
1               5                   10                  15
Ala Ser Val Gly His Gly Val Phe Leu Pro Leu Val Ile Leu Cys Thr
                20                  25                  30
Leu Leu Gly Asp Gly Leu Ala Ser Val Cys Pro Leu Pro Glu Pro
            35                  40                  45
Glu Asn Gly Gly Tyr Ile Cys His Pro Arg Pro Cys Arg Asp Pro Leu
    50                  55                  60
Thr Ala Gly Ser Val Ile Glu Tyr Leu Cys Ala Glu Gly Tyr Met Leu
65                  70                  75                  80
Lys Gly Asp Tyr Lys Tyr Leu Thr Cys Lys Asn Gly Glu Trp Lys Pro
                85                  90                  95
Ala Met Glu Ile Ser Cys Arg Leu Asn Glu Asp Lys Asp Thr His Thr
                100                 105                 110
Ser Leu Gly Val Pro Thr Leu Ser Ile Val Ala Ser Thr Ala Ser Ser
            115                 120                 125
Val Ala Leu Ile Leu Leu Leu Val Val Leu Phe Val Leu Leu Gln Pro
130                 135                 140
Lys Leu Lys Ser Phe His His Ser Arg Arg Asp Gln Gly Val Ser Gly
145                 150                 155                 160
Asp Gln Val Ser Ile Met Val Asp Gly Val Gln Val Ala Leu Pro Ser
                165                 170                 175
Tyr Glu Glu Ala Val Tyr Gly Ser Ser Gly His Cys Val Pro Pro Ala
                180                 185                 190
Asp Pro Arg Val Gln Ile Val Leu Ser Glu Gly Ser Gly Pro Ser Gly
            195                 200                 205
Arg Ser Val Pro Arg Glu Gln Leu Pro Asp Gln Gly Ala Cys Ser
            210                 215                 220
Ser Ala Gly Gly Glu Asp Glu Ala Pro Gly Gln Ser Gly Leu Cys Glu
225                 230                 235                 240
Ala Trp Gly Ser Arg Ala Ser Glu Thr Val Met Val His Gln Ala Thr
                245                 250                 255
Thr Ser Ser Trp Val Ala Gly Ser Gly Asn Arg Gln Leu Ala His Lys
                260                 265                 270
Glu Thr Ala Asp Ser Glu Asn Ser Asp Ile Gln Ser Leu Leu Ser Leu
            275                 280                 285
Thr Ser Glu Glu Tyr Thr Asp Asp Ile Pro Leu Leu Lys Glu Ala
            290                 295                 300
```

<210> SEQ ID NO 25
<211> LENGTH: 262
<212> TYPE: PRT
<213> ORGANISM: Homo sapiens

<400> SEQUENCE: 25

Met Asp Pro Arg Leu Ser Thr Val Arg Gln Thr Cys Cys Cys Phe Asn
1               5                   10                  15

Val Arg Ile Ala Thr Thr Ala Leu Ala Ile Tyr His Val Ile Met Ser
            20                  25                  30

Val Leu Leu Phe Ile Glu His Ser Val Glu Val Ala His Gly Lys Ala
        35                  40                  45

Ser Cys Lys Leu Ser Gln Met Gly Tyr Leu Arg Ile Ala Asp Leu Ile
    50                  55                  60

Ser Ser Phe Leu Leu Ile Thr Met Leu Phe Ile Ile Ser Leu Ser Leu
65                  70                  75                  80

Leu Ile Gly Val Val Lys Asn Arg Glu Lys Tyr Leu Leu Pro Phe Leu
                85                  90                  95

Ser Leu Gln Ile Met Asp Tyr Leu Leu Cys Leu Leu Thr Leu Leu Gly
            100                 105                 110

Ser Tyr Ile Glu Leu Pro Ala Tyr Leu Lys Leu Ala Ser Arg Ser Arg
        115                 120                 125

Ala Ser Ser Lys Phe Pro Leu Met Thr Leu Gln Leu Leu Asp Phe
    130                 135                 140

Cys Leu Ser Ile Leu Thr Leu Cys Ser Ser Tyr Met Glu Val Pro Thr
145                 150                 155                 160

Tyr Leu Asn Phe Lys Ser Met Asn His Met Asn Tyr Leu Pro Ser Gln
                165                 170                 175

Glu Asp Met Pro His Asn Gln Phe Ile Lys Met Met Ile Ile Phe Ser
            180                 185                 190

Ile Ala Phe Ile Thr Val Leu Ile Phe Lys Val Tyr Met Phe Lys Cys
        195                 200                 205

Val Trp Arg Cys Tyr Arg Leu Ile Lys Cys Met Asn Ser Val Glu Glu
    210                 215                 220

Lys Arg Asn Ser Lys Met Leu Gln Lys Val Val Leu Pro Ser Tyr Glu
225                 230                 235                 240

Glu Ala Leu Ser Leu Pro Ser Lys Thr Pro Glu Gly Gly Pro Ala Pro
                245                 250                 255

Pro Pro Tyr Ser Glu Val
            260

<210> SEQ ID NO 26
<211> LENGTH: 251
<212> TYPE: PRT
<213> ORGANISM: Homo sapiens

<400> SEQUENCE: 26

Met Ser Ser Asp His Leu Asn Asn Ser Thr Leu Lys Glu Ala Gln Phe
1               5                   10                  15

Lys Asp Leu Phe Leu Lys Lys Ala Glu Leu Glu Phe Ala Gln Ile Ile
            20                  25                  30

Ile Ile Val Val Val Val Thr Val Met Val Val Val Ile Val Cys Leu
        35                  40                  45

Leu Asn His Tyr Lys Val Ser Thr Arg Ser Phe Ile Asn Arg Pro Asn
    50                  55                  60

Gln Ser Arg Arg Arg Glu Asp Gly Leu Pro Gln Ile Met His Ala Pro
65                  70                  75                  80

Arg Ser Arg Asp Arg Phe Thr Ala Pro Ser Phe Ile Gln Arg Asp Arg
                85                  90                  95

Phe Ser Arg Phe Gln Pro Thr Tyr Pro Tyr Val Gln His Glu Ile Asp
            100                 105                 110

Leu Pro Pro Thr Ile Ser Leu Ser Asp Gly Glu Pro Pro Pro Tyr
            115                 120                 125

Gln Gly Pro Cys Thr Leu Gln Leu Arg Asp Pro Glu Gln Gln Met Glu
            130                 135                 140

Leu Asn Arg Glu Ser Val Arg Ala Pro Pro Asn Arg Thr Ile Phe Asp
145                 150                 155                 160

Ser Asp Leu Ile Asp Ile Ala Met Tyr Ser Gly Gly Pro Cys Pro Pro
                165                 170                 175

Ser Ser Asn Ser Gly Ile Ser Ala Ser Thr Cys Ser Ser Asn Gly Arg
            180                 185                 190

Met Glu Gly Pro Pro Thr Tyr Ser Glu Val Met Gly His His Pro
            195                 200                 205

Gly Ala Ser Phe Leu His His Gln Arg Ser Asn Ala His Arg Gly Ser
210                 215                 220

Arg Leu Gln Phe Gln Gln Asn Asn Ala Glu Ser Thr Ile Val Pro Ile
225                 230                 235                 240

Lys Gly Lys Asp Arg Lys Pro Gly Asn Leu Val
                245                 250

<210> SEQ ID NO 27
<211> LENGTH: 161
<212> TYPE: PRT
<213> ORGANISM: Homo sapiens

<400> SEQUENCE: 27

Met Ser Val Pro Gly Pro Tyr Gln Ala Ala Thr Gly Pro Ser Ser Ala
1               5                   10                  15

Pro Ser Ala Pro Pro Ser Tyr Glu Glu Thr Val Ala Val Asn Ser Tyr
                20                  25                  30

Tyr Pro Thr Pro Pro Ala Pro Met Pro Gly Pro Thr Thr Gly Leu Val
            35                  40                  45

Thr Gly Pro Asp Gly Lys Gly Met Asn Pro Pro Ser Tyr Tyr Thr Gln
        50                  55                  60

Pro Ala Pro Ile Pro Asn Asn Asn Pro Ile Thr Val Gln Thr Val Tyr
65                  70                  75                  80

Val Gln His Pro Ile Thr Phe Leu Asp Arg Pro Ile Gln Met Cys Cys
                85                  90                  95

Pro Ser Cys Asn Lys Met Ile Val Ser Gln Leu Ser Tyr Asn Ala Gly
            100                 105                 110

Ala Leu Thr Trp Leu Ser Cys Gly Ser Leu Cys Leu Leu Gly Cys Ile
            115                 120                 125

Ala Gly Cys Cys Phe Ile Pro Phe Cys Val Asp Ala Leu Gln Asp Val
            130                 135                 140

Asp His Tyr Cys Pro Asn Cys Arg Ala Leu Leu Gly Thr Tyr Lys Arg
145                 150                 155                 160

Leu

<210> SEQ ID NO 28

```
<211> LENGTH: 118
<212> TYPE: PRT
<213> ORGANISM: Homo sapiens

<400> SEQUENCE: 28

Met Pro Arg Glu Asp Ala His Phe Ile Tyr Gly Tyr Pro Lys Lys Gly
1               5                   10                  15

His Gly His Ser Tyr Thr Thr Ala Glu Glu Ala Ala Gly Ile Gly Ile
            20                  25                  30

Leu Thr Val Ile Leu Gly Val Leu Leu Leu Ile Gly Cys Trp Tyr Cys
        35                  40                  45

Arg Arg Arg Asn Gly Tyr Arg Ala Leu Met Asp Lys Ser Leu His Val
    50                  55                  60

Gly Thr Gln Cys Ala Leu Thr Arg Arg Cys Pro Gln Glu Gly Phe Asp
65                  70                  75                  80

His Arg Asp Ser Lys Val Ser Leu Gln Glu Lys Asn Cys Glu Pro Val
                85                  90                  95

Val Pro Asn Ala Pro Pro Ala Tyr Glu Lys Leu Ser Ala Glu Gln Ser
            100                 105                 110

Pro Pro Pro Tyr Ser Pro
            115

<210> SEQ ID NO 29
<211> LENGTH: 242
<212> TYPE: PRT
<213> ORGANISM: Homo sapiens

<400> SEQUENCE: 29

Met Asp His His Gln Pro Gly Thr Gly Arg Tyr Gln Val Leu Leu Asn
1               5                   10                  15

Glu Glu Asp Asn Ser Gly Ser Ser Ala Ile Glu Gln Pro Pro Thr Ser
            20                  25                  30

Asn Pro Ala Pro Gln Ile Val Gln Ala Ala Ser Ser Ala Pro Ala Leu
        35                  40                  45

Glu Thr Asp Ser Ser Pro Pro Pro Tyr Ser Ser Ile Thr Val Glu Val
    50                  55                  60

Pro Thr Thr Ser Asp Thr Glu Val Tyr Gly Glu Phe Tyr Pro Val Pro
65                  70                  75                  80

Pro Pro Tyr Ser Val Ala Thr Ser Leu Pro Thr Tyr Asp Glu Ala Glu
                85                  90                  95

Lys Ala Lys Ala Ala Ala Met Ala Ala Ala Ala Ala Glu Thr Ser Gln
            100                 105                 110

Arg Ile Gln Glu Glu Glu Cys Pro Pro Arg Asp Asp Phe Ser Asp Ala
        115                 120                 125

Asp Gln Leu Arg Val Gly Asn Asp Gly Ile Phe Met Leu Ala Phe Phe
    130                 135                 140

Met Ala Phe Ile Phe Asn Trp Leu Gly Phe Cys Leu Ser Phe Cys Ile
145                 150                 155                 160

Thr Asn Thr Ile Ala Gly Arg Tyr Gly Ala Ile Cys Gly Phe Gly Leu
                165                 170                 175

Ser Leu Ile Lys Trp Ile Leu Ile Val Arg Phe Ser Tyr Phe Thr
            180                 185                 190

Gly Tyr Phe Asn Gly Gln Tyr Trp Leu Trp Trp Ile Phe Leu Val Leu
        195                 200                 205

Gly Leu Leu Leu Phe Phe Arg Gly Phe Val Asn Tyr Leu Lys Val Arg
    210                 215                 220
```

```
Asn Met Ser Glu Ser Met Ala Ala His Arg Thr Arg Tyr Phe Phe
225                 230                 235                 240

Leu Leu

<210> SEQ ID NO 30
<211> LENGTH: 252
<212> TYPE: PRT
<213> ORGANISM: Homo sapiens

<400> SEQUENCE: 30

Met Ala Glu Leu Glu Phe Val Gln Ile Ile Ile Val Val Val Met
1               5                   10                  15

Met Val Met Val Val Ile Thr Cys Leu Leu Ser His Tyr Lys Leu
                20                  25                  30

Ser Ala Arg Ser Phe Ile Ser Arg His Ser Gln Gly Arg Arg Glu
            35                  40                  45

Asp Ala Leu Ser Ser Glu Gly Cys Leu Trp Pro Ser Glu Ser Thr Val
50                  55                  60

Ser Gly Asn Gly Ile Pro Glu Pro Gln Val Tyr Ala Pro Pro Arg Pro
65                  70                  75                  80

Thr Asp Arg Leu Ala Val Pro Pro Phe Ala Gln Arg Glu Arg Phe His
                85                  90                  95

Arg Phe Gln Pro Thr Tyr Pro Tyr Leu Gln His Glu Ile Asp Leu Pro
                100                 105                 110

Pro Thr Ile Ser Leu Ser Asp Gly Glu Glu Pro Pro Tyr Gln Gly
                115                 120                 125

Pro Cys Thr Leu Gln Leu Arg Asp Pro Glu Gln Gln Leu Glu Leu Asn
130                 135                 140

Arg Glu Ser Val Arg Ala Pro Pro Asn Arg Thr Ile Phe Asp Ser Asp
145                 150                 155                 160

Leu Met Asp Ser Ala Arg Leu Gly Gly Pro Cys Pro Pro Ser Ser Asn
                165                 170                 175

Ser Gly Ile Ser Ala Thr Cys Tyr Gly Ser Gly Gly Arg Met Glu Gly
                180                 185                 190

Pro Pro Pro Thr Tyr Ser Glu Val Ile Gly His Tyr Pro Gly Ser Ser
                195                 200                 205

Phe Gln His Gln Gln Ser Ser Gly Pro Pro Ser Leu Leu Glu Gly Thr
                210                 215                 220

Arg Leu His His Thr His Ile Ala Pro Leu Glu Ser Ala Ala Ile Trp
225                 230                 235                 240

Ser Lys Glu Lys Asp Lys Gln Lys Gly His Pro Leu
                245                 250

<210> SEQ ID NO 31
<211> LENGTH: 377
<212> TYPE: PRT
<213> ORGANISM: Homo sapiens

<400> SEQUENCE: 31

Met Val Leu Glu Ser Thr Met Val Cys Val Asp Asn Ser Glu Tyr Met
1               5                   10                  15

Arg Asn Gly Asp Phe Leu Pro Thr Arg Leu Gln Ala Gln Gln Asp Ala
                20                  25                  30

Val Asn Ile Val Cys His Ser Lys Thr Arg Ser Asn Pro Glu Asn Asn
            35                  40                  45
```

Val Gly Leu Ile Thr Leu Ala Asn Asp Cys Glu Val Leu Thr Thr Leu
    50                  55                  60

Thr Pro Asp Thr Gly Arg Ile Leu Ser Lys Leu His Thr Val Gln Pro
65                  70                  75                  80

Lys Gly Lys Ile Thr Phe Cys Thr Gly Ile Arg Val Ala His Leu Ala
                    85                  90                  95

Leu Lys His Arg Gln Gly Lys Asn His Lys Met Arg Ile Ile Ala Phe
                100                 105                 110

Val Gly Ser Pro Val Glu Asp Asn Glu Lys Asp Leu Val Lys Leu Ala
                115                 120                 125

Lys Arg Leu Lys Lys Glu Lys Val Asn Val Asp Ile Ile Asn Phe Gly
130                 135                 140

Glu Glu Glu Val Asn Thr Glu Lys Leu Thr Ala Phe Val Asn Thr Leu
145                 150                 155                 160

Asn Gly Lys Asp Gly Thr Gly Ser His Leu Val Thr Val Pro Pro Gly
                    165                 170                 175

Pro Ser Leu Ala Asp Ala Leu Ile Ser Ser Pro Ile Leu Ala Gly Glu
                180                 185                 190

Gly Gly Ala Met Leu Gly Leu Gly Ala Ser Asp Phe Glu Phe Gly Val
                195                 200                 205

Asp Pro Ser Ala Asp Pro Glu Leu Ala Leu Ala Leu Arg Val Ser Met
    210                 215                 220

Glu Glu Gln Arg Gln Arg Gln Glu Glu Glu Ala Arg Arg Ala Ala Ala
225                 230                 235                 240

Ala Ser Ala Ala Glu Ala Gly Ile Ala Thr Thr Gly Thr Glu Asp Ser
                    245                 250                 255

Asp Asp Ala Leu Leu Lys Met Thr Ile Ser Gln Gln Glu Phe Gly Arg
                260                 265                 270

Thr Gly Leu Pro Asp Leu Ser Ser Met Thr Glu Glu Glu Gln Ile Ala
                275                 280                 285

Tyr Ala Met Gln Met Ser Leu Gln Gly Ala Glu Phe Gly Gln Ala Glu
                290                 295                 300

Ser Ala Asp Ile Asp Ala Ser Ser Ala Met Asp Thr Ser Glu Pro Ala
305                 310                 315                 320

Lys Glu Glu Asp Asp Tyr Asp Val Met Gln Asp Pro Glu Phe Leu Gln
                    325                 330                 335

Ser Val Leu Glu Asn Leu Pro Gly Val Asp Pro Asn Asn Glu Ala Ile
                340                 345                 350

Arg Asn Ala Met Gly Ser Leu Ala Ser Gln Ala Thr Lys Asp Gly Lys
                355                 360                 365

Lys Asp Lys Lys Glu Glu Asp Lys Lys
    370                 375

<210> SEQ ID NO 32
<211> LENGTH: 621
<212> TYPE: PRT
<213> ORGANISM: Homo sapiens

<400> SEQUENCE: 32

Met Ala Asp Phe Glu Glu Leu Arg Asn Met Val Ser Ser Phe Arg Val
1               5                   10                  15

Ser Glu Leu Gln Val Leu Leu Gly Phe Ala Gly Arg Asn Lys Ser Gly
                20                  25                  30

Arg Lys His Asp Leu Leu Met Arg Ala Leu His Leu Leu Lys Ser Gly
            35                  40                  45

-continued

```
Cys Ser Pro Ala Val Gln Ile Lys Ile Arg Glu Leu Tyr Arg Arg Arg
    50                  55                  60

Tyr Pro Arg Thr Leu Glu Gly Leu Ser Asp Leu Ser Thr Ile Lys Ser
65                  70                  75                  80

Ser Val Phe Ser Leu Asp Gly Ser Ser Pro Val Glu Pro Asp Leu
                85                  90                  95

Ala Val Ala Gly Ile His Ser Leu Pro Ser Thr Ser Val Thr Pro His
                100                 105                 110

Ser Pro Ser Ser Pro Val Gly Ser Val Leu Leu Gln Asp Thr Lys Pro
                115                 120                 125

Thr Phe Glu Met Gln Gln Pro Ser Pro Ile Pro Pro Val His Pro
    130                 135                 140

Asp Val Gln Leu Lys Asn Leu Pro Phe Tyr Asp Val Leu Asp Val Leu
145                 150                 155                 160

Ile Lys Pro Thr Ser Leu Val Gln Ser Ser Ile Gln Arg Phe Gln Glu
                165                 170                 175

Lys Phe Phe Ile Phe Ala Leu Thr Pro Gln Gln Val Arg Glu Ile Cys
                180                 185                 190

Ile Ser Arg Asp Phe Leu Pro Gly Gly Arg Arg Asp Tyr Thr Val Gln
                195                 200                 205

Val Gln Leu Arg Leu Cys Leu Ala Glu Thr Ser Cys Pro Gln Glu Asp
    210                 215                 220

Asn Tyr Pro Asn Ser Leu Cys Ile Lys Val Asn Gly Lys Leu Phe Pro
225                 230                 235                 240

Leu Pro Gly Tyr Ala Pro Pro Lys Asn Gly Ile Glu Gln Lys Arg
                245                 250                 255

Pro Gly Arg Pro Leu Asn Ile Thr Ser Leu Val Arg Leu Ser Ser Ala
                260                 265                 270

Val Pro Asn Gln Ile Ser Ile Ser Trp Ala Ser Glu Ile Gly Lys Asn
    275                 280                 285

Tyr Ser Met Ser Val Tyr Leu Val Arg Gln Leu Thr Ser Ala Met Leu
    290                 295                 300

Leu Gln Arg Leu Lys Met Lys Gly Ile Arg Asn Pro Asp His Ser Arg
305                 310                 315                 320

Ala Leu Ile Lys Glu Lys Leu Thr Ala Asp Pro Asp Ser Glu Ile Ala
                325                 330                 335

Thr Thr Ser Leu Arg Val Ser Leu Met Cys Pro Leu Gly Lys Met Arg
                340                 345                 350

Leu Thr Ile Pro Cys Arg Ala Val Thr Cys Thr His Leu Gln Cys Phe
                355                 360                 365

Asp Ala Ala Leu Tyr Leu Gln Met Asn Glu Lys Lys Pro Thr Trp Ile
    370                 375                 380

Cys Pro Val Cys Asp Lys Lys Ala Ala Tyr Glu Ser Leu Ile Leu Asp
385                 390                 395                 400

Gly Leu Phe Met Glu Ile Leu Asn Asp Cys Ser Asp Val Asp Glu Ile
                405                 410                 415

Lys Phe Gln Glu Asp Gly Ser Trp Cys Pro Met Arg Pro Lys Lys Glu
                420                 425                 430

Ala Met Lys Val Ser Ser Gln Pro Cys Thr Lys Ile Glu Ser Ser Ser
                435                 440                 445

Val Leu Ser Lys Pro Cys Ser Val Thr Val Ala Ser Glu Ala Ser Lys
                450                 455                 460
```

```
Lys Lys Val Asp Val Ile Asp Leu Thr Ile Glu Ser Ser Ser Asp Glu
465                 470                 475                 480

Glu Glu Asp Pro Pro Ala Lys Arg Lys Cys Ile Phe Met Ser Glu Thr
            485                 490                 495

Gln Ser Ser Pro Thr Lys Gly Val Leu Met Tyr Gln Pro Ser Ser Val
        500                 505                 510

Arg Val Pro Ser Val Thr Ser Val Asp Pro Ala Ala Ile Pro Pro Ser
        515                 520                 525

Leu Thr Asp Tyr Ser Val Pro Phe His His Thr Pro Ile Ser Ser Met
    530                 535                 540

Ser Ser Asp Leu Pro Gly Leu Asp Phe Leu Ser Leu Ile Pro Val Asp
545                 550                 555                 560

Pro Gln Tyr Cys Pro Pro Met Phe Leu Asp Ser Leu Thr Ser Pro Leu
                565                 570                 575

Thr Ala Ser Ser Thr Ser Val Thr Thr Thr Ser Ser His Glu Ser Ser
                580                 585                 590

Thr His Val Ser Ser Ser Ser Arg Ser Glu Thr Gly Val Ile Thr
            595                 600                 605

Ser Ser Gly Ser Asn Ile Pro Asp Ile Ile Ser Leu Asp
    610                 615                 620

<210> SEQ ID NO 33
<211> LENGTH: 715
<212> TYPE: PRT
<213> ORGANISM: Homo sapiens

<400> SEQUENCE: 33

Met Glu Leu Ala Asp Val Gly Ala Ala Ala Ser Ser Gln Gly Val His
1               5                   10                  15

Asp Gln Val Leu Pro Thr Pro Asn Ala Ser Ser Arg Val Ile Val His
                20                  25                  30

Val Asp Leu Asp Cys Phe Tyr Ala Gln Val Glu Met Ile Ser Asn Pro
            35                  40                  45

Glu Leu Lys Asp Lys Pro Leu Gly Val Gln Gln Lys Tyr Leu Val Val
50                  55                  60

Thr Cys Asn Tyr Glu Ala Arg Lys Leu Gly Val Lys Lys Leu Met Asn
65                  70                  75                  80

Val Arg Asp Ala Lys Glu Lys Cys Pro Gln Leu Val Leu Val Asn Gly
                85                  90                  95

Glu Asp Leu Thr Arg Tyr Arg Glu Met Ser Tyr Lys Val Thr Glu Leu
                100                 105                 110

Leu Glu Glu Phe Ser Pro Val Val Glu Arg Leu Gly Phe Asp Glu Asn
            115                 120                 125

Phe Val Asp Leu Thr Glu Met Val Glu Lys Arg Leu Gln Gln Leu Gln
    130                 135                 140

Ser Asp Glu Leu Ser Ala Val Thr Val Ser Gly His Val Tyr Asn Asn
145                 150                 155                 160

Gln Ser Ile Asn Leu Leu Asp Val Leu His Ile Arg Leu Leu Val Gly
                165                 170                 175

Ser Gln Ile Ala Ala Glu Met Arg Glu Ala Met Tyr Asn Gln Leu Gly
                180                 185                 190

Leu Thr Gly Cys Ala Gly Val Ala Ser Asn Lys Leu Leu Ala Lys Leu
            195                 200                 205

Val Ser Gly Val Phe Lys Pro Asn Gln Gln Thr Val Leu Leu Pro Glu
    210                 215                 220
```

-continued

```
Ser Cys Gln His Leu Ile His Ser Leu Asn His Ile Lys Glu Ile Pro
225                 230                 235                 240

Gly Ile Gly Tyr Lys Thr Ala Lys Cys Leu Glu Ala Leu Gly Ile Asn
            245                 250                 255

Ser Val Arg Asp Leu Gln Thr Phe Ser Pro Lys Ile Leu Glu Lys Glu
        260                 265                 270

Leu Gly Ile Ser Val Ala Gln Arg Ile Gln Lys Leu Ser Phe Gly Glu
    275                 280                 285

Asp Asn Ser Pro Val Ile Leu Ser Gly Pro Gln Ser Phe Ser Glu
290                 295                 300

Glu Asp Ser Phe Lys Lys Cys Ser Ser Glu Val Glu Ala Lys Asn Lys
305                 310                 315                 320

Ile Glu Glu Leu Leu Ala Ser Leu Leu Asn Arg Val Cys Gln Asp Gly
                325                 330                 335

Arg Lys Pro His Thr Val Arg Leu Ile Ile Arg Arg Tyr Ser Ser Glu
            340                 345                 350

Lys His Tyr Gly Arg Glu Ser Arg Gln Cys Pro Ile Pro Ser His Val
        355                 360                 365

Ile Gln Lys Leu Gly Thr Gly Asn Tyr Asp Val Met Thr Pro Met Val
    370                 375                 380

Asp Ile Leu Met Lys Leu Phe Arg Asn Met Val Asn Val Lys Met Pro
385                 390                 395                 400

Phe His Leu Thr Leu Leu Ser Val Cys Phe Cys Asn Leu Lys Ala Leu
                405                 410                 415

Asn Thr Ala Lys Lys Gly Leu Ile Asp Tyr Tyr Leu Met Pro Ser Leu
            420                 425                 430

Ser Thr Thr Ser Arg Ser Gly Lys His Ser Phe Lys Met Lys Asp Thr
        435                 440                 445

His Met Glu Asp Phe Pro Lys Asp Lys Glu Thr Asn Arg Asp Phe Leu
    450                 455                 460

Pro Ser Gly Arg Ile Glu Ser Thr Arg Thr Arg Glu Ser Pro Leu Asp
465                 470                 475                 480

Thr Thr Asn Phe Ser Lys Glu Lys Asp Ile Asn Glu Phe Pro Leu Cys
                485                 490                 495

Ser Leu Pro Glu Gly Val Asp Gln Glu Val Phe Lys Gln Leu Pro Val
            500                 505                 510

Asp Ile Gln Glu Glu Ile Leu Ser Gly Lys Ser Arg Glu Lys Phe Gln
        515                 520                 525

Gly Lys Gly Ser Val Ser Cys Pro Leu His Ala Ser Arg Gly Val Leu
    530                 535                 540

Ser Phe Phe Ser Lys Lys Gln Met Gln Asp Ile Pro Ile Asn Pro Arg
545                 550                 555                 560

Asp His Leu Ser Ser Lys Gln Val Ser Ser Val Ser Pro Cys Glu
                565                 570                 575

Pro Gly Thr Ser Gly Phe Asn Ser Ser Ser Ser Tyr Met Ser Ser
            580                 585                 590

Gln Lys Asp Tyr Ser Tyr Tyr Leu Asp Asn Arg Leu Lys Asp Glu Arg
        595                 600                 605

Ile Ser Gln Gly Pro Lys Glu Pro Gln Gly Phe His Phe Thr Asn Ser
    610                 615                 620

Asn Pro Ala Val Ser Ala Phe His Ser Phe Pro Asn Leu Gln Ser Glu
625                 630                 635                 640
```

```
Gln Leu Phe Ser Arg Asn His Thr Thr Asp Ser His Lys Gln Thr Val
                645                 650                 655

Ala Thr Asp Ser His Glu Gly Leu Thr Glu Asn Arg Glu Pro Asp Ser
            660                 665                 670

Val Asp Glu Lys Ile Thr Phe Pro Ser Asp Ile Asp Pro Gln Val Phe
        675                 680                 685

Tyr Glu Leu Pro Glu Ala Val Gln Lys Glu Leu Leu Ala Glu Trp Lys
    690                 695                 700

Arg Ala Gly Ser Asp Phe His Ile Gly His Lys
705                 710                 715

<210> SEQ ID NO 34
<211> LENGTH: 696
<212> TYPE: PRT
<213> ORGANISM: Homo sapiens

<400> SEQUENCE: 34

Met Asp Ala Asp Met Asp Tyr Glu Arg Pro Asn Val Glu Thr Ile Lys
1               5                   10                  15

Cys Val Val Gly Asp Asn Ala Val Gly Lys Thr Arg Leu Ile Cys
                20                  25                  30

Ala Arg Ala Cys Asn Thr Thr Leu Thr Gln Tyr Gln Leu Leu Ala Thr
            35                  40                  45

His Val Pro Thr Val Trp Ala Ile Asp Gln Tyr Arg Val Cys Gln Glu
        50                  55                  60

Val Leu Glu Arg Ser Arg Asp Val Val Asp Glu Val Ser Val Ser Leu
65                  70                  75                  80

Arg Leu Trp Asp Thr Phe Gly Asp His His Lys Asp Arg Arg Phe Ala
                85                  90                  95

Tyr Gly Arg Ser Asp Val Val Leu Cys Phe Ser Ile Ala Asn Pro
            100                 105                 110

Asn Ser Leu Asn His Val Lys Ser Met Trp Tyr Pro Glu Ile Lys His
        115                 120                 125

Phe Cys Pro Arg Thr Pro Val Ile Leu Val Gly Cys Gln Leu Asp Leu
    130                 135                 140

Arg Tyr Ala Asp Leu Glu Ala Val Asn Arg Ala Arg Arg Pro Leu Ala
145                 150                 155                 160

Arg Pro Ile Lys Arg Gly Asp Ile Leu Pro Pro Glu Lys Gly Arg Glu
                165                 170                 175

Val Ala Lys Glu Leu Gly Leu Pro Tyr Tyr Glu Thr Ser Val Phe Asp
            180                 185                 190

Gln Phe Gly Ile Lys Asp Val Phe Asp Asn Ala Ile Arg Ala Ala Leu
        195                 200                 205

Ile Ser Arg Arg His Leu Gln Phe Trp Lys Ser His Leu Lys Lys Val
    210                 215                 220

Gln Lys Pro Leu Leu Gln Ala Pro Phe Leu Pro Pro Lys Ala Pro Pro
225                 230                 235                 240

Pro Val Ile Lys Ile Pro Glu Cys Pro Ser Met Gly Thr Asn Glu Ala
                245                 250                 255

Ala Cys Leu Leu Asp Asn Pro Leu Cys Ala Asp Val Leu Phe Ile Leu
            260                 265                 270

Gln Asp Gln Glu His Ile Phe Ala His Arg Ile Tyr Leu Ala Thr Ser
        275                 280                 285

Ser Ser Lys Phe Tyr Asp Leu Phe Leu Met Glu Cys Glu Glu Ser Pro
    290                 295                 300
```

Asn Gly Ser Glu Gly Ala Cys Glu Lys Glu Lys Gln Ser Arg Asp Phe
305                 310                 315                 320

Gln Gly Arg Ile Leu Ser Val Asp Pro Glu Glu Arg Glu Glu Gly
            325                 330                 335

Pro Pro Arg Ile Pro Gln Ala Asp Gln Trp Lys Ser Ser Asn Lys Ser
            340                 345                 350

Leu Val Glu Ala Leu Gly Leu Glu Ala Glu Gly Ala Val Pro Glu Thr
                355                 360                 365

Gln Thr Leu Thr Gly Trp Ser Lys Gly Phe Ile Gly Met His Arg Glu
        370                 375                 380

Met Gln Val Asn Pro Ile Ser Lys Arg Met Gly Pro Met Thr Val Val
385                 390                 395                 400

Arg Met Asp Ala Ser Val Gln Pro Gly Pro Phe Arg Thr Leu Leu Gln
                405                 410                 415

Phe Leu Tyr Thr Gly Gln Leu Asp Glu Lys Glu Lys Asp Leu Val Gly
                420                 425                 430

Leu Ala Gln Ile Ala Glu Val Leu Glu Met Phe Asp Leu Arg Met Met
                435                 440                 445

Val Glu Asn Ile Met Asn Lys Glu Ala Phe Met Asn Gln Glu Ile Thr
450                 455                 460

Lys Ala Phe His Val Arg Lys Ala Asn Arg Ile Lys Glu Cys Leu Ser
465                 470                 475                 480

Lys Gly Thr Phe Ser Asp Val Thr Phe Lys Leu Asp Asp Gly Ala Ile
                485                 490                 495

Ser Ala His Lys Pro Leu Leu Ile Cys Ser Cys Glu Trp Met Ala Ala
            500                 505                 510

Met Phe Gly Gly Ser Phe Val Glu Ser Ala Asn Ser Glu Val Tyr Leu
        515                 520                 525

Pro Asn Ile Asn Lys Ile Ser Met Gln Ala Val Leu Asp Tyr Leu Tyr
    530                 535                 540

Thr Lys Gln Leu Ser Pro Asn Leu Asp Leu Asp Pro Leu Glu Leu Ile
545                 550                 555                 560

Ala Leu Ala Asn Arg Phe Cys Leu Pro His Leu Val Ala Leu Ala Glu
                565                 570                 575

Gln His Ala Val Gln Glu Leu Thr Lys Ala Ala Thr Ser Gly Val Gly
            580                 585                 590

Ile Asp Gly Glu Val Leu Ser Tyr Leu Glu Leu Ala Gln Phe His Asn
        595                 600                 605

Ala His Gln Leu Ala Ala Trp Cys Leu His His Ile Cys Thr Asn Tyr
    610                 615                 620

Asn Ser Val Cys Ser Lys Phe Arg Lys Glu Ile Lys Ser Lys Ser Ala
625                 630                 635                 640

Asp Asn Gln Glu Tyr Phe Glu Arg His Arg Trp Pro Pro Val Trp Tyr
                645                 650                 655

Leu Lys Glu Glu Asp His Tyr Gln Arg Val Lys Arg Glu Arg Glu Lys
                660                 665                 670

Glu Asp Ile Ala Leu Asn Lys His Arg Ser Arg Arg Lys Trp Cys Phe
            675                 680                 685

Trp Asn Ser Ser Pro Ala Val Ala
            690                 695

<210> SEQ ID NO 35
<211> LENGTH: 180

-continued

```
<212> TYPE: PRT
<213> ORGANISM: Homo sapiens

<400> SEQUENCE: 35

Met Ile Thr Lys Phe Val Gln Asp Arg His Arg Ala Arg Arg Asn Arg
1               5                   10                  15

Leu Arg Lys Asp Gln Leu Lys Lys Leu Pro Val His Lys Phe Lys Lys
                20                  25                  30

Gly Asp Glu Tyr Asp Val Cys Ala Ile Cys Leu Asp Glu Tyr Glu Asp
            35                  40                  45

Gly Asp Lys Leu Arg Ile Leu Pro Cys Ser His Ala Tyr His Cys Lys
        50                  55                  60

Cys Val Asp Pro Trp Leu Thr Lys Thr Lys Thr Cys Pro Val Cys
65                  70                  75                  80

Lys Gln Lys Val Val Pro Ser Gln Gly Asp Ser Asp Ser Asp Thr Asp
                85                  90                  95

Ser Ser Gln Glu Glu Asn Glu Val Thr Glu His Thr Pro Leu Leu Arg
                100                 105                 110

Pro Leu Ala Ser Val Ser Ala Gln Ser Phe Gly Ala Leu Ser Glu Ser
            115                 120                 125

Arg Ser His Gln Asn Met Thr Glu Ser Ser Asp Tyr Glu Glu Asp Asp
        130                 135                 140

Asn Glu Asp Thr Asp Ser Ser Asp Ala Glu Asn Glu Ile Asn Glu His
145                 150                 155                 160

Asp Val Val Val Gln Leu Gln Pro Asn Gly Glu Arg Asp Tyr Asn Ile
                165                 170                 175

Ala Asn Thr Val
            180

<210> SEQ ID NO 36
<211> LENGTH: 190
<212> TYPE: PRT
<213> ORGANISM: Homo sapiens

<400> SEQUENCE: 36

Met Ser Thr Arg Lys Arg Arg Gly Gly Ala Ile Asn Ser Arg Gln Ala
1               5                   10                  15

Gln Lys Arg Thr Arg Glu Ala Thr Ser Thr Pro Glu Ile Ser Leu Glu
                20                  25                  30

Ala Glu Pro Ile Glu Leu Val Glu Thr Ala Gly Asp Glu Ile Val Asp
            35                  40                  45

Leu Thr Cys Glu Ser Leu Glu Pro Val Val Val Asp Leu Thr His Asn
        50                  55                  60

Asp Ser Val Val Ile Val Asp Glu Arg Arg Pro Arg Arg Asn Ala
65                  70                  75                  80

Arg Arg Leu Pro Gln Asp His Ala Asp Ser Cys Val Val Ser Ser Asp
                85                  90                  95

Asp Glu Glu Leu Ser Arg Asp Arg Asp Val Tyr Val Thr Thr His Thr
                100                 105                 110

Pro Arg Asn Ala Arg Asp Glu Gly Ala Thr Gly Leu Arg Pro Ser Gly
            115                 120                 125

Thr Val Ser Cys Pro Ile Cys Met Asp Gly Tyr Ser Glu Ile Val Gln
        130                 135                 140

Asn Gly Arg Leu Ile Val Ser Thr Glu Cys Gly His Val Phe Cys Ser
145                 150                 155                 160
```

Gln Cys Leu Arg Asp Ser Leu Lys Asn Ala Asn Thr Cys Pro Thr Cys
            165                 170                 175

Arg Lys Lys Ile Asn His Lys Arg Tyr His Pro Ile Tyr Ile
            180                 185                 190

<210> SEQ ID NO 37
<211> LENGTH: 372
<212> TYPE: PRT
<213> ORGANISM: Homo sapiens

<400> SEQUENCE: 37

Met Lys Ala Gly Ala Thr Ser Met Trp Ala Ser Cys Cys Gly Leu Leu
1               5                   10                  15

Asn Glu Val Met Gly Thr Gly Ala Val Arg Gly Gln Gln Ser Ala Phe
            20                  25                  30

Ala Gly Ala Thr Gly Pro Phe Arg Phe Thr Pro Asn Pro Glu Phe Ser
        35                  40                  45

Thr Tyr Pro Pro Ala Ala Thr Glu Gly Pro Asn Ile Val Cys Lys Ala
50                  55                  60

Cys Gly Leu Ser Phe Ser Val Phe Arg Lys Lys His Val Cys Cys Asp
65                  70                  75                  80

Cys Lys Lys Asp Phe Cys Ser Val Cys Ser Val Leu Gln Glu Asn Leu
                85                  90                  95

Arg Arg Cys Ser Thr Cys His Leu Leu Gln Glu Thr Ala Phe Gln Arg
            100                 105                 110

Pro Gln Leu Met Arg Leu Lys Val Lys Asp Leu Arg Gln Tyr Leu Ile
        115                 120                 125

Leu Arg Asn Ile Pro Ile Asp Thr Cys Arg Glu Lys Glu Asp Leu Val
130                 135                 140

Asp Leu Val Leu Cys His His Gly Leu Gly Ser Glu Asp Asp Met Asp
145                 150                 155                 160

Thr Ser Ser Leu Asn Ser Ser Arg Ser Gln Thr Ser Ser Phe Phe Thr
                165                 170                 175

Arg Ser Phe Phe Ser Asn Tyr Thr Ala Pro Ser Ala Thr Met Ser Ser
            180                 185                 190

Phe Gln Gly Glu Leu Met Asp Gly Asp Gln Thr Ser Arg Ser Gly Val
        195                 200                 205

Pro Ala Gln Val Gln Ser Glu Ile Thr Ser Ala Asn Thr Glu Asp Asp
210                 215                 220

Asp Asp Asp Asp Asp Glu Asp Asp Asp Glu Glu Asn Ala Glu
225                 230                 235                 240

Asp Arg Asn Pro Gly Leu Ser Lys Glu Arg Val Arg Ala Ser Leu Ser
            245                 250                 255

Asp Leu Ser Ser Leu Asp Asp Val Glu Gly Met Ser Val Arg Gln Leu
        260                 265                 270

Lys Glu Ile Leu Ala Arg Asn Phe Val Asn Tyr Ser Gly Cys Cys Glu
275                 280                 285

Lys Trp Glu Leu Val Glu Lys Val Asn Arg Leu Tyr Lys Glu Asn Glu
290                 295                 300

Glu Asn Gln Lys Ser Tyr Gly Glu Arg Leu Gln Leu Gln Asp Glu Glu
305                 310                 315                 320

Asp Asp Ser Leu Cys Arg Ile Cys Met Asp Ala Val Ile Asp Cys Val
                325                 330                 335

Leu Leu Glu Cys Gly His Met Val Thr Cys Thr Lys Cys Gly Lys Arg
            340                 345                 350

```
Met Ser Glu Cys Pro Ile Cys Arg Gln Tyr Val Val Arg Ala Val His
        355                 360                 365
Val Phe Lys Ser
    370

<210> SEQ ID NO 38
<211> LENGTH: 640
<212> TYPE: PRT
<213> ORGANISM: Homo sapiens

<400> SEQUENCE: 38

Met Ala Leu Ser Arg Gly Leu Pro Arg Glu Leu Ala Glu Ala Val Ala
1               5                   10                  15

Gly Gly Arg Val Leu Val Val Gly Ala Gly Ile Gly Cys Glu Leu
            20                  25                  30

Leu Lys Asn Leu Val Leu Thr Gly Phe Ser His Ile Asp Leu Ile Asp
        35                  40                  45

Leu Asp Thr Ile Asp Val Ser Asn Leu Asn Arg Gln Phe Leu Phe Gln
    50                  55                  60

Lys Lys His Val Gly Arg Ser Lys Ala Gln Val Ala Lys Glu Ser Val
65                  70                  75                  80

Leu Gln Phe Tyr Pro Lys Ala Asn Ile Val Ala Tyr His Asp Ser Ile
                85                  90                  95

Met Asn Pro Asp Tyr Asn Val Glu Phe Phe Arg Gln Phe Ile Leu Val
            100                 105                 110

Met Asn Ala Leu Asp Asn Arg Ala Ala Arg Asn His Val Asn Arg Met
        115                 120                 125

Cys Leu Ala Ala Asp Val Pro Leu Ile Glu Ser Gly Thr Ala Gly Tyr
    130                 135                 140

Leu Gly Gln Val Thr Thr Ile Lys Lys Gly Val Thr Glu Cys Tyr Glu
145                 150                 155                 160

Cys His Pro Lys Pro Thr Gln Arg Thr Phe Pro Gly Cys Thr Ile Arg
                165                 170                 175

Asn Thr Pro Ser Glu Pro Ile His Cys Ile Val Trp Ala Lys Tyr Leu
            180                 185                 190

Phe Asn Gln Leu Phe Gly Glu Glu Asp Ala Asp Gln Glu Val Ser Pro
        195                 200                 205

Asp Arg Ala Asp Pro Glu Ala Ala Trp Glu Pro Thr Glu Ala Glu Ala
    210                 215                 220

Arg Ala Arg Ala Ser Asn Glu Asp Gly Asp Ile Lys Arg Ile Ser Thr
225                 230                 235                 240

Lys Glu Trp Ala Lys Ser Thr Gly Tyr Asp Pro Val Lys Leu Phe Thr
                245                 250                 255

Lys Leu Phe Lys Asp Asp Ile Arg Tyr Leu Leu Thr Met Asp Lys Leu
            260                 265                 270

Trp Arg Lys Arg Lys Pro Pro Val Pro Leu Asp Trp Ala Glu Val Gln
        275                 280                 285

Ser Gln Gly Glu Glu Thr Asn Ala Ser Asp Gln Gln Asn Glu Pro Gln
    290                 295                 300

Leu Gly Leu Lys Asp Gln Gln Val Leu Asp Val Lys Ser Tyr Ala Arg
305                 310                 315                 320

Leu Phe Ser Lys Ser Ile Glu Thr Leu Arg Val His Leu Ala Glu Lys
                325                 330                 335

Gly Asp Gly Ala Glu Leu Ile Trp Asp Lys Asp Asp Pro Ser Ala Met
```

```
                340             345             350
Asp Phe Val Thr Ser Ala Ala Asn Leu Arg Met His Ile Phe Ser Met
            355                 360                 365
Asn Met Lys Ser Arg Phe Asp Ile Lys Ser Met Ala Gly Asn Ile Ile
        370                 375                 380
Pro Ala Ile Ala Thr Thr Asn Ala Val Ile Ala Gly Leu Ile Val Leu
385                 390                 395                 400
Glu Gly Leu Lys Ile Leu Ser Gly Lys Ile Asp Gln Cys Arg Thr Ile
                405                 410                 415
Phe Leu Asn Lys Gln Pro Asn Pro Arg Lys Lys Leu Leu Val Pro Cys
            420                 425                 430
Ala Leu Asp Pro Pro Asn Pro Asn Cys Tyr Val Cys Ala Ser Lys Pro
        435                 440                 445
Glu Val Thr Val Arg Leu Asn Val His Lys Val Thr Val Leu Thr Leu
450                 455                 460
Gln Asp Lys Ile Val Lys Glu Lys Phe Ala Met Val Ala Pro Asp Val
465                 470                 475                 480
Gln Ile Glu Asp Gly Lys Gly Thr Ile Leu Ile Ser Ser Glu Glu Gly
                485                 490                 495
Glu Thr Glu Ala Asn Asn His Lys Lys Leu Ser Glu Phe Gly Ile Arg
            500                 505                 510
Asn Gly Ser Arg Leu Gln Ala Asp Asp Phe Leu Gln Asp Tyr Thr Leu
        515                 520                 525
Leu Ile Asn Ile Leu His Ser Glu Asp Leu Gly Lys Asp Val Glu Phe
        530                 535                 540
Glu Val Val Gly Asp Ala Pro Glu Lys Val Gly Pro Lys Gln Ala Glu
545                 550                 555                 560
Asp Ala Ala Lys Ser Ile Thr Asn Gly Ser Asp Gly Ala Gln Pro
                565                 570                 575
Ser Thr Ser Thr Ala Gln Glu Gln Asp Asp Val Leu Ile Val Asp Ser
            580                 585                 590
Asp Glu Glu Asp Ser Ser Asn Asn Ala Asp Val Ser Glu Glu Glu Arg
        595                 600                 605
Ser Arg Lys Arg Lys Leu Asp Glu Lys Glu Asn Leu Ser Ala Lys Arg
        610                 615                 620
Ser Arg Ile Glu Gln Lys Glu Glu Leu Asp Asp Val Ile Ala Leu Asp
625                 630                 635                 640

<210> SEQ ID NO 39
<211> LENGTH: 731
<212> TYPE: PRT
<213> ORGANISM: Homo sapiens

<400> SEQUENCE: 39

Met Lys Leu Arg Ser Ser His Asn Ala Ser Lys Thr Leu Asn Ala Asn
1               5                   10                  15
Asn Met Glu Thr Leu Ile Glu Cys Gln Ser Gly Asp Ile Lys Glu
            20                  25                  30
His Pro Leu Leu Ala Ser Cys Glu Ser Glu Asp Ser Ile Cys Gln Leu
        35                  40                  45
Ile Glu Val Lys Lys Arg Lys Lys Val Leu Ser Trp Pro Phe Leu Met
    50                  55                  60
Arg Arg Leu Ser Pro Ala Ser Asp Phe Ser Gly Ala Leu Glu Thr Asp
65                  70                  75                  80
```

-continued

Leu Lys Ala Ser Leu Phe Asp Gln Pro Leu Ser Ile Ile Cys Gly Asp
                85                  90                  95

Ser Asp Thr Leu Pro Arg Pro Ile Gln Asp Ile Leu Thr Ile Leu Cys
            100                 105                 110

Leu Lys Gly Pro Ser Thr Glu Gly Ile Phe Arg Arg Ala Ala Asn Glu
        115                 120                 125

Lys Ala Arg Lys Glu Leu Lys Glu Glu Leu Asn Ser Gly Asp Ala Val
    130                 135                 140

Asp Leu Glu Arg Leu Pro Val His Leu Leu Ala Val Val Phe Lys Asp
145                 150                 155                 160

Phe Leu Arg Ser Ile Pro Arg Lys Leu Leu Ser Ser Asp Leu Phe Glu
                165                 170                 175

Glu Trp Met Gly Ala Leu Glu Met Gln Asp Glu Asp Arg Ile Glu
            180                 185                 190

Ala Leu Lys Gln Val Ala Asp Lys Leu Pro Arg Pro Asn Leu Leu Leu
        195                 200                 205

Leu Lys His Leu Val Tyr Val Leu His Leu Ile Ser Lys Asn Ser Glu
    210                 215                 220

Val Asn Arg Met Asp Ser Ser Asn Leu Ala Ile Cys Ile Gly Pro Asn
225                 230                 235                 240

Met Leu Thr Leu Glu Asn Asp Gln Ser Leu Ser Phe Glu Ala Gln Lys
                245                 250                 255

Asp Leu Asn Asn Lys Val Lys Thr Leu Val Glu Phe Leu Ile Asp Asn
            260                 265                 270

Cys Phe Glu Ile Phe Gly Glu Asn Ile Pro Val His Ser Ser Ile Thr
        275                 280                 285

Ser Asp Asp Ser Leu Glu His Thr Asp Ser Ser Asp Val Ser Thr Leu
    290                 295                 300

Gln Asn Asp Ser Ala Tyr Asp Ser Asn Asp Pro Asp Val Glu Ser Asn
305                 310                 315                 320

Ser Ser Ser Gly Ile Ser Ser Pro Ser Arg Gln Pro Gln Val Pro Met
                325                 330                 335

Ala Thr Ala Ala Gly Leu Asp Ser Ala Gly Pro Gln Asp Ala Arg Glu
            340                 345                 350

Val Ser Pro Glu Pro Ile Val Ser Thr Val Ala Arg Leu Lys Ser Ser
        355                 360                 365

Leu Ala Gln Pro Asp Arg Arg Tyr Ser Glu Pro Ser Met Pro Ser Ser
    370                 375                 380

Gln Glu Cys Leu Glu Ser Arg Val Thr Asn Gln Thr Leu Thr Lys Ser
385                 390                 395                 400

Glu Gly Asp Phe Pro Val Pro Arg Val Gly Ser Arg Leu Glu Ser Glu
                405                 410                 415

Glu Ala Glu Asp Pro Phe Pro Glu Glu Val Phe Pro Ala Val Gln Gly
            420                 425                 430

Lys Thr Lys Arg Pro Val Asp Leu Lys Ile Lys Asn Leu Ala Pro Gly
        435                 440                 445

Ser Val Leu Pro Arg Ala Leu Val Leu Lys Ala Phe Ser Ser Ser Ser
    450                 455                 460

Leu Asp Ala Ser Ser Asp Ser Ser Pro Val Ala Ser Pro Ser Ser Pro
465                 470                 475                 480

Lys Arg Asn Phe Phe Ser Arg His Gln Ser Phe Thr Thr Lys Thr Glu
                485                 490                 495

Lys Gly Lys Pro Ser Arg Glu Ile Lys Lys His Ser Met Ser Phe Thr

```
                500                 505                 510
Phe Ala Pro His Lys Val Leu Thr Lys Asn Leu Ser Ala Gly Ser
            515                 520                 525
Gly Lys Ser Gln Asp Phe Thr Arg Asp His Val Pro Arg Gly Val Arg
        530                 535                 540
Lys Glu Ser Gln Leu Ala Gly Arg Ile Val Gln Glu Asn Gly Cys Glu
545                 550                 555                 560
Thr His Asn Gln Thr Ala Arg Gly Phe Cys Leu Arg Pro His Ala Leu
                565                 570                 575
Ser Val Asp Asp Val Phe Gln Gly Ala Asp Trp Glu Arg Pro Gly Ser
            580                 585                 590
Pro Pro Ser Tyr Glu Glu Ala Met Gln Gly Pro Ala Ala Arg Leu Val
            595                 600                 605
Ala Ser Glu Ser Gln Thr Val Gly Ser Met Thr Val Gly Ser Met Arg
            610                 615                 620
Ala Arg Met Leu Glu Ala His Cys Leu Leu Pro Pro Leu Pro Pro Ala
625                 630                 635                 640
His His Val Glu Asp Ser Arg His Arg Gly Ser Lys Glu Pro Leu Pro
                645                 650                 655
Gly His Gly Leu Ser Pro Leu Pro Glu Arg Trp Lys Gln Ser Arg Thr
            660                 665                 670
Val His Ala Ser Gly Asp Ser Leu Gly His Val Ser Gly Pro Gly Arg
        675                 680                 685
Pro Glu Leu Leu Pro Leu Arg Thr Val Ser Glu Ser Val Gln Arg Asn
    690                 695                 700
Lys Arg Asp Cys Leu Val Arg Arg Cys Ser Gln Pro Val Phe Glu Ala
705                 710                 715                 720
Asp Gln Phe Gln Tyr Ala Lys Glu Ser Tyr Ile
                725                 730

<210> SEQ ID NO 40
<211> LENGTH: 216
<212> TYPE: PRT
<213> ORGANISM: Homo sapiens

<400> SEQUENCE: 40

Met Val Pro Met His Leu Leu Gly Arg Leu Glu Lys Pro Leu Leu Leu
1               5                   10                  15
Leu Cys Cys Ala Ser Phe Leu Leu Gly Leu Ala Leu Leu Gly Ile Lys
            20                  25                  30
Thr Asp Ile Thr Pro Val Ala Tyr Phe Leu Thr Leu Gly Gly Phe
        35                  40                  45
Phe Leu Phe Ala Tyr Leu Leu Val Arg Phe Leu Glu Trp Gly Leu Arg
    50                  55                  60
Ser Gln Leu Gln Ser Met Gln Thr Glu Ser Pro Gly Pro Ser Gly Asn
65                  70                  75                  80
Ala Arg Asp Asn Glu Ala Phe Glu Val Pro Val Tyr Glu Glu Ala Val
                85                  90                  95
Val Gly Leu Glu Ser Gln Cys Arg Pro Gln Glu Leu Asp Gln Pro Pro
            100                 105                 110
Pro Tyr Ser Thr Val Val Ile Pro Pro Ala Pro Glu Glu Gln Pro
        115                 120                 125
Ser His Pro Glu Gly Ser Arg Arg Ala Lys Leu Glu Gln Arg Arg Met
    130                 135                 140
```

Ala Ser Glu Gly Ser Met Ala Gln Glu Gly Ser Pro Gly Arg Ala Pro
145                 150                 155                 160

Ile Asn Leu Arg Leu Arg Gly Pro Arg Ala Val Ser Thr Ala Pro Asp
            165                 170                 175

Leu Gln Ser Leu Ala Ala Val Pro Thr Leu Glu Pro Leu Thr Pro Pro
        180                 185                 190

Pro Ala Tyr Asp Val Cys Phe Gly His Pro Asp Asp Ser Val Phe
        195                 200                 205

Tyr Glu Asp Asn Trp Ala Pro Pro
    210                 215

<210> SEQ ID NO 41
<211> LENGTH: 243
<212> TYPE: PRT
<213> ORGANISM: Homo sapiens

<400> SEQUENCE: 41

Met Glu Gln Gly Ser Gly Arg Leu Glu Asp Phe Pro Val Asn Val Phe
1               5                   10                  15

Ser Val Thr Pro Tyr Thr Pro Ser Thr Ala Asp Ile Gln Val Ser Asp
            20                  25                  30

Asp Asp Lys Ala Gly Ala Thr Leu Leu Phe Ser Gly Ile Phe Leu Gly
        35                  40                  45

Leu Val Gly Ile Thr Phe Thr Val Met Gly Trp Ile Lys Tyr Gln Gly
    50                  55                  60

Val Ser His Phe Glu Trp Thr Gln Leu Leu Gly Pro Val Leu Leu Ser
65                  70                  75                  80

Val Gly Val Thr Phe Ile Leu Ile Ala Val Cys Lys Phe Lys Met Leu
                85                  90                  95

Ser Cys Gln Leu Cys Lys Glu Ser Glu Glu Arg Val Pro Asp Ser Glu
            100                 105                 110

Gln Thr Pro Gly Gly Pro Ser Phe Val Phe Thr Gly Ile Asn Gln Pro
        115                 120                 125

Ile Thr Phe His Gly Ala Thr Val Val Gln Tyr Ile Pro Pro Pro Tyr
    130                 135                 140

Gly Ser Pro Glu Pro Met Gly Ile Asn Thr Ser Tyr Leu Gln Ser Val
145                 150                 155                 160

Val Ser Pro Cys Gly Leu Ile Thr Ser Gly Gly Ala Ala Ala Ala Met
                165                 170                 175

Ser Ser Pro Pro Gln Tyr Tyr Thr Ile Tyr Pro Gln Asp Asn Ser Ala
            180                 185                 190

Phe Val Val Asp Glu Gly Cys Leu Ser Phe Thr Asp Gly Gly Asn His
        195                 200                 205

Arg Pro Asn Pro Asp Val Asp Gln Leu Glu Glu Thr Gln Leu Glu Glu
    210                 215                 220

Glu Ala Cys Ala Cys Phe Ser Pro Pro Tyr Glu Glu Ile Tyr Ser
225                 230                 235                 240

Leu Pro Arg

<210> SEQ ID NO 42
<211> LENGTH: 277
<212> TYPE: PRT
<213> ORGANISM: Homo sapiens

<400> SEQUENCE: 42

Met Ala Ala Asp Gly Glu Arg Ser Pro Leu Leu Ser Glu Pro Ile Asp

-continued

```
                1               5                  10                   15
        Gly Gly Ala Gly Gly Asn Gly Leu Val Gly Pro Gly Gly Ser Gly Ala
                        20                  25                  30
        Gly Pro Gly Gly Gly Leu Thr Pro Ser Ala Pro Pro Tyr Gly Ala Ala
                        35                  40                  45
        Phe Pro Pro Phe Pro Glu Gly His Pro Ala Val Leu Pro Gly Glu Asp
                        50                  55                  60
        Pro Pro Pro Tyr Ser Pro Leu Thr Ser Pro Asp Ser Gly Ser Ala Pro
        65                  70                  75                  80
        Met Ile Thr Cys Arg Val Cys Gln Ser Leu Ile Asn Val Glu Gly Lys
                            85                  90                  95
        Met His Gln His Val Lys Cys Gly Val Cys Asn Glu Ala Thr Pro
                        100                 105                 110
        Ile Lys Asn Ala Pro Pro Gly Lys Lys Tyr Val Arg Cys Pro Cys Asn
                        115                 120                 125
        Cys Leu Leu Ile Cys Lys Val Thr Ser Gln Arg Ile Ala Cys Pro Arg
                    130                 135                 140
        Pro Tyr Cys Lys Arg Ile Ile Asn Leu Gly Pro Val His Pro Gly Pro
        145                 150                 155                 160
        Leu Ser Pro Glu Pro Gln Pro Met Gly Val Arg Val Ile Cys Gly His
                        165                 170                 175
        Cys Lys Asn Thr Phe Leu Trp Thr Glu Phe Thr Asp Arg Thr Leu Ala
                    180                 185                 190
        Arg Cys Pro His Cys Arg Lys Val Ser Ser Ile Gly Arg Arg Tyr Pro
                    195                 200                 205
        Arg Lys Arg Cys Ile Cys Cys Phe Leu Leu Gly Leu Leu Leu Ala Val
                    210                 215                 220
        Thr Ala Thr Gly Leu Ala Phe Gly Thr Trp Lys His Ala Arg Arg Tyr
        225                 230                 235                 240
        Gly Gly Ile Tyr Ala Ala Trp Ala Phe Val Ile Leu Leu Ala Val Leu
                    245                 250                 255
        Cys Leu Gly Arg Ala Leu Tyr Trp Ala Cys Met Lys Val Ser His Pro
                    260                 265                 270
        Val Gln Asn Phe Ser
                    275

<210> SEQ ID NO 43
<211> LENGTH: 287
<212> TYPE: PRT
<213> ORGANISM: Homo sapiens

<400> SEQUENCE: 43

Met His Arg Leu Met Gly Val Asn Ser Thr Ala Ala Ala Ala Ala Gly
        1               5                   10                  15
        Gln Pro Asn Val Ser Cys Thr Cys Asn Cys Lys Arg Ser Leu Phe Gln
                        20                  25                  30
        Ser Met Glu Ile Thr Glu Leu Glu Phe Val Gln Ile Ile Ile Ile Val
                        35                  40                  45
        Val Val Met Met Val Met Val Val Val Ile Thr Cys Leu Leu Ser His
                        50                  55                  60
        Tyr Lys Leu Ser Ala Arg Ser Phe Ile Ser Arg His Ser Gln Gly Arg
        65                  70                  75                  80
        Arg Arg Glu Asp Ala Leu Ser Ser Glu Gly Cys Leu Trp Pro Ser Glu
                        85                  90                  95
```

-continued

Ser Thr Val Ser Gly Asn Gly Ile Pro Glu Pro Gln Val Tyr Ala Pro
            100                 105                 110

Pro Arg Pro Thr Asp Arg Leu Ala Val Pro Pro Phe Ala Gln Arg Glu
        115                 120                 125

Arg Phe His Arg Phe Gln Pro Thr Tyr Pro Tyr Leu Gln His Glu Ile
    130                 135                 140

Asp Leu Pro Pro Thr Ile Ser Leu Ser Asp Gly Glu Glu Pro Pro Pro
145                 150                 155                 160

Tyr Gln Gly Pro Cys Thr Leu Gln Leu Arg Asp Pro Glu Gln Gln Leu
                165                 170                 175

Glu Leu Asn Arg Glu Ser Val Arg Ala Pro Pro Asn Arg Thr Ile Phe
            180                 185                 190

Asp Ser Asp Leu Met Asp Ser Ala Arg Leu Gly Gly Pro Cys Pro Pro
        195                 200                 205

Ser Ser Asn Ser Gly Ile Ser Ala Thr Cys Tyr Gly Ser Gly Gly Arg
    210                 215                 220

Met Glu Gly Pro Pro Thr Tyr Ser Glu Val Ile Gly His Tyr Pro
225                 230                 235                 240

Gly Ser Ser Phe Gln His Gln Ser Ser Gly Pro Pro Ser Leu Leu
                245                 250                 255

Glu Gly Thr Arg Leu His His Thr His Ile Ala Pro Leu Glu Ser Ala
            260                 265                 270

Ala Ile Trp Ser Lys Glu Lys Asp Lys Gln Lys Gly His Pro Leu
                275                 280                 285

<210> SEQ ID NO 44
<211> LENGTH: 158
<212> TYPE: PRT
<213> ORGANISM: Homo sapiens

<400> SEQUENCE: 44

Met Ser Gly Ile Ala Leu Ser Arg Leu Ala Gln Glu Arg Lys Ala Trp
1               5                   10                  15

Arg Lys Asp His Pro Phe Gly Phe Val Ala Val Pro Thr Lys Asn Pro
            20                  25                  30

Asp Gly Thr Met Asn Leu Met Asn Trp Glu Cys Ala Ile Pro Gly Lys
        35                  40                  45

Lys Gly Thr Pro Trp Glu Gly Gly Leu Phe Lys Leu Arg Met Leu Phe
    50                  55                  60

Lys Asp Asp Tyr Pro Ser Ser Pro Lys Cys Lys Phe Glu Pro Pro
65                  70                  75                  80

Leu Phe His Pro Asn Val Tyr Pro Ser Gly Thr Val Cys Leu Ser Ile
                85                  90                  95

Leu Glu Glu Asp Lys Asp Trp Arg Pro Ala Ile Thr Ile Lys Gln Ile
            100                 105                 110

Leu Leu Gly Ile Gln Glu Leu Leu Asn Glu Pro Asn Ile Gln Asp Pro
        115                 120                 125

Ala Gln Ala Glu Ala Tyr Thr Ile Tyr Cys Gln Asn Arg Val Glu Tyr
    130                 135                 140

Glu Lys Arg Val Arg Ala Gln Ala Lys Lys Phe Ala Pro Ser
145                 150                 155

<210> SEQ ID NO 45
<211> LENGTH: 146
<212> TYPE: PRT
<213> ORGANISM: Homo sapiens

<400> SEQUENCE: 45

| Met | Ser | Arg | Ser | Arg | Leu | Phe | Ser | Val | Thr | Ser | Ala | Ile | Ser | Thr | Ile |
|---|---|---|---|---|---|---|---|---|---|---|---|---|---|---|---|
| 1 | | | | 5 | | | | | 10 | | | | | 15 | |

| Gly | Ile | Leu | Cys | Leu | Pro | Leu | Phe | Gln | Leu | Val | Leu | Ser | Asp | Leu | Pro |
| | | | 20 | | | | | 25 | | | | | 30 | | |

| Cys | Glu | Glu | Asp | Glu | Met | Cys | Val | Asn | Tyr | Asn | Asp | Gln | His | Pro | Asn |
| | | 35 | | | | | 40 | | | | | 45 | | | |

| Gly | Trp | Tyr | Ile | Trp | Ile | Leu | Leu | Leu | Val | Leu | Val | Ala | Ala | Leu |
| | 50 | | | | | 55 | | | | | 60 | | | | |

| Leu | Cys | Gly | Ala | Val | Val | Leu | Cys | Leu | Gln | Cys | Trp | Leu | Arg | Arg | Pro |
| 65 | | | | 70 | | | | | 75 | | | | | 80 | |

| Arg | Ile | Asp | Ser | His | Arg | Arg | Thr | Met | Ala | Val | Phe | Ala | Val | Gly | Asp |
| | | | 85 | | | | | 90 | | | | | 95 | | |

| Leu | Asp | Ser | Ile | Tyr | Gly | Thr | Glu | Ala | Ala | Val | Ser | Pro | Thr | Val | Gly |
| | | | 100 | | | | 105 | | | | | 110 | | | |

| Ile | His | Leu | Gln | Thr | Gln | Thr | Pro | Asp | Leu | Tyr | Pro | Val | Pro | Ala | Pro |
| | | | 115 | | | | 120 | | | | | 125 | | | |

| Cys | Phe | Gly | Pro | Leu | Gly | Ser | Pro | Pro | Tyr | Glu | Glu | Ile | Val | Lys |
| | 130 | | | | | 135 | | | | | 140 | | | | |

| Thr | Thr |
| 145 | |

<210> SEQ ID NO 46
<211> LENGTH: 304
<212> TYPE: PRT
<213> ORGANISM: Homo sapiens

<400> SEQUENCE: 46

| Met | Ala | Glu | Ala | Ser | Ala | Ala | Gly | Ala | Asp | Ser | Gly | Ala | Ala | Val | Ala |
|---|---|---|---|---|---|---|---|---|---|---|---|---|---|---|---|
| 1 | | | | 5 | | | | | 10 | | | | | 15 | |

| Ala | His | Arg | Phe | Phe | Cys | His | Phe | Cys | Lys | Gly | Glu | Val | Ser | Pro | Lys |
| | | | 20 | | | | | 25 | | | | | 30 | | |

| Leu | Pro | Glu | Tyr | Ile | Cys | Pro | Arg | Cys | Glu | Ser | Gly | Phe | Ile | Glu | Glu |
| | | | 35 | | | | 40 | | | | | 45 | | | |

| Val | Thr | Asp | Asp | Ser | Ser | Phe | Leu | Gly | Gly | Gly | Ser | Arg | Ile | Asp |
| | 50 | | | | | 55 | | | | | 60 | | | | |

| Asn | Thr | Thr | Thr | Thr | His | Phe | Ala | Glu | Leu | Trp | Gly | His | Leu | Asp | His |
| 65 | | | | 70 | | | | | 75 | | | | | 80 | |

| Thr | Met | Phe | Phe | Gln | Asp | Phe | Arg | Pro | Phe | Leu | Ser | Ser | Pro | Leu |
| | | | 85 | | | | | 90 | | | | | 95 | | |

| Asp | Gln | Asp | Asn | Arg | Ala | Asn | Glu | Arg | Gly | His | Gln | Thr | His | Thr | Asp |
| | | | 100 | | | | 105 | | | | | 110 | | | |

| Phe | Trp | Gly | Ala | Arg | Pro | Pro | Arg | Leu | Pro | Leu | Gly | Arg | Arg | Tyr | Arg |
| | | 115 | | | | | 120 | | | | | 125 | | | |

| Ser | Arg | Gly | Ser | Ser | Arg | Pro | Asp | Arg | Ser | Pro | Ala | Ile | Glu | Gly | Ile |
| | | 130 | | | | | 135 | | | | | 140 | | | |

| Leu | Gln | His | Ile | Phe | Ala | Gly | Phe | Phe | Ala | Asn | Ser | Ala | Ile | Pro | Gly |
| 145 | | | | 150 | | | | | 155 | | | | | 160 | |

| Ser | Pro | His | Pro | Phe | Ser | Trp | Ser | Gly | Met | Leu | His | Ser | Asn | Pro | Gly |
| | | | 165 | | | | | 170 | | | | | 175 | | |

| Asp | Tyr | Ala | Trp | Gly | Gln | Thr | Gly | Leu | Asp | Ala | Ile | Val | Thr | Gln | Leu |
| | | | 180 | | | | | 185 | | | | | 190 | | |

| Leu | Gly | Gln | Leu | Glu | Asn | Thr | Gly | Pro | Pro | Pro | Ala | Asp | Lys | Glu | Lys |
| | | | 195 | | | | 200 | | | | | 205 | | | |

```
Ile Thr Ser Leu Pro Thr Val Thr Val Thr Gln Glu Gln Val Asp Met
    210             215             220
Gly Leu Glu Cys Pro Val Cys Lys Glu Asp Tyr Thr Val Glu Glu Glu
225             230             235             240
Val Arg Gln Leu Pro Cys Asn His Phe Phe His Ser Ser Cys Ile Val
                245             250             255
Pro Trp Leu Glu Leu His Asp Thr Cys Pro Val Cys Arg Lys Ser Leu
            260             265             270
Asn Gly Glu Asp Ser Thr Arg Gln Ser Gln Ser Thr Glu Ala Ser Ala
        275             280             285
Ser Asn Arg Phe Ser Asn Asp Ser Gln Leu His Asp Arg Trp Thr Phe
    290             295             300
```